(12) United States Patent
Mukawa

(10) Patent No.: US 6,816,290 B2
(45) Date of Patent: Nov. 9, 2004

(54) IMAGE DISPLAY ELEMENT, AND IMAGE DISPLAY DEVICE

(75) Inventor: Hiroshi Mukawa, Kanagawa (JP)

(73) Assignee: Sony Corporation, Tokyo (JP)

(*) Notice: Subject to any disclaimer, the term of this patent is extended or adjusted under 35 U.S.C. 154(b) by 28 days.

(21) Appl. No.: 10/332,031

(22) PCT Filed: Jul. 5, 2001

(86) PCT No.: PCT/JP01/05857
§ 371 (c)(1),
(2), (4) Date: Jan. 3, 2003

(87) PCT Pub. No.: WO02/03129
PCT Pub. Date: Jan. 10, 2002

(65) Prior Publication Data
US 2003/0147112 A1 Aug. 7, 2003

(30) Foreign Application Priority Data

| Jul. 5, 2000 | (JP) | 2000-204328 |
| Sep. 18, 2000 | (JP) | 2000-282684 |

(51) Int. Cl.[7] ............................... G02B 5/32
(52) U.S. Cl. .................. 359/15; 359/272; 349/201; 349/202
(58) Field of Search ................... 359/15, 242, 272; 349/194, 201, 202

(56) References Cited

U.S. PATENT DOCUMENTS 5,999,282 A * 12/1999 Suzuki et al. ............. 359/20
6,049,410 A    4/2000 Nakagaki
2003/0067760 A1 * 4/2003 Jagt et al. ................ 362/31

FOREIGN PATENT DOCUMENTS

| JP | 05-173196 | 7/1992 |
| JP | 09-189809 | 7/1997 |
| JP | 11-174449 | 7/1999 |
| JP | 11-242196 | 9/1999 |
| JP | 2000-206466 | 7/2000 |

* cited by examiner

Primary Examiner—Leo Boutsikaris
(74) Attorney, Agent, or Firm—Sonnenschein, Nath & Rosenthal LLP

(57) ABSTRACT

An image display device including a polarization selective holographic optical device for diffracting illuminating light, and a reflection type spatial optical modulator for modulating the state of polarization of the illuminating light diffracted by the polarization selective holographic optical device is disclosed. The device includes a plurality of each of two areas of respectively different incidence polarization orientation dependencies of the refractive index, with the layers being layered sequentially alternately. An image display apparatus including the above image display device, a light source, an illuminating optical system and a projection optical system is also disclosed. With the present optical display device and optical display apparatus, the utilization efficiency of the illuminating light may be improved, while the device and the apparatus may be reduced in size and production cost, as uniformity and high contrast of the image displayed are achieved simultaneously.

94 Claims, 26 Drawing Sheets

IMAGE DISPLAY ELEMENT, AND IMAGE DISPLAY DEVICE

TECHNICAL FIELD

This invention relates to an image display device and an image display apparatus employing a reflection type spatial light modulator and, more particularly, to such image display device and image display apparatus in which the apparatus may be reduced in weight and lowered in production costs while the image displayed may be improved in contrast.

BACKGROUND ART

So far, a variety of image display devices and image display apparatus produced using these display devices have been proposed.

[1] Spatial Light Modulator

The spatial light modulator (SLM) is such a device in which, as image signals are incident thereon, the incident light is modulated, from one pixel to another, based on image data corresponding to the image signals. The spatial light modulator (SLM) may be classified into a transmission type in which the light transmitted through the spatial light modulator is modulated, and a reflection type in which the light reflected by the spatial light modulator is modulated.

The reflection type spatial light modulator is constructed by e.g., a liquid crystal or a digital micro-mirror. In particular, the device formed using the liquid crystal is termed a liquid crystal type spatial light modulator.

The liquid crystal may be classified into an optical rotatory (polarization light guide) mode type, a birefringence mode type, a light scattering mode type and a light absorption mode type. The liquid crystal used in general may be enumerated by a TN liquid crystal, employing the optical rotatory (polarization light guide) mode type twisted nematic (TN) operational mode, an STN liquid crystal employing a birefringence operational mode type super-twisted nematic (STN) operational mode and an FLC type liquid crystal employing the ferroelectric liquid crystal (FLC) mode.

These reflection type spatial light modulator, modulating the state of polarization, may be enumerated by a liquid crystal spatial light modulator of perpendicular orientation, employing the TN crystal, an anti-ferroelectric liquid crystal spatial light modulator and a birefringence mode spatial light modulator employing the TN liquid crystal, in addition to the ferroelectric liquid crystal spatial light modulator.

[2] Reflection Type FLC Spatial Light Modulator

The structure and the operating principle of the reflection type FLC spatial light modulator, in the reflection type spatial light modulator modulating the state of polarization, is explained.

Referring to FIGS. 1A to 1C, the reflection type FLC spatial light modulator is made up of a pair of electrodes and a liquid crystal material 105 inserted therebetween. An electrode part shown on an upper part of FIG. 1 includes a glass substrate 101A, a transparent electrode material 102A on an inner side (a lower side) thereof, and an film of orientation (a film the liquid crystal molecules of which have been aligned in one direction such as by rubbing) 103A on a further inner side (a further lower side) thereof. The other electrode part, shown on the lower side, is made up of a silicon substrate 101B, an aluminum electrode 102B, shown on an inner side (an upper side) thereof, and a film of orientation 103B, shown on a further inner side (further upper side) thereof. The aluminum electrode 102B also operates as a reflection film. On an outer (upper) side of the glass substrate 101A of the upper electrode part is arranged a polarizer 104.

FIG. 1A shows the state of the first voltage direction in which the voltage of a first direction is applied to the transparent electrode material 102A and to the aluminum electrode 102B. FIG. 1B shows the state of the second voltage direction in which the voltage of a second direction opposite to the first direction is applied to the transparent electrode material 102A and to the aluminum electrode 102B.

Referring to FIG. 1C, the liquid crystal material 105 exhibits no birefringence effect with respect to the incident polarized light in the state of the first voltage direction, however, in the state of the second voltage direction, it exhibits a birefringence effect with respect to the incident polarized light.

Since a beam of polarized light 107A, incident via polarizer 104, is transmitted through the liquid crystal material 105, under the condition of the first voltage direction, shown in FIG. 1A, and reaches the aluminum electrode 102B without changing the state of the wave polarization, since the liquid crystal material 105 exhibits no birefringence effect under this condition. A polarized light beam 107B, reflected by the aluminum electrode (reflecting film) 102B, is again transmitted through the liquid crystal material 105 to reach the polarizer 104 without changing the state of the wave polarization. That is, the light of the same state of wave polarization as that of the incident light is returned to the polarizer 104. Consequently, the light reflected by the aluminum electrode (reflecting film) 102B is obtained via polarizer 104 as the outgoing light.

On the other hand, under the condition of the second voltage direction, shown in FIG. 1B, the polarized light beam 107A, incident via polarizer 104, is transmitted through the liquid crystal material 105 and thereby subjected to birefringence effects so as to be changed from the state of linear polarization to that of circular polarization to generate a circular polarized light beam 107B. This circular polarized light beam 107B is reflected by the aluminum electrode (reflecting film) 102B and has its direction of rotation of the polarized light reversed by this reflection. The circular polarized light beam 107B, having the direction of rotation reversed, is re-transmitted through the liquid crystal material 105 so as to be subjected to the birefringence effect and so as to be thereby turned into a linear polarized light beam. This linear polarized light beam is perpendicular to the direction of polarization of the polarizer 104 and hence is not transmitted through the polarizer 104.

That is, in this reflection type FLC spatial light modulator, 'white display' and 'black display' dominate in a portion of the state of the first voltage direction and in a portion of the state of the second voltage direction, respectively.

[3] Projection Type Image Display Device Employing Reflection Type Spatial Light Modulator In a routine reflection type spatial light modulator, for example, a projection type image display apparatus including e.g., a reflection type TN liquid crystal panel, the illuminating light projected from a lamp light source 201 falls on an illuminating optical system 202 having the functions of correcting the cross-sectional profile of a light beam, uniforming the intensity and controlling the angle of divergence, as shown in FIG. 2. This illuminating optical system 202 may be provided with a P-S polarization converter, not shown. This P-S polarization converter is an optical block for aligning the illuminating light in the non-polarized state into the P-polarized light or into the S-polarized light at an efficiency of 50% or higher.

In an embodiment, shown here, the illuminating light, transmitted through the illuminating optical system 202, is in a state of polarization in which the electrical vector is oscillated along a direction perpendicular to the drawing sheet, that is, in a state of S-polarized light with respect to the reflecting surface of a dichroic mirror reflecting the red light. That is, the illuminating light, emitted by the illuminating optical system 202, has only its red light component deflected 90° in its proceeding direction, by the dichroic mirror 203 reflecting the red light. This red light component then is reflected by a mirror 204 to fall on a polarizing beam splitter (PBS) for red light 210.

The red light beam, incident on the PBS 210, has only its S-polarized component reflected by a dielectric film 210*a* of the PBS 210 to fall as incident polarized light on a reflection type TN liquid crystal panel 213 for red light. The illuminating light, reflected by this reflection type TN liquid crystal panel 213 for red light 213 as it is modulated in its state of polarization, again falls on the dielectric film 210*a* of the PBS 210 where it is detected so that only the P-polarized light is transmitted therethrough. Thus, polarization modulation is changed to luminance modulation. The illuminating light, now changed to the luminance modulation, falls on a cross-dichroic mirror 209.

The illuminating light, transmitted through the dichroic mirror 203, reflecting the red light, falls on a next arranged dichroic mirror 205 reflecting the green light. This dichroic mirror 205 reflects only the green light, while transmitting the remaining blue light component therethrough. The so separated green and blue light components have only the respective S-polarized light components reflected by the PBS 211 and the PBS 212, as with the red light, described above, so as to fall on a reflection type TN liquid crystal panel for green light 214 and on a reflection type TN liquid crystal panel for blue light 215, respectively.

The illuminating light, reflected by the reflection type TN liquid crystal panel for green light 214 and by the reflection type TN liquid crystal panel for blue light 215, as it is modulated in the state of modulation, again falls on dielectric films 211*a*, 212*a* of the PBS 211 and the PBS 212, respectively, where the light is detected to transmit only the P-polarized light to change the modulation from polarization modulation to luminance modulation. The outgoing light beam, now changed to luminance modulation, falls on a cross-dielectric prism 209.

In this image display device, the red, green and blue light components, modulated by the reflection type TN liquid crystal panels 213 to 215 for respective colors, depending on the displayed image, are synthesized in the cross-dielectric prism 209 to fall on a projection optical system 208 to form an image on a screen 216.

[4] Illuminating Device for Reflection Type Spatial Light Modulator

As the illuminating device for the reflection type spatial light modulator, there is an illuminating device described in Japanese Laying-Open Patent Publication H-9-189809, and shown herein in FIGS. 3 and 4. In this illuminating device, the readout light, radiated from an illuminating light source, not shown, falls on hologram color filters 303*r*, 303*g* and 303*b*, via a coupling prism 305 and a glass substrate 304, as shown in FIG. 3.

It should be noted that the hologram color filters 303*r*, 303*g* and 303*b* are volume hologram lenses for red light, green light and for blue light, respectively, and are each formed by layered micro-sized lenses for respective colors, each being of approximately a size corresponding to a pixel size and each having an interference fringe burned on laser light exposure at the outset. The 'size corresponding to a pixel size' means that three pixels, namely a pixel of R (red), a pixel of G (green) and a pixel of B (blue), are assorted into a set. The hologram color filters 303*r*, 303*g* and 303*b* converge the red, green and blue light components in the spectrum of the readout light on associated color pixel electrodes 313*r*, 313*g* and 313*b* on a pixel electrode layer 313, respectively, through a cover glass 302 of a reflection type liquid crystal panel, a common electrode 318, a film of orientation 317, a liquid crystal layer 316, a film of orientation 315 and a dielectric mirror film 314.

These hologram color filters 303*r*, 303*g* and 303*b* exhibit dependency on polarization characteristics of the incident light. That is, of the incident light on the hologram color filters 303*r*, 303*g* and 303*b*, mainly the S-polarized light is diffracted, such that the P-polarized light is lower in diffraction efficiency than the S-polarized light. The reason is that, by strict solution of the 'coupled wave theory', there is produced a difference between the diffraction efficiency of TE (S-polarization) and that of TM (P-polarization) if, in the case of the thicker reflection type hologram, a value $t/\hat{}$ is 1 to 5, where t is a hologram thickness and $\hat{}$ is a pitch of the interference fringe in the hologram, as shown in FIG. 4, such that the S-polarization is larger than the P-polarization by approximately 45% at the maximum than the S-polarization. For reference, see M. G. Moharam and T. L. K. Gayload: Rigorous Couple-Wave Analysis of Planar Grating Diffraction, J. Opt. Soc. Am. 71, 811–818 (1977), M. G. Moharam and T. K. Gayload: Rigorous Couple-Wave Analysis of Grating Diffraction E-Mode Polarization and Losses, J. Opt. Soc. Am. 73, 451–455 (1983).

In the readout light, obliquely incident on the hologram color filters 303*r*, 303*g* and 303*b*, mainly the light of the S-polarized component, is diffracted and falls perpendicularly on the liquid crystal layer 316. In this illuminating light, the light reflected as its direction of polarization is modulated 90° (P-polarized component) exits the hologram color filters 303*r*, 303*g* and 303*b* perpendicularly without undergoing scarcely any diffraction because of the low diffraction effects.

The illuminating light, reflected by the dielectric mirror film 314, falls on a projection lens, not shown, whereby the light forms an image on a screen, not shown.

[5] Polarization Selective Holographic Optical Device

There are a number of techniques for realization of the polarization selective hologram optical device. As disclosed for example in U.S. Pat. No. 5,161,039, there is a hologram optical device comprised of a mixed material of a photo-curable resin or a thermosetting resin with a liquid crystal material, sandwiched and sealed between a pair of glass plates.

This hologram optical device is prepared by the following process. First, the laser light is subjected to interference on a panel having the aforementioned mixed material sealed therein. The interference fringes so produced are formed by many photons being present in a light portion and by only a lesser amount of photons being present in a dark portion. In the portion with a high photon energy, that is in the light portion of the interference fringes, the resin is cured and coalesces under the light or thermal energy, as a result of which two areas, namely a resin layer and a liquid crystal layer, are formed, with the liquid crystal material being left in the dark portions of the interference fringes.

The operating principle of the polarization selective holographic optical device, thus formed, is now explained. Of the two areas, formed as described above, the resin layer is optically isotropic, whereas the liquid crystal area is anisotropic, that is it exhibits birefringence. On the other hand, the refractive index of the resin layer n1 is approximately equal to the refractive index n0 of the liquid crystal layer. Thus, in the light incident on this holographic optical device, the light the direction of polarization of which corresponds to the ordinary light ray of the liquid crystal layer, experiences but little difference in the refractive index between the resin layer and the liquid crystal layer, so that the phenomenon of diffraction is manifested only on extremely rare occasions. Conversely, the polarized light component, the direction of polarization of which is perpendicular to the ordinary light ray of the liquid crystal layer, is subjected to periodic refractive index modulation, due to difference between the refractive index n1 of the resin layer 1 and the refractive index of the extraordinary light ray ne, thus producing diffraction effects.

Recently, researches in holographically-formed polymer dispersed liquid crystals H-PDLC, obtained on mixing monomers undergoing optical polymerization and liquid crystal molecules together in order to form interference fringes by a holographic technique, are proceeding briskly.

This is a technique derived from the optically induced phase separation 'PDLC' as discovered towards the middle of eighties (for reference, see Crawford G. P. and Zumer S., in Liquid Crystals in Complex Geometries, Ulor and Francis, London (1996)). The technique of preparation and the operating principle of this H-PDLC are hereinafter explained.

First, a mixture of e.g., liquid crystal molecules, a monomer (pre-polymer), sensitizing dyestuffs and a reaction initiator are sandwiched between a pair of glass plates and sealed in situ. The resulting assembly is exposed to interference fringes formed by the laser light. Then, in the light area of the interference fringes, photopolymerization is initiated to turn the monomer into a polymer. The result is that distribution in the monomer concentration is produced in the light and dark portions of the interference fringes to cause monomer migration from the dark area to the light area. Thus, there is produced, on phase separation, a periodic structure, comprised of a light area rich in polymer concentration and a dark area rich in liquid crystal molecules. As the next stage, the liquid crystal molecules are arrayed at right angles to the polymer phase. Although the mechanism of this phenomenon is not known precisely, a variety of pertinent researches are now going on (see, for example, C. C. Bowley, A. K. Fontecchio, and G. P. Crawford. Proc. SID XXX, 958 (1999)).

Subsequently UV light is illuminated to carry out a fixing process. With the holographic optical device, thus produced, as with the above-mentioned holographic optical device disclosed in U.S. Pat. No. 5,161,039, the refractive index of the polymer layer is approximately equal to the refractive index for the ordinary light ray of the polymer layer, while the refractive index of the polymer layer differs from the refractive index for the extraordinary light ray of the polymer layer, so that the optical device operates as a polarization selective holographic optical device.

[6] Techniques of Application of Holographic Optical Device

The conventional instances of application of the holographic optical device is now explained. Among the instances of application, there are an optical switch, a reflecting plate for an image display device and a polarization converter for a projection type image display device. These are now explained specifically.

[6-1] Optical Switch

An instance of application of the holographic optical device, as an optical switch, is explained with reference to FIGS. 5A and 5B. This holographic optical device is comprised of a hologram layer, having areas of a high molecular material 425 alternately layered with areas of a positive nematic liquid crystal material 424 (a nematic liquid crystal material in the form of a refractive index ellipsoid having its long axis coincident with the long axis of the liquid crystal molecule), and a pair of glass plates having transparent electrodes 422, 423 and which are arranged for sandwiching the hologram layer in-between, as shown in FIG. 5A, as described in Japanese Laying-Open Patent Publication H-5-173196.

In the absence of an electrical voltage across the transparent electrodes, as shown in FIG. 5A, the nematic liquid crystal material (liquid crystal molecules) 424 is oriented perpendicularly to the high molecular material 425, so that diffractive effects are produced by periodic variations in the refractive index as concerns the incident light of the orientation of polarization which becomes the extraordinary light with respect to the nematic liquid crystal material 424.

On the other hand, as shown in FIG. 5B, if the voltage is applied across the transparent electrodes 422, 423 to render the long axis of the nematic liquid crystal material 424 parallel to the high molecular material 425, the incident light of the orientation of polarization which acts as the extraordinary light with respect to the nematic liquid crystal material 424 in FIG. 5A becomes the ordinary light with respect to the nematic liquid crystal material 424 to produce no difference in the refractive index with respect to the high molecular material 425, so that no phenomenon of diffraction is produced.

By the above principle, the holographic optical device is able to operate as a light switch by controlling the applied voltage.

[6-2] Reflecting Plate for Image Display Device

By way of another instance of application of the holographic optical device, as the reflecting plate for image display device, a light beam 504 incident from outside to a direct viewing reflection type liquid crystal panel 502 is reflected by a holographic reflecting plate 503 in an orientation 506 different from the regular reflecting direction to display an image with optimum contrast, as reflected light 505 from the surface of the direct viewing reflection type liquid crystal panel 502 is prevented from falling on a pupil 507 of a viewer, as shown in FIG. 6 and as disclosed in Japanese Laying-Open Patent Publication H-9-138396. Meanwhile, the hologram in this case may not be a polarization type hologram.

[6-3] Polarization Converter for Projection Type Image Display Apparatus

In an instance of application of the holographic optical device to a polarization converter for a projection type image display device, the illuminating light radiated from a light source 610 is radiated as a substantially collimated light beam in one direction by an reflection plate 612 processed e.g., with vapor aluminum deposition, as shown in FIG. 7 and as disclosed in Japanese Laying-Open Patent Publication H-8-234143. The illuminating light is diffused after transmission through a diffuser 615 to fall on a lenticular array 616, in order to reduce brightness fluctuations of the illuminating light on a liquid crystal display (LCD) 614 and in order to improve the illumination efficiency based e.g., on the rectangle conversion function proper to the lenticular array 616.

The illuminating light then falls on a transmission type polarization selective holographic optical device 618. By the above-described function of the transmission type polarization selective holographic optical device 618, the respective components of the P-polarized light and the S-polarized light are separated from each other depending on the angle of incidence. The illuminating light then falls on a patterned half wave plate array 620. In this half wave plate array 620, the component of orientation of polarization of the P-polarized light or the S-polarized light of the illuminating light, which is perpendicular to the orientation of the incident polarized light on the LCD 614, traverses the patterned half wave plate part of the half wave plate array 620 to change the orientation of polarization by 90°.

With this holographic optical device, it is intended to improve the utilization efficiency of the illuminating light radiated by the light source 610.

In connection with the above-described image display device and the image display apparatus, the problem to be tackled by the present invention is as follows.

(1) First, if the polarization beam splitter PBS is used for illuminating the reflection type spatial light modulator, as in a projection type image display apparatus employing the reflection type spatial light modulator, shown in FIG. 2, this PBS is of a cubic form having a side longer than the long side of the image display part of the reflection type spatial light modulator, so that the distance between the reflection type spatial light modulator and the projection optical system, that is the back-focus of the projection optical system, cannot be reduced. If the back-focus is prolonged, it becomes difficult to reduce the F-number, that is, to obtain a bright lens. So, with the present image display apparatus, the illuminating light emitted from the light source is low in utilization efficiency.

Moreover, with the present image display apparatus, employing the PBS, it is difficult to reduce the size of the apparatus, while it is difficult to reduce the weight of the apparatus because this PBS is formed of glass. Since this PBS needs to be formed of a high quality glass material of low birefringence and thermal distortion, and a multi-layered dielectric film is used for separating the P-polarized light from the S-polarized light, it is a costly material, such that it is difficult to lower the production cost of the entire image display apparatus. On the other hand, with the image display apparatus, formed using this PBS, it is difficult to achieve image display with high contrast, high uniformity and high color reproducing characteristics.

(2) As means for overcoming the above-described problem, there is proposed an illuminating apparatus for a reflection type spatial light modulator not employing the PBS, as shown in FIG. 3. However, the image display apparatus, shown in FIG. 3, suffers from the following problem: That is, since a holographic optical device 303 provided on the window surface side (incident/outgoing side) of the reflection type spatial light modulator is not a polarization selective holographic optical device, but is a polarization dependent holographic device, the light utilization efficiency is not optimum.

It is because this holographic optical device is not provided with a layer showing birefringence characteristics in its layer forming a periodic structure of the fluctuations in the refractive index, so that it is impossible to reduce the refractive index of the P-polarized light or the S-polarized light to zero.

Moreover, in this image display apparatus, such a technique is proposed in which, in order to suppress the diffraction efficiency of the P-polarized light, used as the illuminating light for image demonstration to as low a value as possible to prohibit the light from being returned again on diffraction towards the illuminating light source, the S-polarized illuminating light, diffracted by the holographic optical device, is caused to fall on the reflection type spatial light modulator from an oblique direction relative to the perpendicular direction to differentiate the angle of re-incidence of the reflected light converted into the p-polarized light on the holographic optical device from the angle of incidence at the time of first incidence to set a state not in meeting with the conditions of diffraction.

However, in this case, since the reflected light from the reflection type spatial light modulator is radiated at an angle relative to the perpendicular direction to collapse the telecentricity, there arises the necessity in a routine co-axial projection optical system for increasing the image cycle of the optical system in order to prevent the efficiency from being lowered. The increased image cycle of the optical system leads to an increased size and cost of the apparatus. Moreover, if, in the routine reflection type spatial light modulator, the incidence angle of the light ray deviates from the perpendicular direction, contrast is deteriorated in many cases. So, in this image display apparatus, high contrast image display cannot be achieved.

Before tackling this problem, there is encountered a problem that, in the present image display apparatus, it is extremely difficult to set a state in which the P-polarized component be not in meeting with the condition of diffraction. That is, in the present image display apparatus, the center of the hologram lens of the hologram color filter is offset by approximately 0.5 times the hologram lens size from the center of the pixel electrode of the reflection type spatial light modulator. If, in this case, an angle of incidence θin of the main light beam of each hologram lens is $$\theta in = \text{ArcTan}\,[r/Lp]$$

where r is the radius of the hologram lens and Lp is the distance in the direction of thickness between the hologram lens and an aluminum pixel electrode of the reflection type spatial light modulator, Lp=0.7 mm (supposing that the cover glass thickness is 0.7 mm) and r=10 μm (supposing that the size of one pixel with R, G and B combined together is 20 μm), θin is given by $$\theta in = \text{ArcTan}\,[r/Lp] = 0.82°.$$

This angle is only small as compared to the angle of diffusion of the illuminating light incident on the hologram color filter (on the order of ±10°), such that, if the angular difference between the P-polarized light and the S-polarized light is as small as 1.64° (=0.82×2), it is extremely difficult to distinguish the two based on the angle of incidence.

If the range of the allowed diffraction angle of the hologram color filter is 1° to 2°, the polarization separation characteristics are improved, however, the light volume of the illuminating light with the angle of diffusion of ±10° actually diffracted and which may be effectively used is extremely small. Therefore, this solution cannot be said to be realistic.

On the other hand, if desired to exploit the polarization dependency of the holographic optical device, it is necessary to set the S-polarized light so that it will be the incident light beam, that is diffracted light. For preventing the utilization efficiency of the illuminating light or the contrast of the displayed image from being lowered, additional members or optical devices are needed, thus leading to increased production cost and weight of the overall device.

The reason is as follows: Referring to FIG. 8, in an initial state in which, in the process of progressively increasing the hologram thickness from zero sufficient polarization dependency is achieved, the diffraction efficiency with respect to the S-polarized light is increased, whilst that with respect to the P-polarized light is decreased. Subsequently, the hologram thickness d may be increased to increase the diffraction efficiency with respect to the P-polarized light and to decrease that with respect to the S-polarized light.

However, the wavelength dependency and the incidence angle dependency of the diffraction efficiency of the transmission type hologram are increased with the increased hologram thickness. That is, the tolerance of the deviation from a preset wavelength and from a preset incidence angle of the laser on light exposure of the hologram (the allowance in procuring the diffraction efficiency) is decreased to lower the light utilization efficiency.

FIGS. 9 and 10 show the incidence angle dependency of the diffraction efficiency in case the holographic optical device prepared under the conditions of the incidence angle of the object light of 0°, incidence angle of the reference light of 60°, an average refractive index of the hologram of 1.52, the modulation factor of the refractive index of the hologram layer of 0.05, the thickness of the hologram layer of 5 μm and the exposure light wavelength of 532 nm, is read out at a reproducing wavelength of 532 nm. FIGS. 9 and 10 show the results as calculated for the thickness of 6 μm and for the thickness of 18 μm, respectively. The incident polarized light is here assumed to be the S-polarized light. It may be seen from above that the incident polarized light in actuality needs to be S-polarized light.

Meanwhile, if the light proceeds from a medium of low refractive index into a medium of a high refractive index, its surface reflectance exhibits polarized light dependency, as shown in FIG. 11. By such polarized light dependency, the surface reflectance in case the P-polarized light and the S-polarized light are incident on the glass with a refractive index of 1.5 in air is larger at all times for the S-polarized light than that for the P-polarized light. Also, if the incidence angle meets tan θ=n(=1.5), that is the Brewster's angle, herein 56.3°, the reflectance of the P-polarized light is zero. At this time, the reflectance of the S-polarized light is on the order of 15%.

This means that, if the light ray is caused to fall obliquely on the glass substrate of the holographic optical device, by way of off-axis incidence, the light utilization efficiency is higher in case the incident light is the P-polarized light. With the above-described holographic optical device, in which the incident light needs to be the S-polarized light, a coupling prism 305 is used to prevent the efficiency from being lowered, as shown in FIG. 3. However, if this coupling prism is used, the number of the component parts and the weight as well as the cost of the apparatus are increased. Moreover, if the coupling prism is used, surface reflectance cannot be reduced to zero and hence it is not possible to prevent generation of stray light or the deterioration in the contrast of the displayed image reliably.

Also, if the coupling prism is used, the incidence of the light ray from illuminating means on a hologram layer is not other than the angle of view of the light ray radiated by the illuminating means. In the case of a typical projector optical system, the angle of view of the light ray radiated from the illuminating means is on the order of ±10°. It is not that easy to maintain the diffraction efficiency of the holographic optical device at a high constant value.

If the illuminating light from a lamp light source is converged to illuminate image display devices of a certain area, the angle of incidence u' becomes small in inverse proportion to the size y' of the image display device, as shown by Lagrange-Helmholtz invariant of the following equation:

$$ynu = y'n'u' \text{(Lagrange-Helmholtz invariant)}$$

where y is an image height from the optical axis, n is the refractive index of the medium and u is the angle of tilt of the light ray.

The above equation indicates that the value of the product ynu is invariable on any plane of the optical system. That is, if the product ynu of the left side assumes a finite value, and the image display device is reduced in size, the angle of incidence to the image display device is increased further. This represents a factor all the more unfavorable in realizing the holographic optical device of high efficiency. As may be seen from FIG. 9, the diffraction efficiency is lowered to 25% and to approximately 0% if the angle of incidence deviates by +10° and by −10° from the angle of incidence which gives the high peak value.

Also, in the above-described image display apparatus, the holographic optical device is used at all times as a color filter. Thus, in this image display apparatus, such a step is needed in which micro-sized lenses of a size approximately equal to the pixel size and these micro-sized lenses are brought into correct registration with respective pixels of the liquid crystal display device, thus increasing the production difficulty and the production cost.

Moreover, the above-described image display apparatus is not able to cope with a configuration of so-called field sequential color technique or with a configuration of using plural reflection type image display devices from one color light to another.

In the image display apparatus employing the above-described hologram color filter, spectral separation and collection need to be performed for the incident light from one color light to another, so that color reproducibility or high definition of the displayed image are in a relationship of trade-off with respect to the utilization efficiency of the illuminating light.

This relationship is hereinafter explained. Referring to FIG. 12, the tolerance value of the outgoing angle Δθi of the main light beam from the hologram lens, for which the illuminating light is converged on one color pixel, may be found from the following equation:

$$\Delta\theta i = \text{ArcTan}\,[r/Lp]$$

where Lp is the distance between a hologram color filter 700 and a pixel electrode 702 of the reflection type spatial light modulator 701, and 2r is the size of one color pixel electrode, as shown in FIG. 12. If Lp=0.7 mm and r=±5 μm, Δθi=±0.4°.

It is noted that the angle of incidence θc by the interference fringe of the hologram and the outgoing angle θi on diffraction are inter-related by the following equation:

$$(\sin\{\theta s\} - \sin\{\theta r\})/\lambda = (\sin\{\theta i\} - \sin\{\theta c\})/\lambda c$$

where θs is an incidence angle of the object light at the time of manufacture of the hologram, θr is a incidence angle reference light at the time of manufacture of the hologram, λ is the design wavelength of the hologram and λc is the reproducing wavelength.

From the foregoing, if θs=0°, θr=60°, λ=550 nm, λc=550 nm and θi=±0.4°, θc is 60±0.8° C., thus indicating that the tolerance of the angle of incidence to the hologram color filter of the illuminating light beam is extremely narrow. On the other hand, if θs=0°, θr=60°, λ=550 nm, θc=60° and θi=±0.4°, Δλc=550±4.5 nm, thus indicating that the tolerance of the incident wavelength to the hologram color filter of the illuminating light is extremely narrow.

From the foregoing, high parallelism and a narrow wavelength range are demanded of the illuminating light incident on the hologram color filter, such that, with the use of a routine lamp light source, the light utilization efficiency is lowered significantly owing to the fact that the light radiating part has a finite size on the order of 1 mm and that the light emitting wavelength range is broad. If conversely the light utilization efficiency is to be increased, there is no alternative but to increase the pixel size or to allow for light leakage to the neighboring color pixel. However, the definition of the displayed image and the color purity and reproducibility are lowered in the former and latter measures, respectively.

In the above-described image display apparatus, the holographic optical device cannot be used as a reflection type. If the holographic optical device is used as the reflection type such that the difference between the diffraction efficiency of the P-polarized light and that of the S-polarized light is to be e.g., 30% or higher, d/^, where d is the hologram thickness and ^ is the pitch of the interference fringes, needs to be on the order of 1.0 to 3.0. For reference, see M. G. Moharam and T. K. Gayload: Rigorous Coupled-Wave Analysis of Planar Grating Diffraction, J. ODt. Soc. Am. 71, 811–818, 1977.

Since ^=λ/|2 sin [(θs−θr)/2]| where θs is an angle of incidence of the object light and θr is an angle of incidence of the reference light, the minimum value of (θs−θr) is 90°. At this time, |2 sin [(θs−θr)/2]| assumes a minimum value of 1.41. If λ=0.5 μm, ^ assumes a maximum value of 0.35 μm, such that the thickness of the hologram d satisfying d/^=1.0 to 3.0 is 1 μm at the maximum. It is extremely difficult to prepare so thin a hologram layer.

In the above-described various application techniques of the holographic optical devices, there lacks such an application technique in which the illuminating light is incident from an oblique direction to illuminate the reflection type spatial light modulator at a high efficiency.

As a virtual image display optical system, employing the reflection type spatial light modulator, there is such a configuration in which a reflection type spatial light modulator 836, an illuminating light source 834 and a reflecting mirror 842 are arranged in the vicinity of a forming surface of the polarizing beam splitter 848, as shown herein in FIG. 13 and as disclosed in U.S. Pat. No. 5,596,451.

However, in this optical system, a portion 860 of the illuminating light directly reaches an area of observation 846 of the viewer, by the polarizing beam splitter 848, without reaching the reflection type spatial light modulator 836, as may be seen from FIG. 13. This illuminating light may be incident as noise on a pupil 824 of the viewer to raise a fundamental problem of lowering the contrast of the image information displayed by the reflection type spatial light modulator 836.

Moreover, with the present optical system, the entire optical system is of a cubic shape, thus increasing its thickness. If the performance of a dielectric film 864 of the polarizing beam splitter is raised, the production cost is raised. If conversely the dielectric film is lowered in performance, the image is deteriorated in uniformity, especially with pupil movement, due to reflectance of the polarized light by the dielectric film, incidence angle dependency or wavelength dependency of the dielectric film.

For improving this, there is disclosed in Japanese Laying-Open Patent Publication H-11-125791 an image displaying apparatus in which a virtual image displaying optical system is formed using a reflection type spatial light modulator 908 and a free-form surface prism 910, as shown in FIG. 14.

In the image display apparatus, shown herein in FIG. 14, the illuminating light from a light source 912 is directly incident on a reflection type spatial light modulator 908, the reflected light is incident on a third surface 905 of the free-form surface prism 910 to reach the pupil 901 after reflection on the first surface 903 and on the second surface 904 and transmission through the first surface 903 to display a virtual image. This optical system has a drawback that the angle of incidence of the illuminating light on the reflection type spatial light modulator 908 is increased to lower the modulation index of the reflection type spatial light modulator 908 itself to deteriorate the contrast of the displayed image.

On the other hand, an optical system, shown in FIG. 15, in which the illuminating light radiated from the light source 912 through the free-form surface prism 910 is incident on the reflection type spatial light modulator 908 and this reflected light is incident on the free-form surface prism 910 from the thirds surface 905 to reach the pupil 901 after reflection on the first surface 903 and on the second surface 904 and transmission through the first surface 903 to form the virtual image, mainly suffers from the following two problems.

The first problem is as that, if the reflection type spatial light modulator 908 is of the polarization modulation type (phase modulation type), the illuminating light incident on the reflection type spatial light modulator 908 needs to be linear polarized light having a specified orientation of polarization. However, since the free-form surface prism 910 is prepared on injection molding of plastics material, it exhibits birefringence characteristics in its inside. So, the problem is raised that, even if the linear P-polarized light is incident on the free-form surface prism 910, the state of polarization is not maintained, thus deteriorating the contrast of the displayed image. Although this can apparently be evaded by arranging a polarizing plate between the reflection type spatial light modulator 908 and the third surface (refractive surface) 905 of the free-form surface prism 910, the display mode becomes the 'normally white' mode, thus again deteriorating the contract of the displayed image.

The second problem is produced by the illuminating light directly falling on the free-form surface prism 910 operating as an eyepiece optical system. The illuminating light undergoes inner reflection on the optical surfaces 903 to 905 in the inside of the free curved surface prism 910 to produce stray light. A portion of this stray light reaches the pupil 901 of the viewer thus again deteriorating the contract of the displayed image.

That is, with the illuminating optical system, employing a half mirror, as one of the various image display apparatus, so far proposed, the apparatus cannot be reduced in size, whilst the illuminating light is low in exploitation efficiency. With the illuminating optical system employing a polarizing beam splitter, the apparatus cannot be reduced in size, whilst the displayed image is low in uniformity and the production cost is elevated. With the illuminating optical system for directly illuminating a spatial light modulator and with the illuminating optical system for illuminating a spatial light modulator through an optical component formed of plastics, the displayed image is low in contrast.

DISCLOSURE OF THE INVENTION

In view of the above-described status of the prior art, it is an object of the present invention to provide an image display device and an image display apparatus in which the light exploitation efficiency of the illuminating light is high, the apparatus can be reduced in size and cost and in which the displayed image is uniform and high in contrast.

For resolving the above problem, the present invention provides an image display apparatus including a polarization selective holographic optical device for diffracting illuminating light, the device including a plurality of each of two areas having refractive index values exhibiting respectively different incidence polarization orientation dependencies, the areas being layered sequentially alternately, and a reflection type spatial optical modulator for modulating the state of polarization of the illuminating light diffracted by the polarization selective holographic optical device.

In this image display apparatus, the polarization selective holographic optical device, one of two areas of which exhibits refractive index anisotropy, with the other exhibiting refractive index isotropy, is irradiated with the illuminating light at an angle of incidence not less than 30° and less than 90° with respect to a normal line to a light receiving surface thereof for the illuminating light. The polarization selective holographic optical device diffracts a P-polarized light component or an S-polarized light component of the illuminating light to radiate the diffracted light towards the reflection type spatial optical modulator. The polarization selective holographic optical device exhibits the diffraction efficiency of not higher than 10% for the polarized light component of the illuminating light incident a second time thereon after phase modulation by the reflection type spatial optical modulator, which polarized light component has a direction of polarization perpendicular to a direction of polarization of the polarized light component diffracted thereby at the time when the illuminating light is first incident thereon, whereby not less than 70% of the first-stated polarization component is transmitted through the optical device.

The image display apparatus of the present invention includes an image display device of the above type, according to the present invention, a light source for radiating the illuminating light, an illuminating optical system for causing the illuminating light radiated by the light source to be incident on a polarization selective holographic optical device of the image display device, and a projection optical system for projecting the illuminating light through the reflection type spatial optical modulator and the polarization selective holographic optical device of the image display device on a screen.

With the present image display device, the polarization selective holographic optical device, one of two areas of which exhibits refractive index anisotropy, with the other exhibiting refractive index isotropy, is irradiated by the illuminating optical system with the illuminating light at an angle of incidence not less than 30° and less than 90° with respect to a normal line to a normal line to a light receiving surface thereof for the illuminating light. The polarization selective holographic optical device diffracts a P-polarized light component or an S-polarized light component of the illuminating light to radiate the diffracted light towards the reflection type spatial optical modulator. The polarization selective holographic optical device exhibits the diffraction efficiency of not higher than 10% for the polarized light component of the illuminating light incident a second time thereon after phase modulation by the reflection type spatial optical modulator, which polarized light component has a direction of polarization perpendicular to a direction of polarization of the polarized light component diffracted thereby at the time when the illuminating light is first incident thereon, whereby not less than 70% of the first-stated polarization component is transmitted through the optical device. The projection optical system projects the light transmitted through the polarization selective holographic optical device on the screen.

In the image display apparatus of the present invention, there are provided a polarization selective holographic optical device for diffracting the incident light, the device including a plurality of each of two areas having refractive index values exhibiting respectively different incidence polarization orientation dependencies, the areas being layered sequentially alternately, color separation means for separating the illuminating light in a plurality of representing different wavelength range components, an illuminating optical system for causing the illuminating light separated into respective different wavelength range components to be incident on the polarization selective holographic optical device, a plurality of reflection type spatial optical modulators for modulating polarized states of a plurality of representing different wavelength range components of the illuminating light diffracted by the polarization selective holographic optical device, color synthesis means for synthesizing illuminating light portions of respective different wavelength ranges modulated by the plural reflection type spatial optical modulators, and a projection optical system for projecting the illuminating light through the color synthesis means. With the present image display apparatus, the projection optical system projects the illuminating light transmitted through the polarization selective holographic optical device and through color synthesis means on the screen.

The image display apparatus according to the present invention includes wavelength-band-based polarization separating means for separating the states of polarization of respective different first and second wavelength range components of the illuminating light as linear polarized components perpendicular to each other, an illuminating optical system for causing the illuminating light separated into first and second wavelength range components to be incident on the polarization selective holographic optical device, a first reflection type spatial optical modulator for modulating the state of polarization of the first wavelength range component of the illuminating light diffracted by the polarization selective holographic optical device, a second reflection type spatial optical modulator for modulating the state of polarization of the second wavelength range component of the illuminating light transmitted through the polarization selective holographic optical device, and a projection optical system for projecting the illuminating light through the reflection type spatial optical modulator on a screen. The projection optical system projects the illuminating light of the first wavelength range component through the first reflection type spatial optical modulator and the polarization selective holographic optical device and the illuminating light of the second wavelength range component through the second reflection type spatial optical modulator and the polarization selective holographic optical device on the screen.

In the image display apparatus according to the present invention, an optical system for observing a virtual image, designed for guiding the illuminating light through the reflection type spatial optical modulator to the pupil of the viewer, is provided in place of the projection optical system. This optical system for observing a virtual image guides the light transmitted through the polarization selective holographic optical device to the pupil of the viewer.

BRIEF DESCRIPTION OF THE DRAWINGS

FIGS. 1A to 1C are cross-sectional views showing the structure of a conventional image display device (FLC).

BEST MODE FOR CARRYING OUT THE INVENTION

Figure 1C:
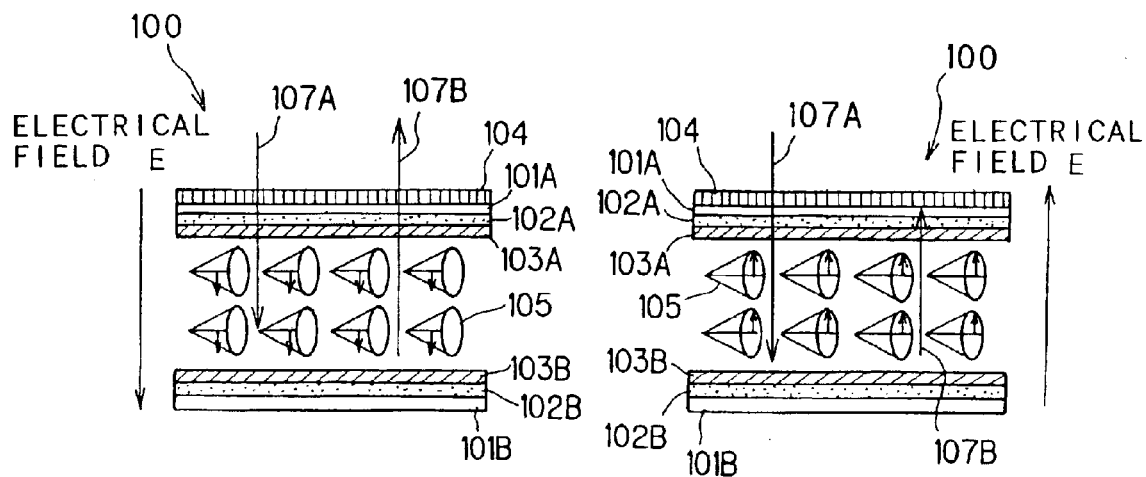
Figure 1C:
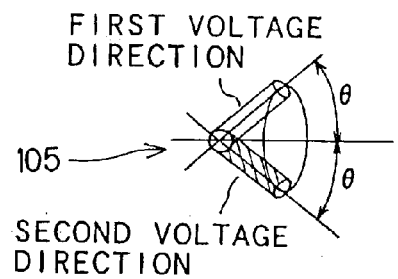
Figure 2:
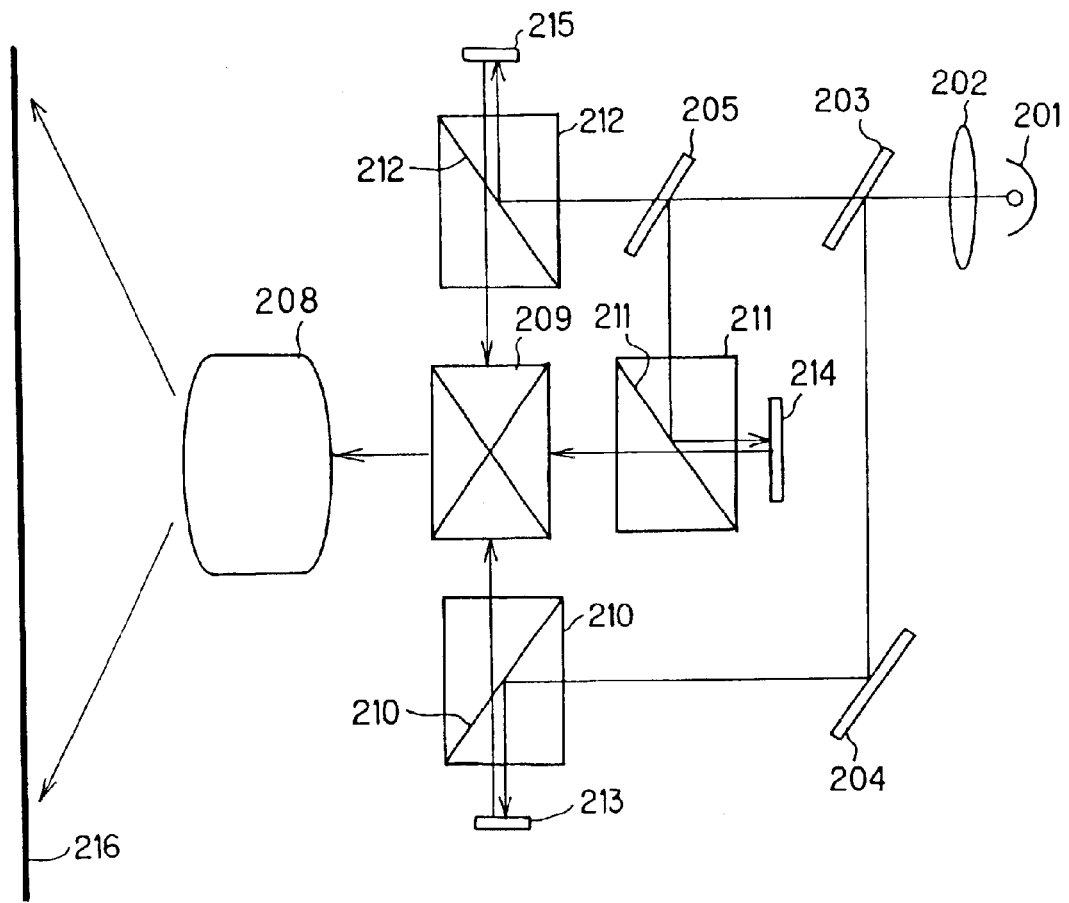
FIG. 2 is a side view showing the structure of a conventional image display apparatus employing a polarizing beam splitter associated with a reflection type spatial light modulator.
Figure 3:
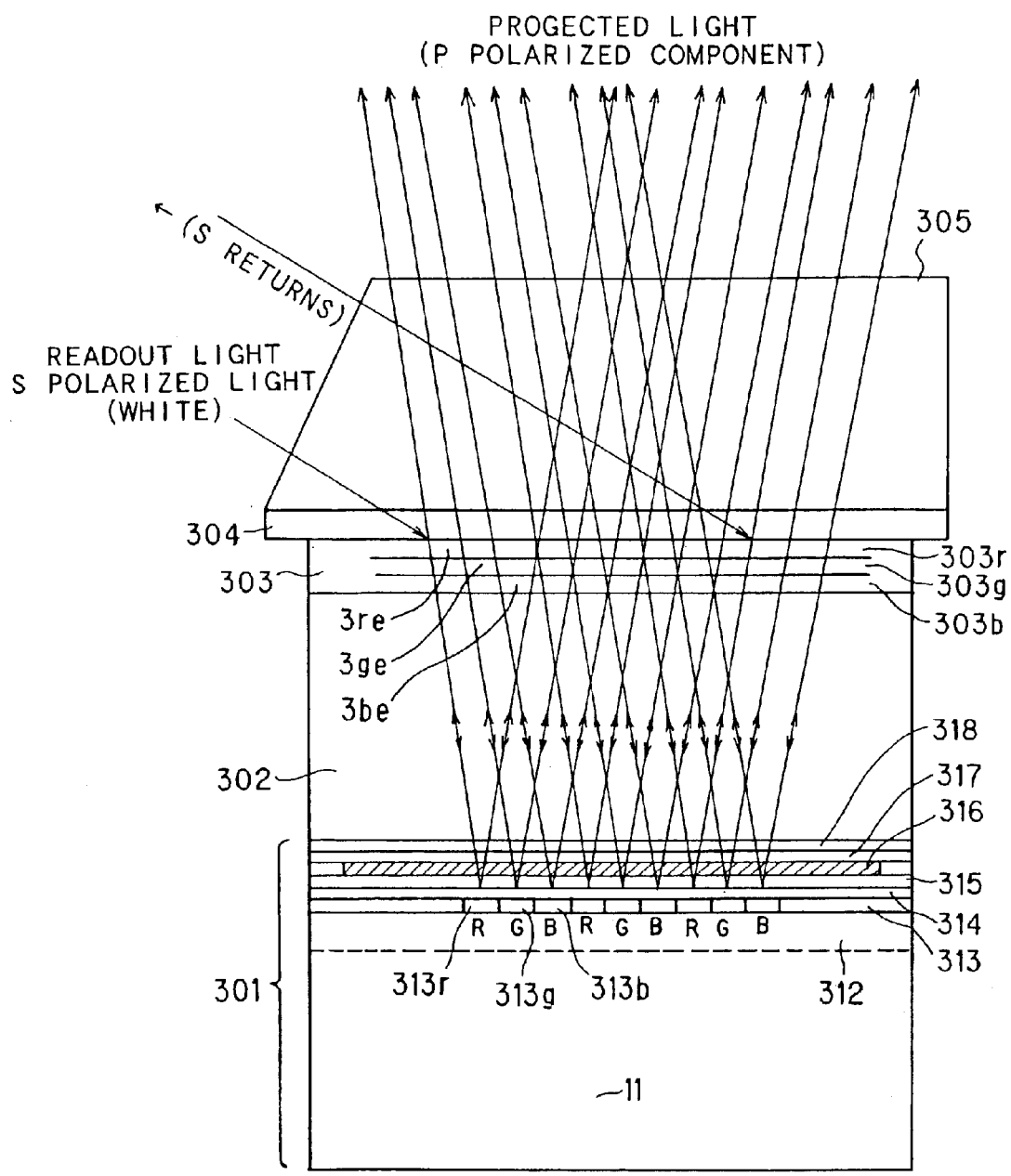
FIG. 3 is a cross-sectional view showing the structure of a conventional image display apparatus employing a hologram lens.
Figure 4:
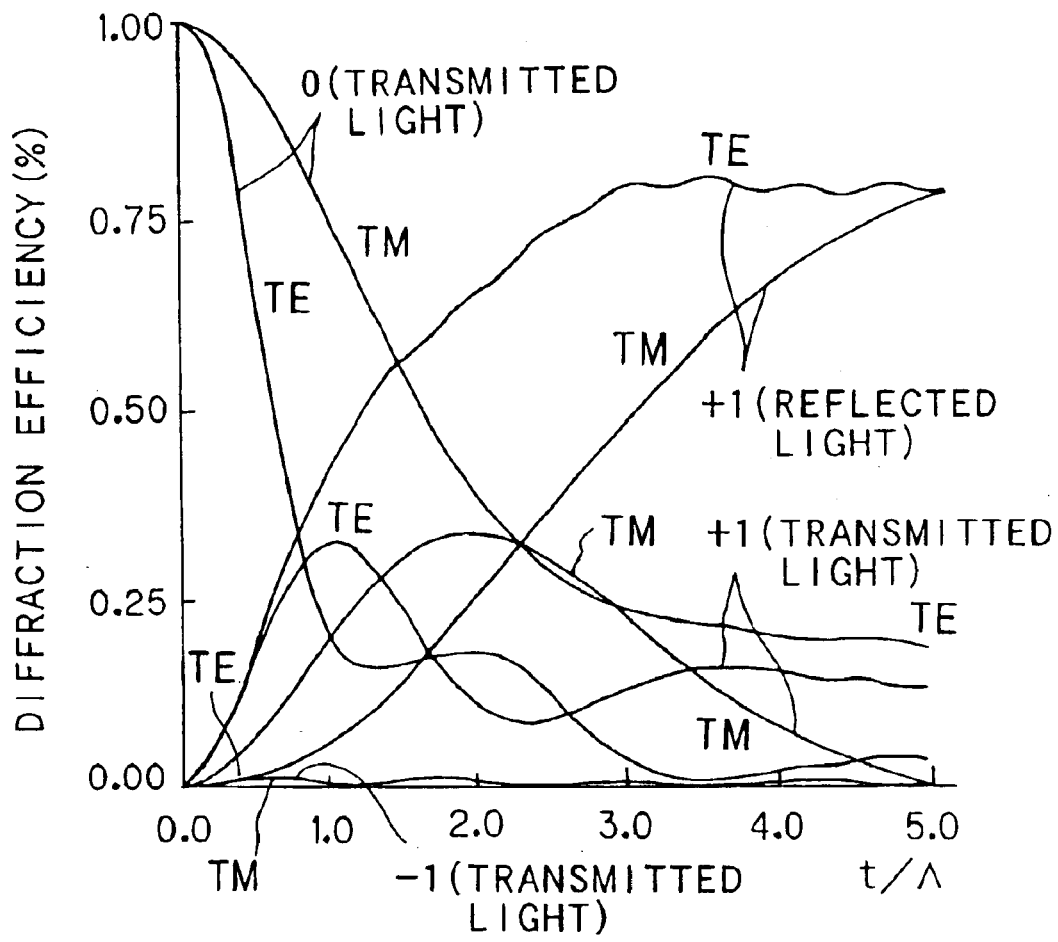
FIG. 4 is a graph showing the diffraction efficiency of a reflection type hologram.
Figure 5A:
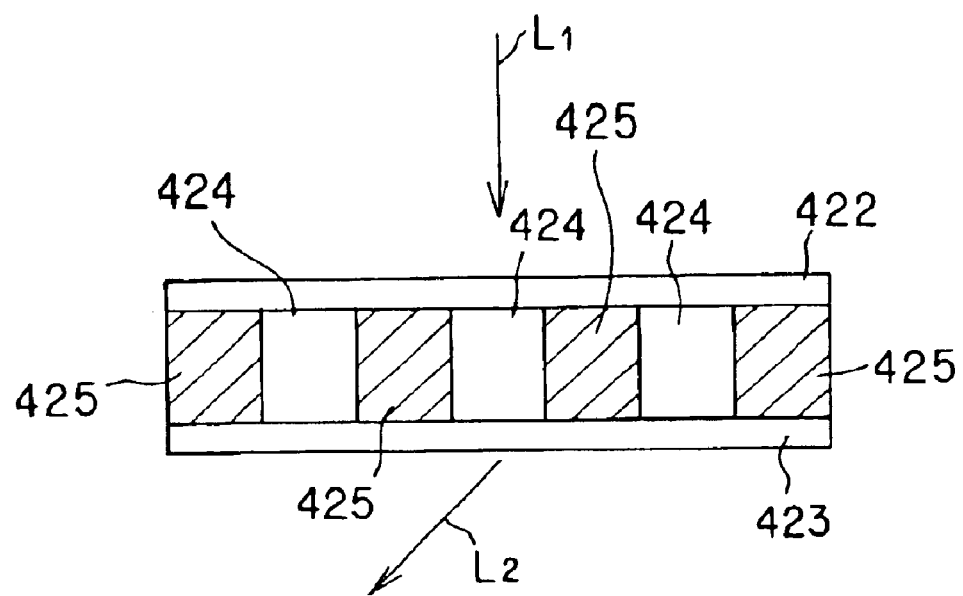
FIGS. 5A and 5B are cross-sectional views showing an instance of application of the holographic optical device to an optical switch.
Figure 5B:
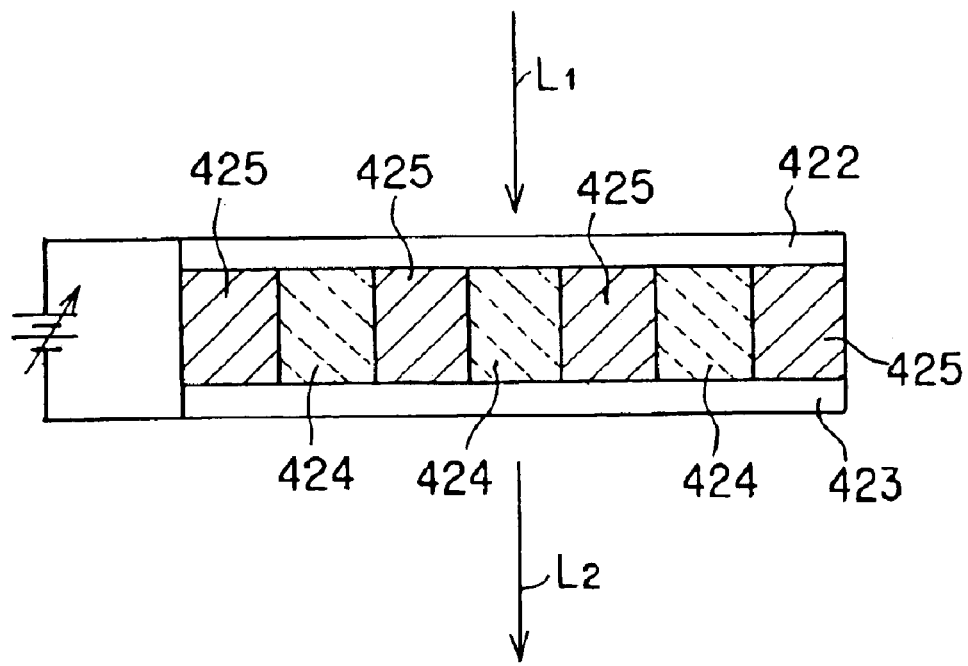
Figure 6:
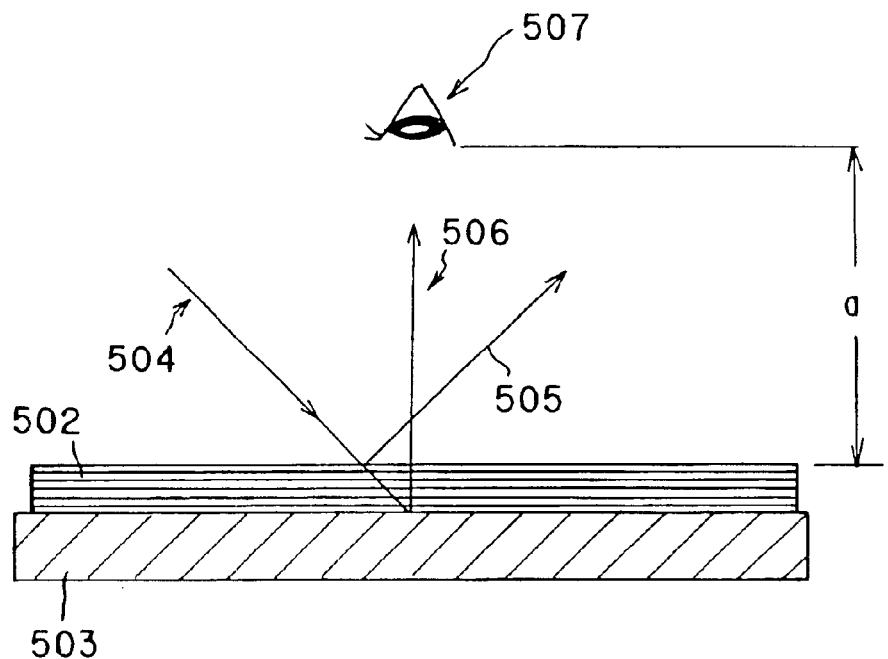
FIG. 6 is a cross-sectional view showing an instance of application of the holographic optical device as a reflecting plate for an image display apparatus.
Figure 7:
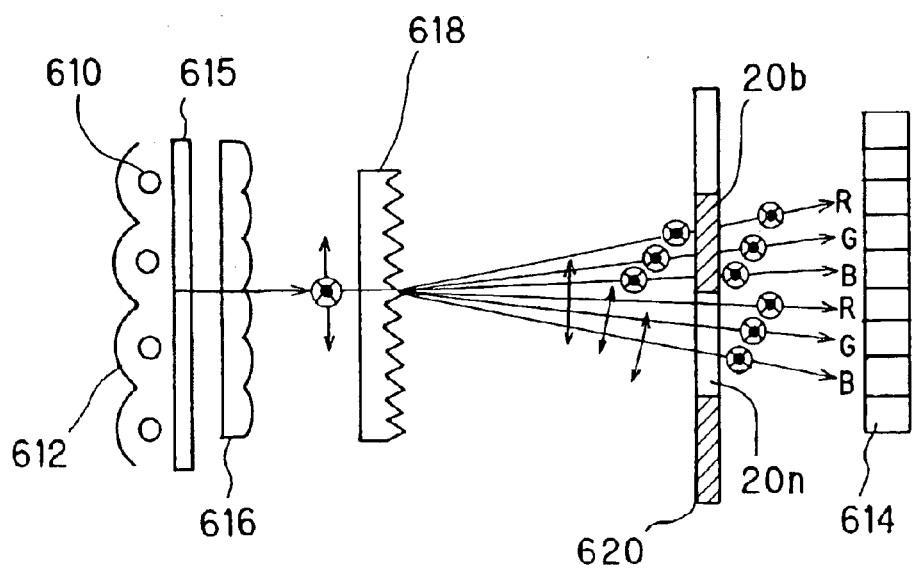
FIG. 7 is a cross-sectional view showing an instance of application of the holographic optical device as a polarization converter for a projection type image display apparatus.

Referring to the drawings, certain preferred embodiments of the present invention will be explained in detail.

[1] Reflection Type Image Display Device Employing Polarization Selective Holographic Image Display Device As an image display device, according to the present invention, such a device having a liquid crystal panel formed of a prepolymer dispersed liquid crystal, referred to below as PDLC, as a polarization selective holographic device, is explained.

Figure 16:
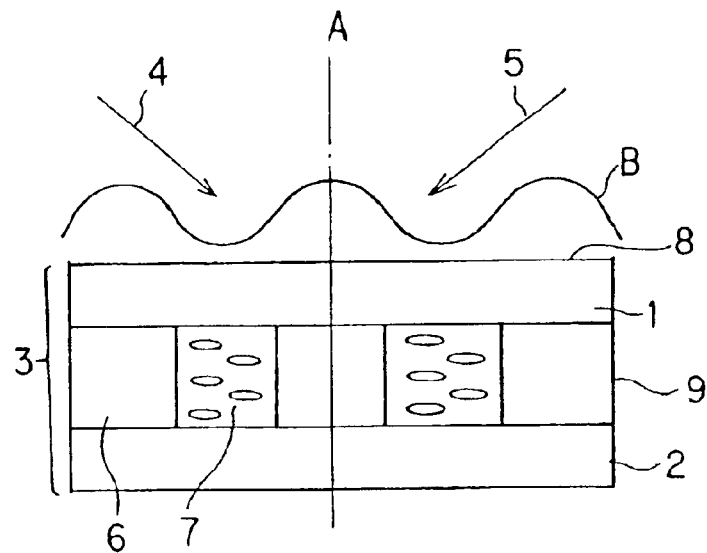
FIG. 16 is a longitudinal cross-sectional view showing the structure of an image display device according to the present invention.

First, referring to FIG. 16, the structure and the production process of a polarization selective hologram optical device, employing the PDLC, are explained. It is crucial that the device temperature be maintained at approximately 60° C. in the course of the production process.

First, a PDLC, comprised of a mixture of a high molecular material, referred to below as prepolymer, prior to undergoing photopolymerization, a TN liquid crystal, an initiator and dyestuffs, is sandwiched between glass substrates 1 and 2. At this time, the weight proportion of the TN liquid crystal amounts to approximately 30% of the entire PDLC. The layer thickness of the PDLC, referred to below as cell gap, is selected at an optimum value between 2 μm and 15 μm in compliance with the specifications of the polarization selective holographic image display device.

For recording interference fringes on the PDLC panel 3, an object light beam 4 and a reference light beam 5 from laser light sources, not shown, are illuminated on a PDLC panel 3 to generate light intensity variations B caused by interference. In light portions of the interference fringes, that is in portions with a large photon energy, the prepolymer in the PDLC undergoes photopolymerization and is thereby turned into a polymer. Thus, the prepolymer progressively supplied from the rim portion and ultimately turned into a polymer is separated into dense areas and sparse areas. In the sparse area, the TN liquid crystal concentration is increased. In this manner, prepolymer areas 6 and liquid crystal areas 7 are formed.

In the present embodiment, the object light beam 4 and the reference light beam 5 are irradiated on the panel from the same surface side thereof, so that the polarization selective holographic image display device produced is of the transmission type. Alternatively, if the object light beam 4 and the reference light beam 5 are irradiated from different surface sides of the panel, a reflection type polarization selective holographic image display device is produced.

Meanwhile, the prepolymer area 6 of the PDLC panel 3, prepared as described above, is isotropic as regards refractive index, that is exhibits refractive index isotropy, with the value of the refractive index being e.g., 1.5. In the liquid crystal area 7 of the PDLC panel 3, TN liquid crystal molecules are arrayed with the long axes thereof substantially at right angles to the boundary surface with respect to the prepolymer area 6. So, the liquid crystal area 7 shows refractive index anisotropy, that is, its refractive index shows incident light orientation dependency. If the reproducing light 5 incident on a light ray incident surface 8 of the PDLC panel 3 is considered, it is the S-polarized light component that becomes the ordinary light.

If the refractive index of the ordinary light nlo in this liquid crystal area 7 is approximately equal to the refractive index np of the prepolymer area 6, for example, less than 0.01, the modulation of the refractive index for the incident S-polarized light component is extremely small, such that the phenomenon of diffraction scarcely occurs. By and large, the difference Δn between the refractive index of the ordinary light nlo and the refractive index of the extraordinary light nle of the TN liquid crystal is on the order of 0.1 to 0.2, so that, even in the case of the reproducing light 5 with the same light incident direction, there is produced difference in the refractive index between the prepolymer area 6 and the liquid crystal area 7 as regards the P-polarized component. Thus, the PDLC panel 3 operates as the phase modulation type hologram, and exhibits diffractive effects.

The above is the operating principle of the polarization selective holographic image display device employing the PDLC panel, referred to below as an 'H-PDLC panel'.

Figure 8:
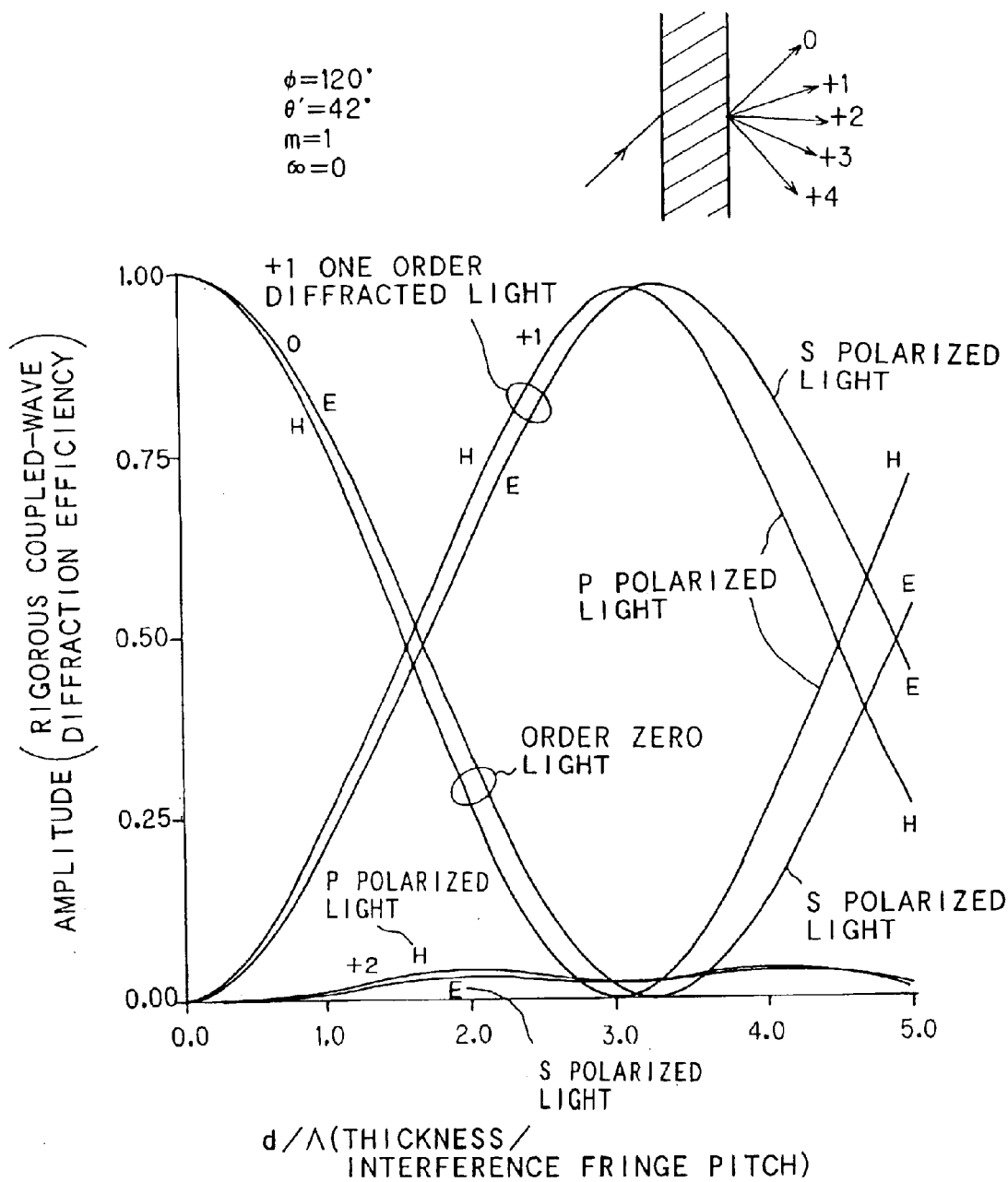
FIG. 8 is a graph showing the relationship between the hologram thickness and the diffraction efficiency (diffraction efficiency of a transmission type hologram by a rigorous solution of the coupled-wave theory).
Figure 9:
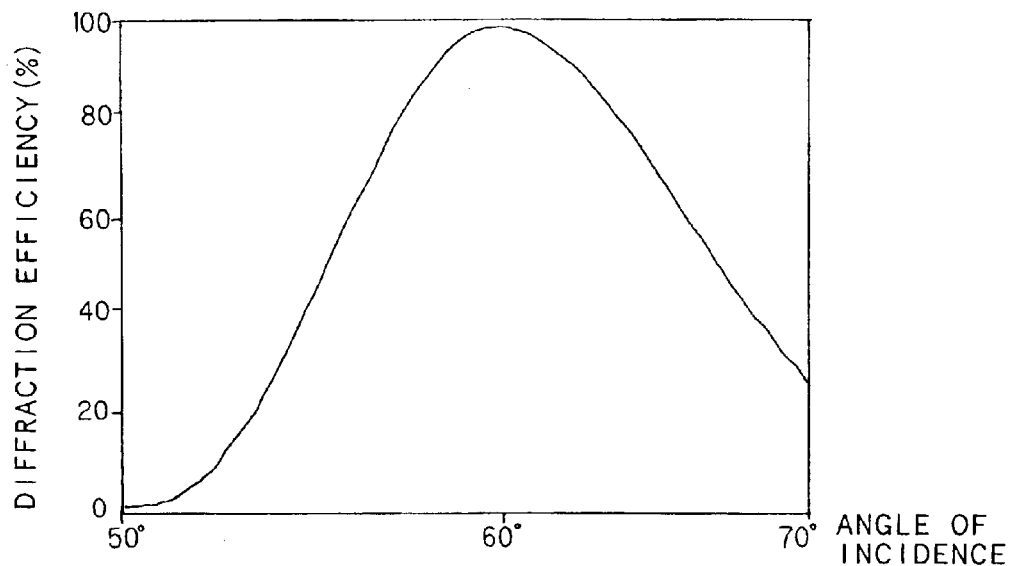
FIG. 9 is a graph showing the incidence angle dependency of the diffraction efficiency in a hologram with a thickness of 6 μm.
Figure 10:
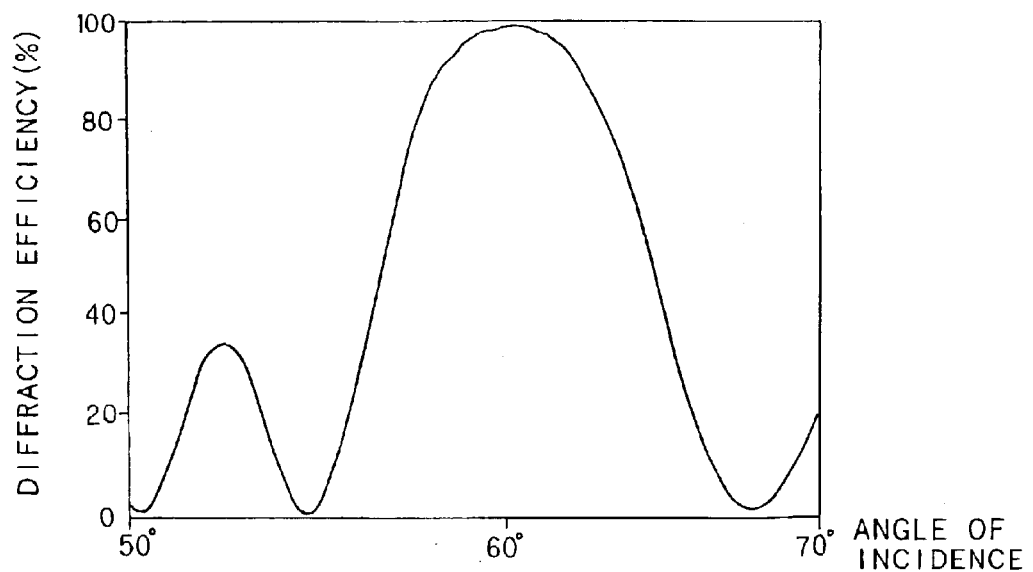
FIG. 10 is a graph showing the incidence angle dependency of the diffraction efficiency in a hologram with a thickness of 18 μm.

The holographic optical device of the present embodiment exploits polarization dependency derived from the coupled wave theory and essentially is not a polarization selective holographic image display device. Thus, in effect, the difference between the diffraction efficiency of the S-polarized light and that of the P-polarized light is on the order of 30 to 50%. Assuming that the diffraction efficiency of the S-polarized light and that of the P-polarized light are 70% and 30%, respectively, the light utilization efficiency is 49% (=70%×70%), even if the loss due to surface reflection or absorption is discounted. For reference, FIG. 8 shows polarization dependency of the diffraction efficiency for a transmission type hologram with an angle of incidence of 42° and the tilt angle of the interference fringe of 120° (see, for reference, M. G. Moharam and T. K. Gaylord, Rigorous Coupled-Wave Analysis of Planar Grating Difference, J. Opt. Soc. Am. 71, 811–818, 1977). It may be seen from this that the difference between the diffraction efficiency of the +1 order S-polarized light and that of the P-polarized light (difference between H corresponding to P-polarized light and E corresponding to S-polarized light in FIG. 8) is approximately 20% in case d/^ is 5.0, where d is a hologram thickness and Λ is the pitch of interference fringes.

[2] Embodiments of the Image Display Device (First to Third Embodiments)

Figure 17:
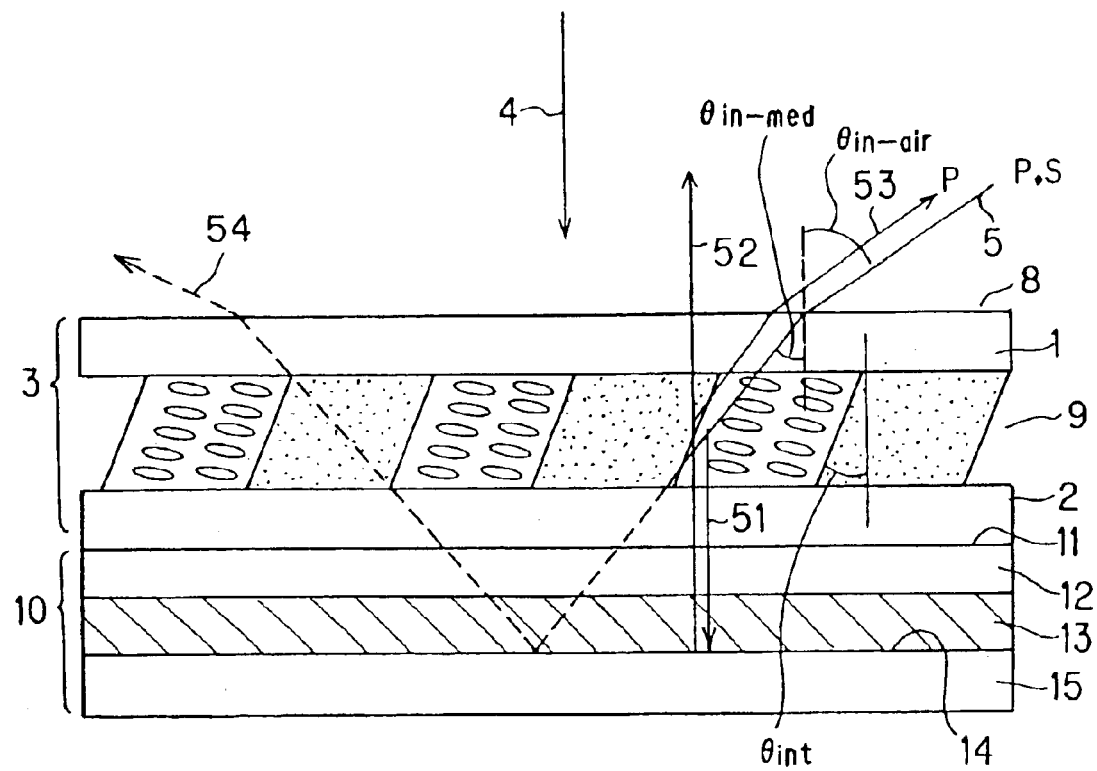
FIG. 17 is a longitudinal cross-sectional view showing the structure of a first embodiment of an image display device according to the present invention.

Referring to FIG. 17, a reflection type image display device, according to a first embodiment of the present invention, is explained. In this image display device, a reflection type FLC liquid crystal panel 10, used as a reflection type spatial light modulator, is optically bonded at an interface 11 to the H-PDLC panel 3, explained by referring to FIG. 16.

In the liquid crystal display device, according to the present invention, the spatial light modulator is a reflection type spatial light modulator for modulating the light reflected by this spatial light modulator. It is a polarization modulation type spatial light modulator that reflects the incident linear polarized light as it rotates the direction of polarization.

The structure and the operating principle of the reflection type FLC liquid crystal panel 10 is the same as the above-described contents explained with reference to FIGS. 1A, 1B and 1C. The H-PDLC panel 3 of the present embodiment is prepared with the object light beam 4 with an angle of incidence of 0° and the reference light beam 5 with an angle of incidence of θin-air, as shown in FIG. 17. The tilt angle θint of the interference fringe at this time is to be found.

If it is assumed that the refractive index of the glass substrate 1 is n gla, whilst the average refractive index of PDLC is also n gla for simplicity, the following equation:

$$n\ gla\ \sin(\theta\text{in-med}) = \sin(\theta\text{in-air})$$

is valid, where θin-med is an angle of incidence in a medium.

If, in this equation, n gla=1.5 and θin-air=60°, θin-med is 35.3°. From this, the tilt angle θint of the interference fringe is given by $$\theta int = \theta in\text{-}med/2 = 17.7°.$$

The operating principle of this image display device is now explained. The reproducing light 5, containing both the P-polarized light and the S-polarized light, is incident on the glass substrate 1 of the H-PDLC panel 3 at an angle of incidence θin-air. The incident light, refracted by the glass substrate 1, then falls on a hologram layer 9 at an incidence angle θin-med.

On the hologram layer 9, the P-polarized light component is diffracted, as described above, to fall as incident light 51 substantially perpendicularly on the reflection type FLC liquid crystal panel 10. This P-polarized light component is reflected by an aluminum reflecting surface 14 and is modulated as it is moved forward and then backward through an FLC layer 13. The P-polarized light component then is re-incident on the hologram layer 9. At this time, the P-polarized light is again refracted at the hologram layer 9 and traces the optical path of the reproducing light 5 in the opposite direction as an outgoing light beam 53. The S-polarized light is radiated as outgoing light beam 52 from the H-PDLC panel 3 in a perpendicular direction, without being diffracted by the hologram layer 9.

On the other hand, the S-polarized light of the reproducing light 5 directly falls on the reflection type FLC liquid crystal panel 10, at an incidence angle of θin-med, without being diffracted by the hologram layer 9 of the H-PDLC panel 3. At this time, the S-polarized light traverses the FLC layer 13 of the reflection type FLC liquid crystal panel 10 and is thereby modulated in its state of polarization. However, a light beam 54 reflected by the aluminum reflecting surface 14 fails to satisfy the conditions of diffraction, because the hologram layer 9 is of some thickness, so that not only the S-polarized light but also the P-polarized light is transmitted through the H-PDLC panel 3 without scarcely undergoing any diffraction. Even if a portion of the P-polarized light produced on modulation by the FLC layer 13 is diffracted by the hologram layer 9, the reflected light beam 54 and the outgoing light beam 52 may be separated from each other by having the outgoing direction of the reflected light beam 54 sufficiently different from the outgoing direction of the outgoing light beam 52, or by providing a polarization plate on an optical path of the outgoing light beam 52 for selectively transmitting the polarization component mainly owned by the outgoing light beam 52.

That is, in the image display apparatus according to the present invention, the illuminating light is incident by an illuminating optical system at an angle of incidence of not less than 30° and not larger than 90° relative to a normal line to a surface receiving the illuminating light, the P-polarized light or the S-polarized light of the illuminating light is diffracted and radiated towards the reflection type spatial light modulator, and the diffraction efficiency of the polarized light component of the illuminating light re-incident with phase modulation by this reflection type spatial light modulator, having the direction of polarization perpendicular to the direction of polarization of the polarized light component diffracted in the course of the first incidence, is 10% or less, whereby not less than 70% of the polarized light component is transmitted through the optical device.

The 'hologram of some thickness' is explained. The 'hologram of some thickness' is defined as a hologram having a Q-value not less than 10 (for reference, see Jumpei Tsuji, Holography, published by Mokabou. The Q-value is defined by t the following equation:

$$Q = 2\pi\lambda t/(n\Lambda^{-2})$$

where λ is a reproducing wavelength, t is a thickness of a hologram layer, n is an average refractive index of the hologram layer and Λ is a pitch of the interference fringes.

The pitch Λ of the interference fringes is defined by $$\Lambda = \lambda c / |2 \sin\{(\theta s - \theta r)/2\}|$$

where λc is a design wavelength, θs is an angle of incidence of the object light beam and θr is an angle of incidence of the reference light beam.

If λc=0.55 μm, θs=60°, θr=0°, λ=0.55 μm, t=5 μm and n=1.5, the pitch Λ of the interference fringes is 0.55 μm and Q is 38.1, thus meeting the definition of the hologram of some thickness.

The hologram of some thickness has a feature that, although the diffraction efficiency is higher, the diffraction efficiency is precipitously lowered, if the condition for the reproducing light deviates from a design condition, due to such factors as the wavelength used in manufacture or the angles of incidence of the object and reference light beams. In short, if, for a given reproducing wavelength, the angle of incidence of the reproducing light is deviated appreciably from the angle of incidence which will give a peak value of the diffraction efficiency, the effect of diffraction is not manifested. Thus, even if the reflected light beam 54 is the P-polarized light, it is scarcely diffracted by the hologram layer 9.

The polarization selective holographic optical device according to the present invention features setting the bend angle |θs−θr| to not less than 30° in order to reduce the pitch Λ of the interference fringes with a view to achieving a higher diffraction efficiency. However, if the bend angle is too large, such as 80° or larger, the wavelength range and the range of the angle of incidence which will produce diffraction effects are diminished to lower the light utilization efficiency.

In actual image display, the FLC layer 13 of the reflection type FLC liquid crystal panel 10 is controlled from pixel to pixel, with the polarization state of the reflected light being modulated, as stated in connection with FIGS. 1A to 1C, so that image display becomes possible mainly by the outgoing light beam 52

The angle of incidence θin-air of the reproducing light to the H-PDLC panel 3 and the angle of incidence θin-med of the reproducing light to the hologram layer 9 are considered. The relationship between the two is $$n_{gla} \cdot \sin(\theta\text{in-med}) = \sin(\theta\text{in-air})$$

as described above. The rate of change of the two is now checked. If, for ngla=1.5, θin-air is changed by 10° from 55° to 65°, θin-med is changed only by 4.1° from 33.1° to 37.2°. If θin-med is changed by 10° from 65° to 75°, θin-med is changed by 2.9° from 37.2° to 40.1°. This is not other than shifting a large rate of change of the sine function to a small rate of change by multiplication of a certain factor, herein a reciprocal of ngla. This means that it is possible to suppress the deterioration of uniformity and the lowering of the diffraction efficiency otherwise caused by incidence angle dependency of the reproducing light of the diffraction efficiency of the H-PDLC panel 3.

Figure 11:
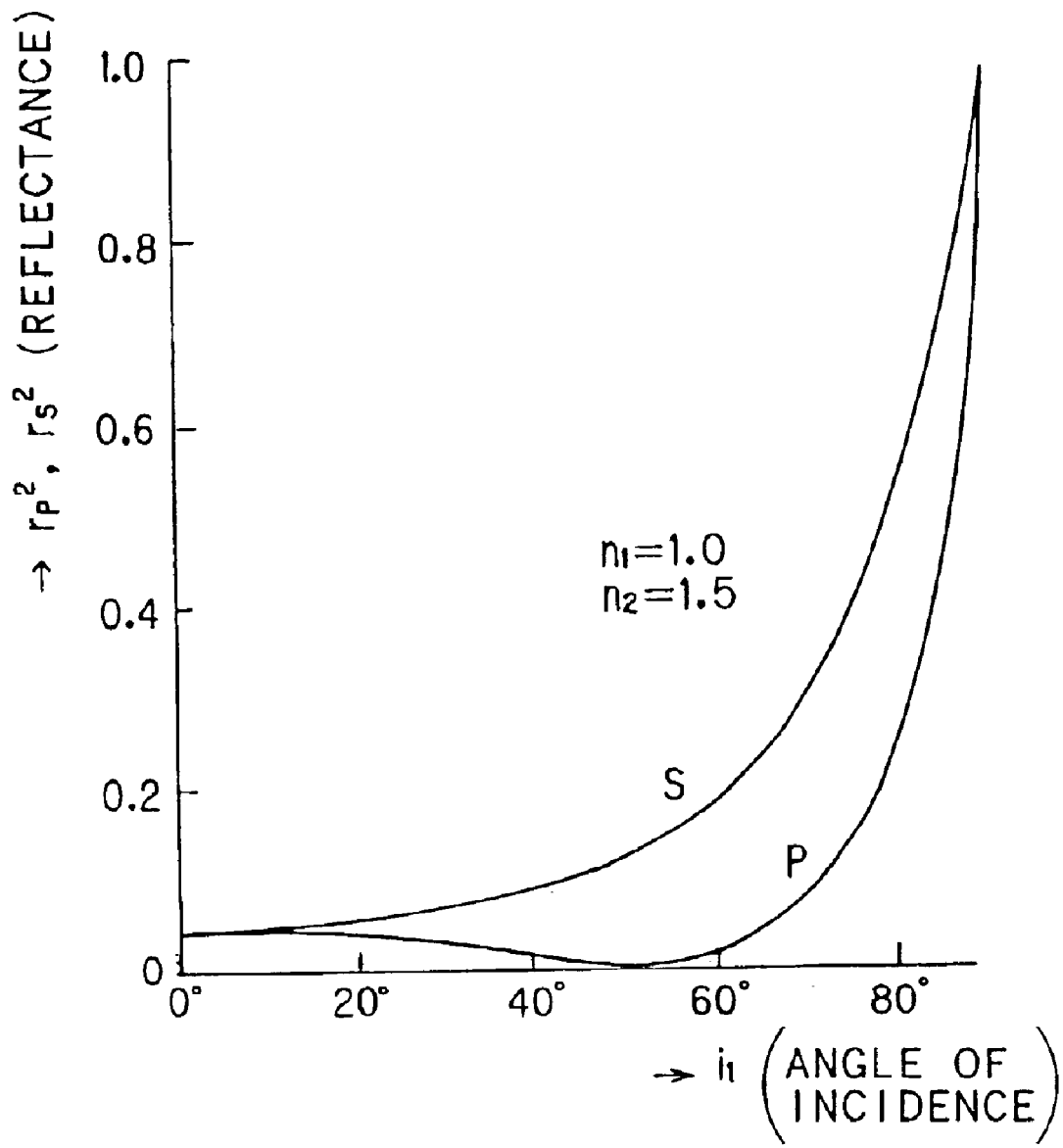
FIG. 11 is a graph showing the relationship between surface reflectance of glass (refractive index=1.5) and the angle of incidence.
Figure 12:
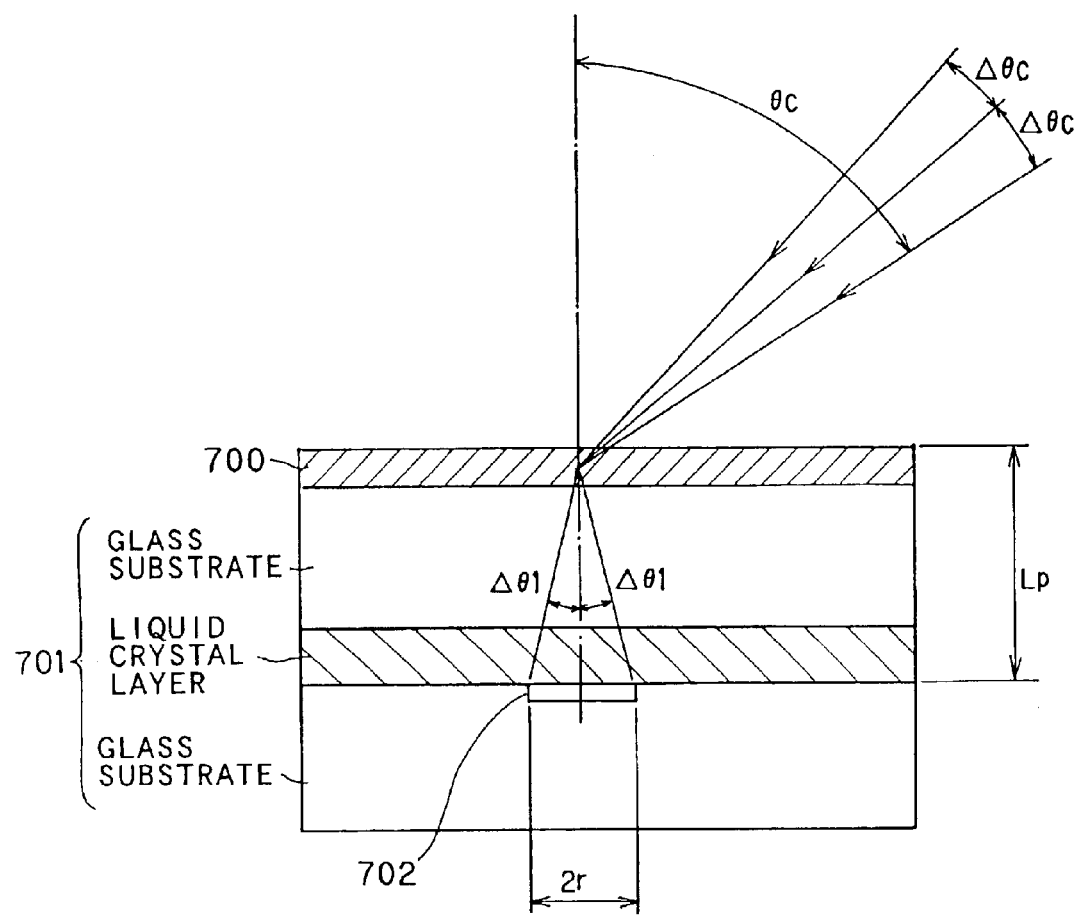
FIG. 12 is a cross-sectional view showing an allowed value for the outgoing angle of a main light beam from a hologram lens in a conventional hologram color filter.
Figure 13:
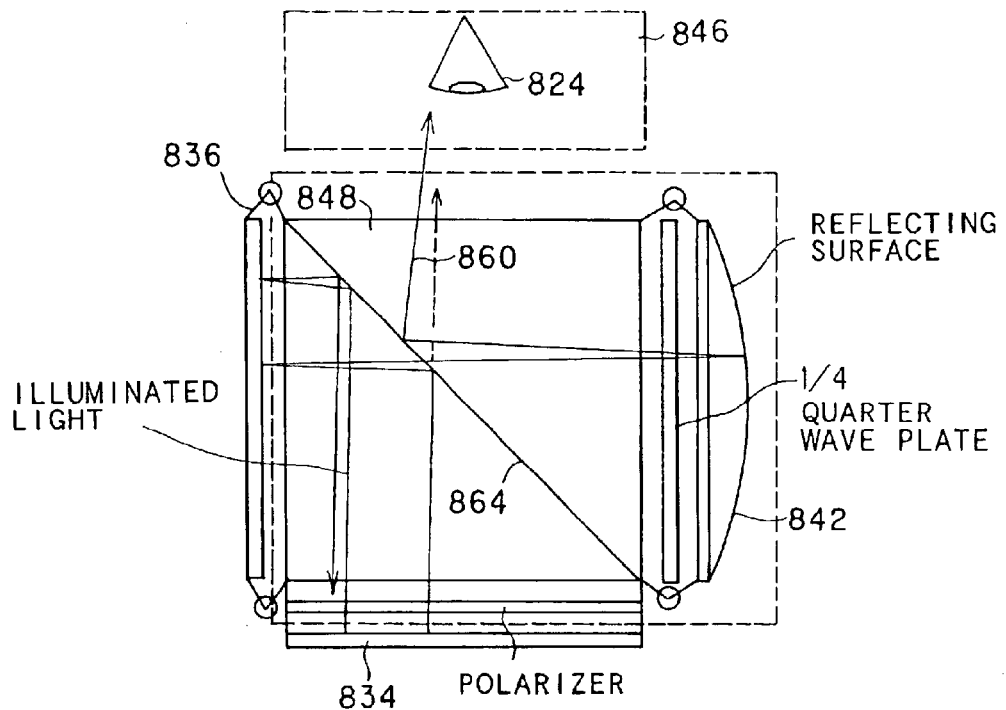
FIG. 13 is a side view showing the structure of a conventional image display apparatus employing a polarizing beam splitter.
Figure 14:
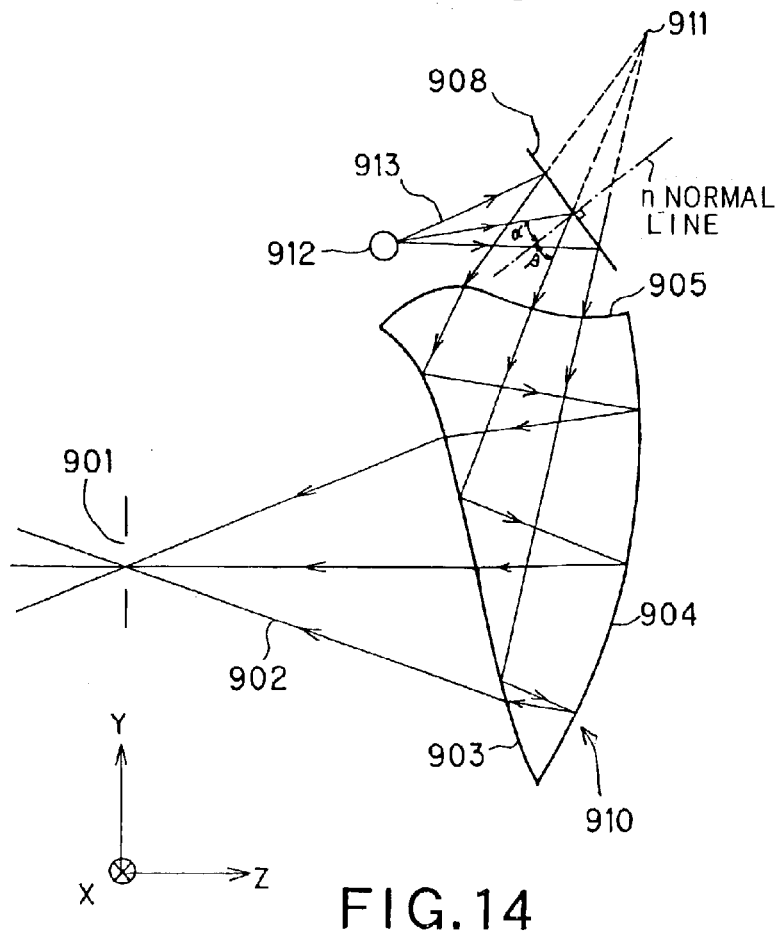
FIG. 14 is a side view showing the structure of a conventional image display apparatus employing an optical system for virtual image observation.
Figure 15:
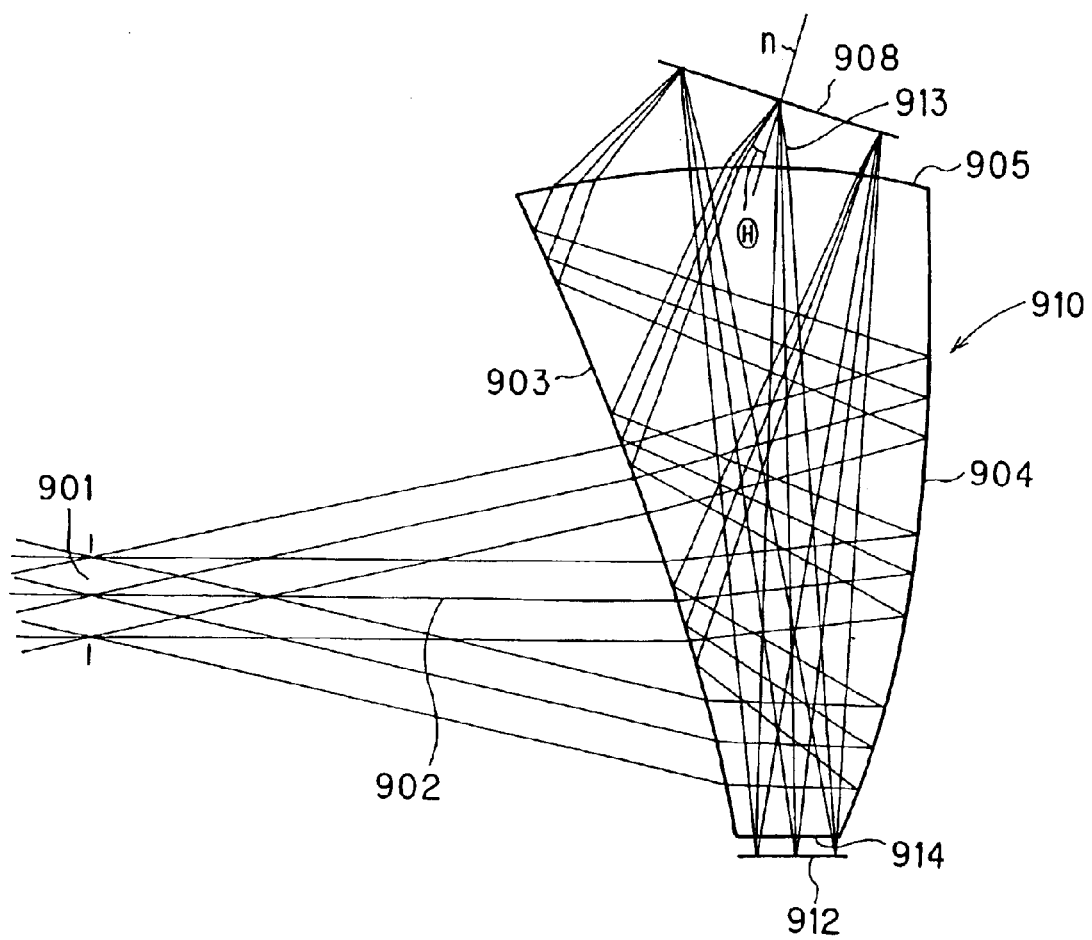
FIG. 15 is a side view showing the structure of another conventional image display apparatus employing an optical system for virtual image observation.

Moreover, the rate of change of θin-med with respect to θin-air may be smaller the larger the value of ngla. If, with ngla=1.73, θin-air is changed from 55° to 65°, θin-med is changed only by 3.3° from 28.3° to 31.6°, however, if the angle of incidence of the reproducing light θin-air to the H-PDLC panel 3 is of an excessively large value, such as 75° or larger, the surface reflectance not only of the S-polarized light but also of the P-polarized light is increased and becomes difficult to suppress using e.g., an anti-reflection film, as explained above with reference to FIG. 11.

Figure 18:
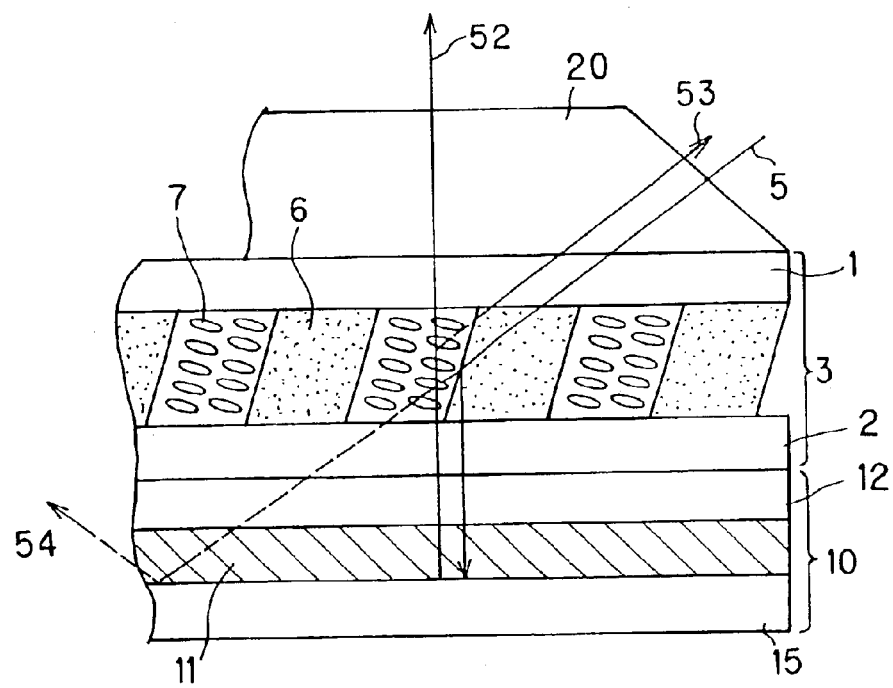
FIG. 18 is a longitudinal cross-sectional view showing the structure of a second embodiment of an image display device according to the present invention.

Thus, in case the angle of incidence of the reproducing light θin-air to the H-PDLC panel 3 exceeds 75°, it is effective to use a coupling prism 20 as shown in FIG. 18 (second embodiment). However, in this case, the angle of incidence of the reproducing light θin-air to the H-PDLC panel 3 is equal to the angle of incidence of the reproducing light θin-med to the hologram layer 9, such that, if the hologram layer 9 itself does not have a broader range of the angle of incidence, the light utilization efficiency is lowered.

In the reflection type image display device according to the present invention, an angle of incidence to the polarization selective holographic optical device, for which, if this coupling prism 20 is used and the diffracted light beam is caused to fall on the reflection type spatial light modulator in substantially a perpendicular direction, the bend angle is 30° or larger, is defined as the minimum angle of incidence. That is, an angle of 30° is set as the minimum angle of incidence.

Figure 19:
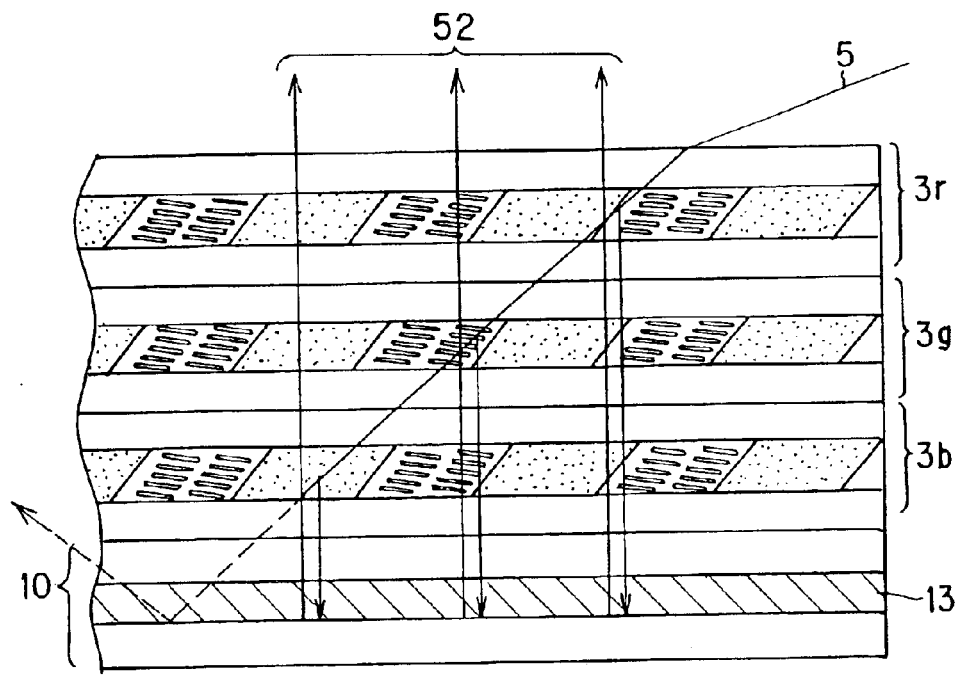
FIG. 19 is a longitudinal cross-sectional view showing the structure of a third embodiment of an image display device according to the present invention.

For maintaining a high diffraction efficiency for the reproducing light of a high range, plural polarization selective holographic optical devices 3R, 3G and 3B are layered together, the wavelength range of the light illuminating the reflection type FLC liquid crystal panel 10 is divided into plural portions and the light beams of the respective partial ranges of the illuminating light are diffracted by a sole polarization selective holographic optical device, as shown in FIG. 19 (third embodiment).

Although a three-layer structure is used in the present embodiment, four or more layers or two layers may also be used. For maintaining high diffraction efficiency for the reproducing light of a larger range of the incidence angle, it is sufficient if plural polarization selective holographic optical devices with different plural incidence angle accommodating ranges are layered together so that each of the respective partial ranges is mainly diffracted by an associated sole polarization selective holographic optical device.

[3] Embodiment of Image Display Device (Fourth Embodiment)

Figure 20:
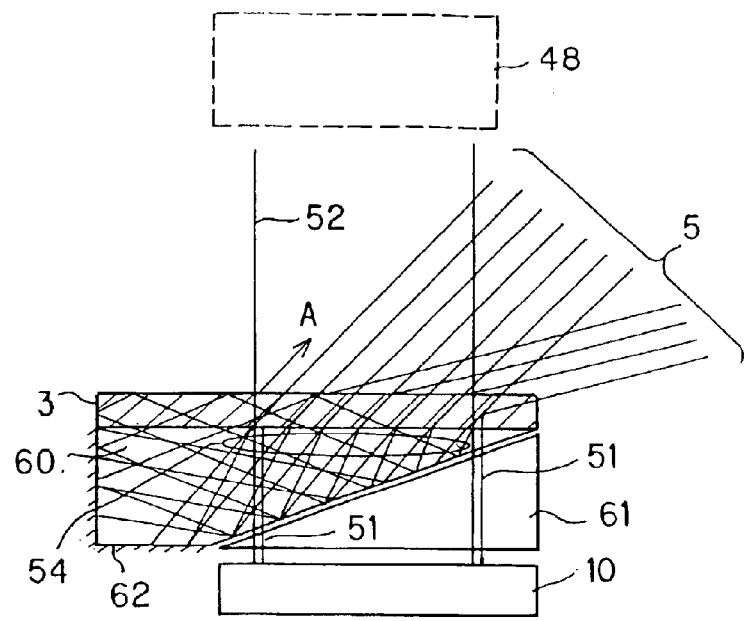
FIG. 20 is a side view showing the structure of a fourth embodiment of an image display device according to the present invention.

FIG. 20 shows an embodiment of an image display device according to the present invention. A polarization selective holographic optical device 3 is optically tightly bonded to a total reflection prism (first prism) 60. The reflection type spatial light modulator 10 is arranged substantially parallel to the polarization selective holographic optical device 3 with the total reflection prism 60 in-between.

A correction prism (second prism) 61, having an apex angle equal to that of the total reflection prism 60, is arranged between the reflection type spatial light modulator 10 and the total reflection prism 60, with the two apex angles equal to the apex angle of the prism 60 in the alternate-interior angle relationship to each other.

The operation of this image display apparatus is hereinafter explained. That is, an incident light beam 5, containing a P-polarized light component and an S-polarized light component, falls on the polarization selective holographic optical device 3 in an oblique direction. In this embodiment, the aforementioned holographic optical device 3 having the perpendicular orientation is used as the polarization selective holographic optical device 3. So, the major portion of the P-polarized light component, incident on the polarization selective holographic optical device 3, becomes a diffracted light beam 51 and proceeds through the inside of the total reflection prism 60 towards the reflection type spatial light modulator 10. On the other hand, the major portion of the S-polarized light component, incident on the polarization selective holographic optical device 3, becomes a non-diffracted light beam (order-zero light) 54, whilst the remaining portion thereof is returned to the polarization selective holographic optical device 3 and again totally reflected on the incident surface, so that substantially the entire light beam is ultimately absorbed by a light absorbing surface 62.

The P-polarized light beam 51, diffracted on the polarization selective holographic optical device 3, falls on the reflection type spatial light modulator 10 from a substantially perpendicular direction on the reflection type spatial light modulator 10 via the correction prism 61 arranged on the optical path. In the present embodiment, a reflection type liquid crystal panel with perpendicular orientation is used as the reflection type spatial light modulator 10. The P-polarized light beam, incident on the reflection type spatial light modulator 10, has its direction of polarization changed responsive to on/off of each pixel of the reflection type spatial light modulator 10 so as to be converted into an S-polarized light beam, or is directly reflected as the P-polarized light beam.

The light rays, reflected as the P-polarized light beam on the reflection type spatial light modulator 10, is re-incident on the polarization selective holographic optical device 3 through the correction prism 61 and the total reflection prism 60. The P-polarized light beam, thus re-incident on the polarization selective holographic optical device 3, is re-diffracted and returned to the light incident direction A. On the other hand, the light ray reflected by the reflection type spatial optical modulator 10, as it is transformed into the S-polarized light, is similarly incident on the polarization selective holographic optical device 3 through the correction prism 61 and the total reflection prism 60. The S-polarized light 52, thus re-incident on the polarization selective holographic optical device 3, is not diffracted by the polarization selective holographic optical device 3, and hence is transmitted linearly through the polarization selective holographic optical device 3 to reach an area of observation 48.

[4] Embodiment Pertinent to Projection Type Image Display Apparatus (Fifth Embodiment)

An embodiment of the projection type image display apparatus, having the aforementioned polarization selective holographic optical device and the reflection type spatial light modulator, is hereinafter explained.

Figure 21:
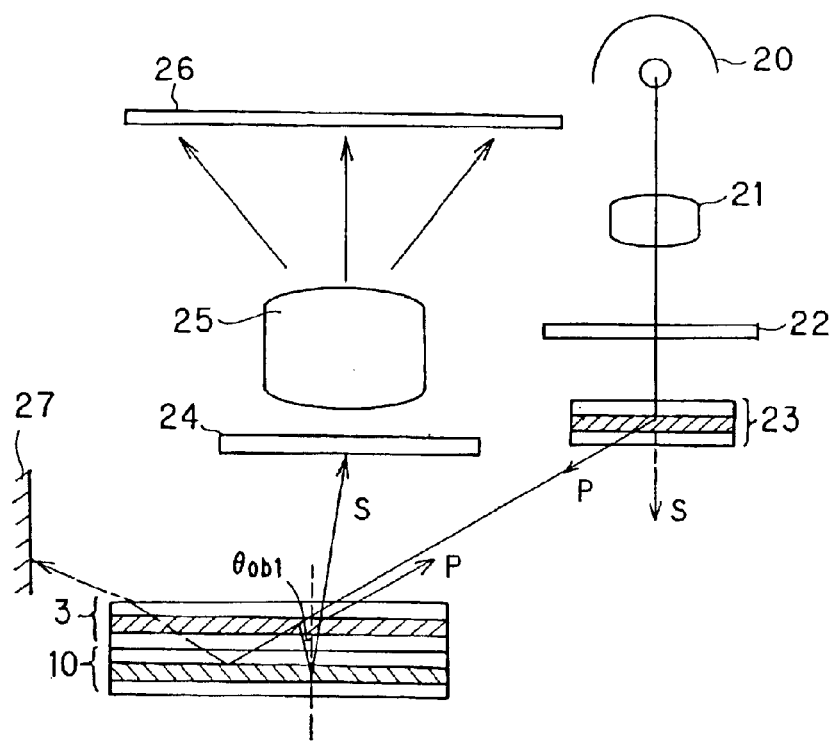
FIG. 21 is a side view showing the structure of a fifth embodiment of an image display apparatus according to the present invention.

As a fifth embodiment of the present invention, a color projection type image display apparatus may be constructed using a reflection type FLC panel as the reflection type spatial light modulator, as shown in FIG. 21. In this image display apparatus, the illuminating light radiated from an illuminating light source 20 falls on an illuminating optical system 21 having the functions of correcting the cross-sectional shape of the light beam, uniforming the intensity and controlling the angle of diffusion. This illuminating optical system 21 has polarization conversion means, not shown, and, in the present embodiment, rotates the orientation of polarization of the S-polarized light component of the illuminating light through 90° and transforms the S-polarized light into the P-polarized light, so that the incident light on the polarization selective holographic optical device 3 will be P-polarized light, for improving the light utilization efficiency. The illuminating light transmitted through the illuminating optical system 21 is passed through a color wheel 22 to fall on a polarization selective holographic optical device for correction 23. The color wheel 22 time-divisionally splits the white light, radiated from the illuminating light source 20, into red, green and blue spectral components, whereby color display becomes possible by the so-called field sequential color technique using a single plate reflective FLC panel 10.

The illuminating light incident on the polarization selective holographic optical device for correction 23 has only its P-polarized light component diffracted and is radiated at an outgoing angle of approximately 60°. The S-polarized light component is transmitted linearly through the polarization selective holographic optical device for correction 23 without diffraction. The illuminating light, mainly composed of P-polarized light component, diffracted by the polarization selective holographic optical device for correction 23, then falls on the polarization selective holographic optical device 3.

The polarization selective holographic optical device for correction 23 and the polarization selective holographic optical device 3 are of the same structure and arranged parallel to each other. So, the angle of incidence of the illuminating light on the polarization selective holographic optical device 3 is equal to the outgoing angle of the illuminating light from the polarization selective holographic optical device for correction 23.

This gives the following two principal merits: First, variations in the angle of diffraction by the wavelength may be counterbalanced. Second, the difference in the incidence angle dependency of the diffraction efficiency by wavelength can be corrected.

The first merit is now explained. The angle of incidence $\theta c$ and the angle of diffraction $\theta i$ in the interference fringes of the hologram are interrelated by the following equations:

$$(\sin \{\theta s\} - \sin \{\theta r\})/\lambda = (\sin \{\theta c\} - \sin \{\theta c\})/\lambda c$$

where $\theta s$ is an angle of incidence of the object light at the time of manufacture of a hologram, $\theta r$ is an angle of incidence of the reference light at the time of manufacture of the hologram, $\lambda$ is a design wavelength of the hologram and $\lambda c$ is the reproducing wavelength.

That is, the diffraction angle of a hologram having certain specified interference fringes exhibits incident light wavelength dependency, with the rate of change thereof becoming larger the smaller the pitch ˆ of the interference fringes. Meanwhile, this pitch ˆ of the interference fringes has the relationship of the following equation:

$$\hat{} = \lambda/|\sin \{\theta s\} - \sin \{\theta r\}|.$$

For example, if $\theta s=0°$, $\theta r=60°$, $\lambda=550$ nm and $\theta c=60°$, and if $\lambda c$ is changed from 450 nm to 650 nm, the angle of diffraction is changed from 9° to −9°. This means that the angle of incidence of the illuminating light to the reflection type spatial light modulator differs with the wavelength.

In the case of a real image forming system, exemplified by a projection type image display apparatus, one of the principal problems caused by variations in the angle of incidence of the illuminating light is the lowering of the light exploitation efficiency. That is, the illuminating light on the reflection type spatial light modulator becomes diffused to lower the rate of light collection of the projection optical system. In the case of a virtual image display apparatus, there may be derived a problem that the color feeling of the displayed image is changed with pupil movement of the viewer. These problems can be suppressed by reducing the allowable diffraction spectrum of the polarization selective holographic optical device 3 and by providing plural polarization selective holographic optical devices 3 on the wavelength band basis.

However, it is not realistic to split the illuminating light into limitlessly smaller fractions on the wavelength band basis, so that it is difficult to eliminate the wavelength dependency of the diffraction angle completely. So, two polarization selective holographic optical devices 3, 23, having equivalent performance, are used to correct the wavelength dependence.

The S-polarized illuminating light, incident on the reflection type spatial light modulator 10 following diffraction on the polarization selective holographic optical device 3, is phase-modulated by this reflection type spatial light modulator 10 and is re-transmitted through the polarization selective holographic optical device 3 to fall on a projection optical system 25 through a polarizing plate 24 selectively transmitting only the S-polarized light. By this projection optical system 25, an optical image, displayed on the reflection type spatial light modulator 10, is projected enlarged on a screen 26.

On the other hand, the remaining illuminating light of the P-polarized light on the forward optical path, not diffracted by the polarization selective holographic optical device 3, is directly transmitted through the polarization selective holographic optical device 3 and regularly reflected on the aluminum reflecting surface 14 of the reflection type spatial light modulator 10 so as to be re-radiated along a direction C in FIG. 21. Since this illuminating light tends to be stray light to deteriorate the contrast of the displayed image, its energy is absorbed by light absorption means 27.

Figure 22:
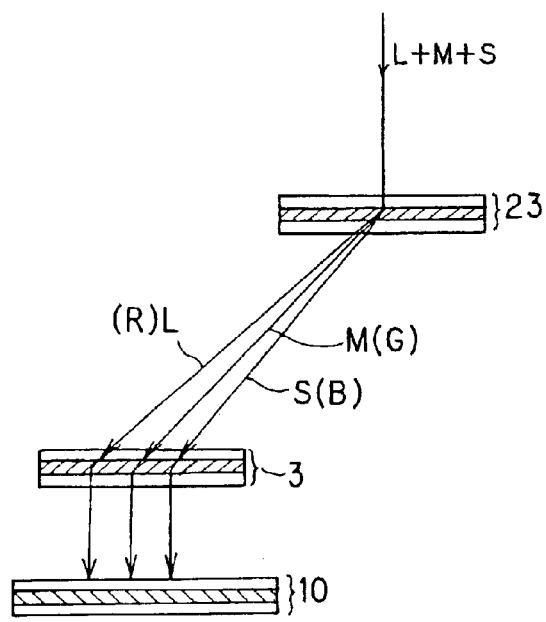
FIG. 22 is a side view showing the principle of correction of the angle of incidence by a polarization selective holographic optical device for correction used in the image display apparatus.

The correction of the angle of incidence by the polarization selective holographic optical device for correction 23 is explained with reference to FIG. 22. From the above equation, the outgoing angle $\theta i-1$ in the polarization selective holographic optical device for correction 23 is given by the following equation:

$$\sin (\theta i-1) = \lambda c/\lambda (\sin \{\theta s\} - \sin \{\theta r\}) + \sin (\theta c)$$

where, if $\theta s = \theta c = 0°$, $$\sin (\theta i-1) = -\lambda c/\lambda \sin (\theta r) \qquad (1).$$

That is, $\theta i-1$ becomes larger the longer the reproducing wavelength $\lambda c$. If the reproducing wavelengths L (such as red light), M (such as green light) and S (such as blue light) satisfy the relation: L>M>S, respective diffraction angles of diffraction $\theta i-1L$, $\theta i-1M$ and $\theta i-1S$ meet the following relationship:

$$\theta i-1L > \theta i-1M > \theta i-1S.$$

If this relationship is adapted to the case of the polarization selective holographic optical device 3, arranged parallel to the polarization selective holographic optical device for correction 23, the angle of incidence becomes $\theta i-1$, so that the angle of radiation $\theta i-2$ meets the following equation:

$$(\sin \{\theta s\} - \sin \{\theta r\})/\lambda = (\sin \{\theta i-2\} - \sin \{\theta i-1\})/\lambda c \qquad (2).$$

From the equations (1) and (2), $\theta i-2 = \theta s = 0°$, such that the angle of incidence of the illuminating light on the reflection type spatial light modulator 10 can at all times be 0° irrespective of the reproducing wavelength.

Figure 23:
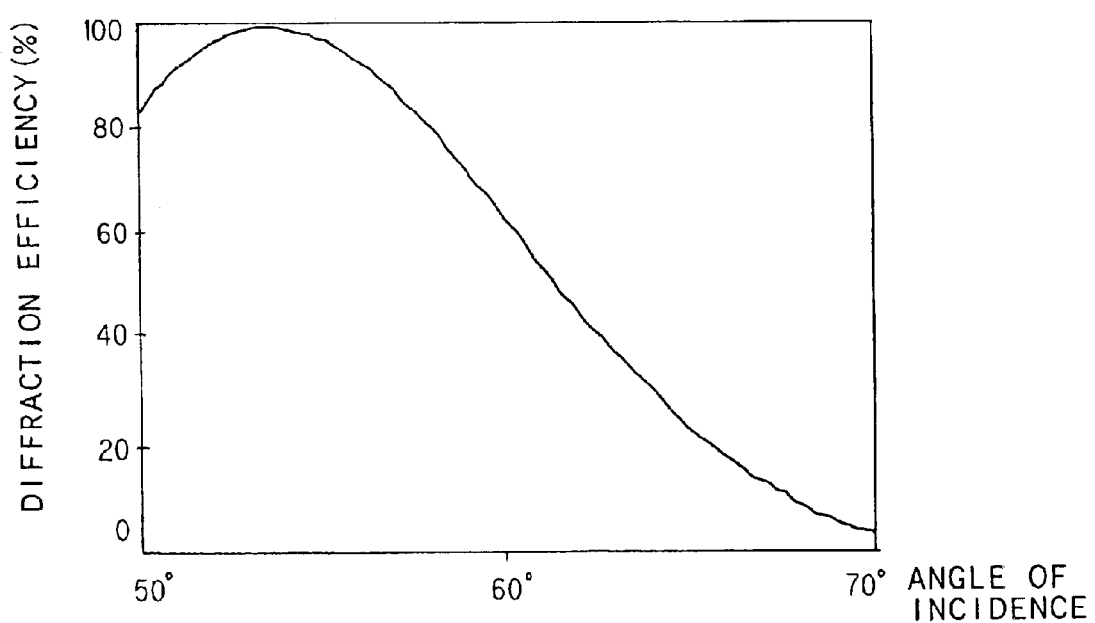
FIG. 23 is a graph showing incidence angle dependency of the diffraction efficiency at a reproducing wavelength of 450 nm in the image display apparatus.
Figure 24:
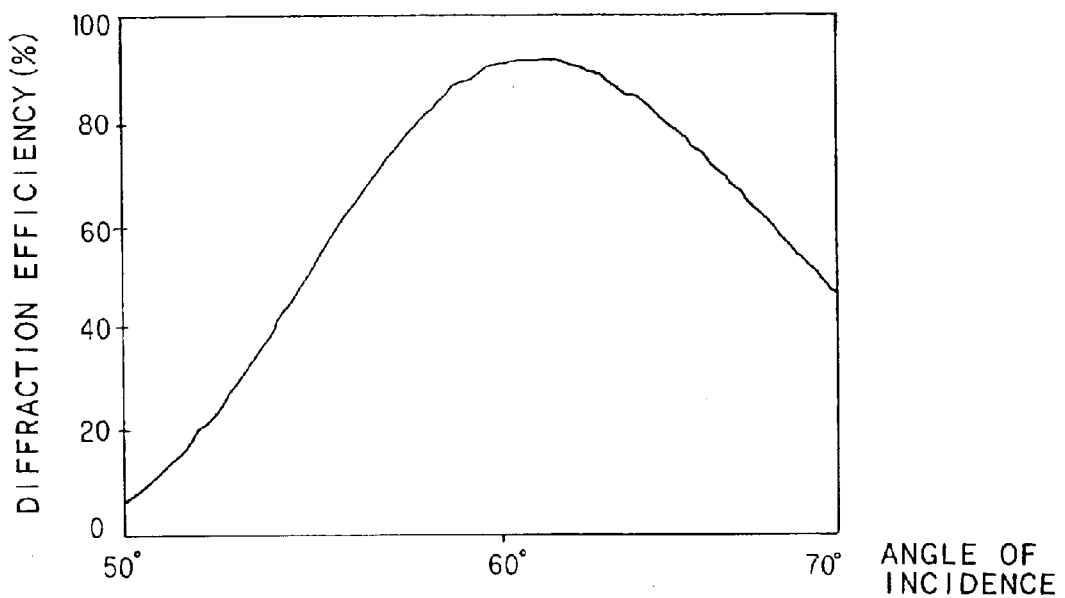
FIG. 24 is a graph showing incidence angle dependency of the diffraction efficiency at a reproducing wavelength of 550 nm in the image display apparatus.
Figure 25:
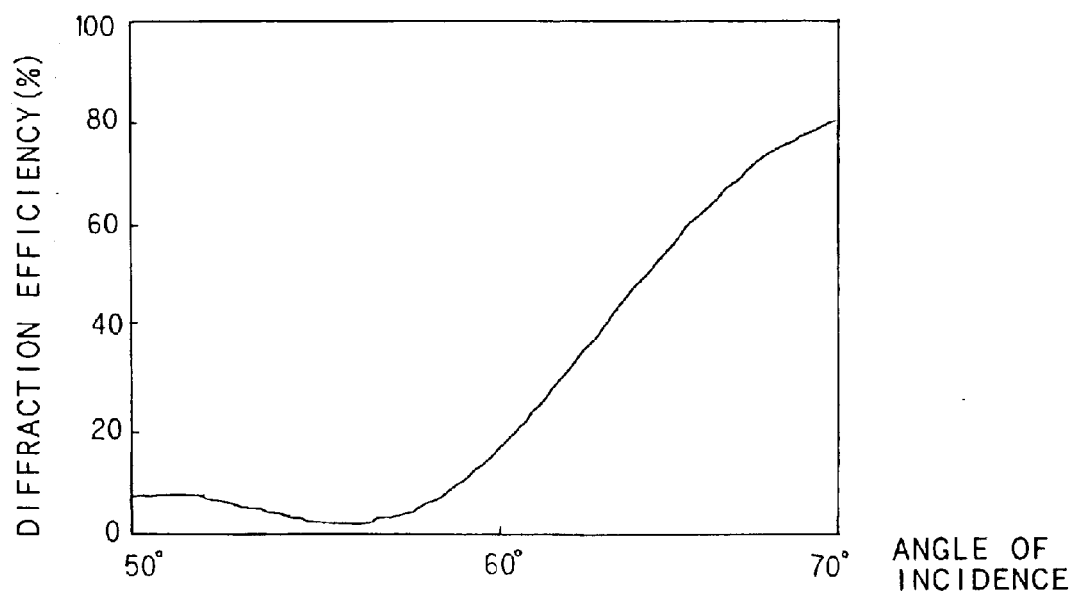
FIG. 25 is a graph showing incidence angle dependency of the diffraction efficiency at a reproducing wavelength of 650 nm in the image display apparatus.
Figure 26A:
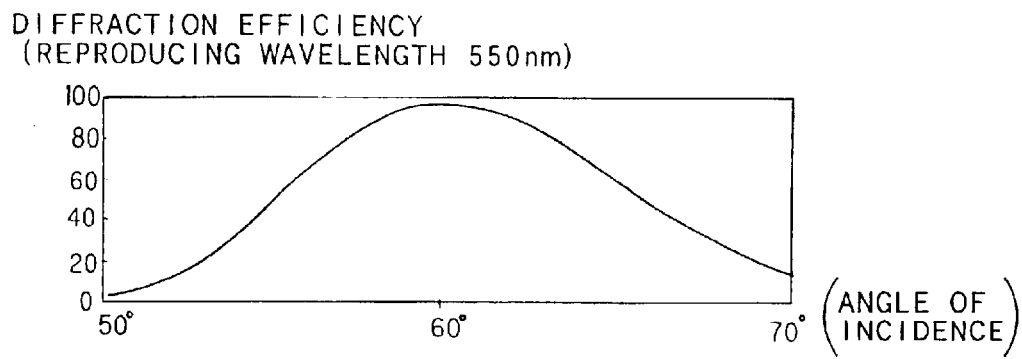
FIGS. 26A and 26B are graphs showing the reproducing wavelength dependency and incidence angle dependency of the diffraction efficiency in case of a larger bend angle ($\theta obl=10°$).
Figure 26B:
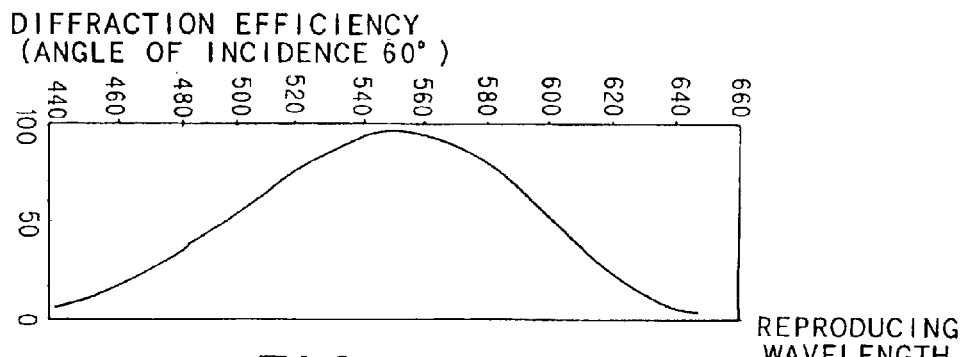
Figure 27A:
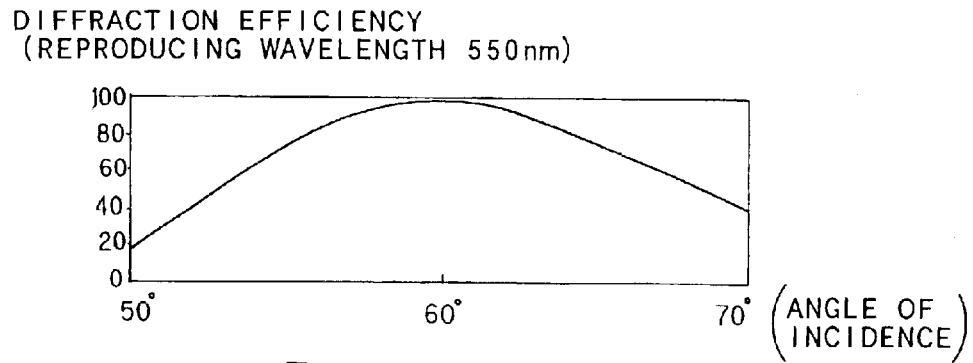
FIGS. 27A and 27B are graphs showing the reproducing wavelength dependency and incidence angle dependency of the diffraction efficiency in case of a smaller bend angle ($\theta obl=-10°$).
Figure 27B:
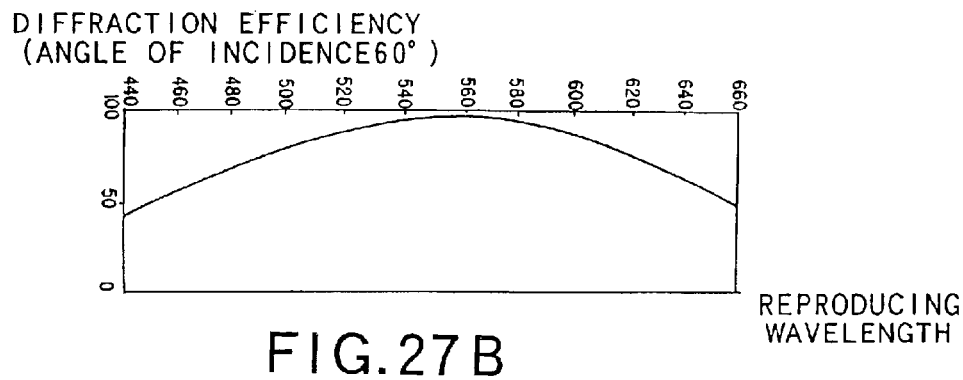

The aforementioned second merit is explained. FIGS. 23 to 25 show the incidence angle dependency of the diffraction efficiency of the polarization selective holographic optical device having the design wavelength of 532 nm, an angle of incidence of the object light of 0°, an angle of incidence of the reference light of 60°, an average refractive index of 1.52, and a hologram thickness of 5 $\mu$m. FIGS. 23, 24 and 25 show the cases of the reproducing wavelengths of 450 nm, 550 nm and 650 nm, respectively.

From the incidence angle dependency of the diffraction efficiency and the respective wavelength, taken together, it may be seen that the angle of incidence which gives a peak value of the diffraction efficiency differs with the wavelength, such that, on the long wavelength side, the diffraction efficiency is higher with a larger angle of incidence, whereas, on the short wavelength side, the diffraction efficiency is higher with a smaller angle of incidence. Moreover, as may be seen from FIG. 22, with use of the polarization selective holographic optical device for correction 23, the angle of incidence of the long wavelength side illuminating light and that of the short wavelength side illuminating light on the polarization selective holographic optical device 3 are larger and smaller, respectively. Thus, by using the polarization selective holographic optical device for correction 23, it becomes possible to realize a high diffraction efficiency over a broad wavelength range to maintain a high light utilization efficiency.

It may be seen from above that, by combining the polarization selective holographic optical device 3 and the polarization selective holographic optical device for correction 23, the reflection type spatial light modulator 10 can be illuminated at the same angle of incidence with high efficiency even with the illuminating light of a broad wavelength range.

It should be noted that, in the present embodiment, the angle of incidence of the main light beam with respect to the reflection type spatial light modulator 10 is set not to 0° but to θobl. The reason is that a high refractive index of a transmission hologram of some thickness cannot be realized unless the bend angle is of a more or less large value. That is, the bend angle needs to be set at a larger value. Thus, this θobl is set such as to enlarge the bend angle of the polarization selective holographic optical device 3 in the plane of incidence. If θobl is set to an excessively large value, such problems are raised as deterioration in contrast of the reflection type spatial light modulator 10, bulky size of the projection optical system 25 or increased aberration of the displayed image. It is therefore usually desirable that this θobl be not larger than 30°.

However, if the projection optical system 25 is an offset optical system, and the oblique outgoing light from the reflection type spatial light modulator 10 is effectively used, the effective system of the projection optical system 25 can be reduced in size as the center of the displayed image is deviated from the optical axis of the projection optical system 25.

If conversely the refractive index modulation factor of the polarization selective holographic optical device is sufficiently large, such as 0.05 or higher, a sufficient diffraction efficiency can be realized even with the bend angle of the order of 50°, so that, for enhancing the allowable wavelength range and the allowable angle of incidence, θobl is desirably set along a direction of reducing the bend angle. In this case, the absolute value of θobl cannot be excessively increased for the above reason and is desirably on the order of 10°.

FIGS. 26A, 26B and 27A and 27B show the reproducing wavelength dependancy and the incidence angle dependency of the diffraction efficiency for the cases of a larger bend angle (θobl=10°) and a smaller bend angle (θobl=−10°), respectively. From FIGS. 26A, 26B, 27A and 27B, it is seen that, for the case of the small bend angle (θobl=−10°), the diffraction efficiency is deteriorated with the reproducing wavelength and the angle of incidence only to a lesser extent.

[5] Sixth Embodiment of Image Display Apparatus

Figure 28:
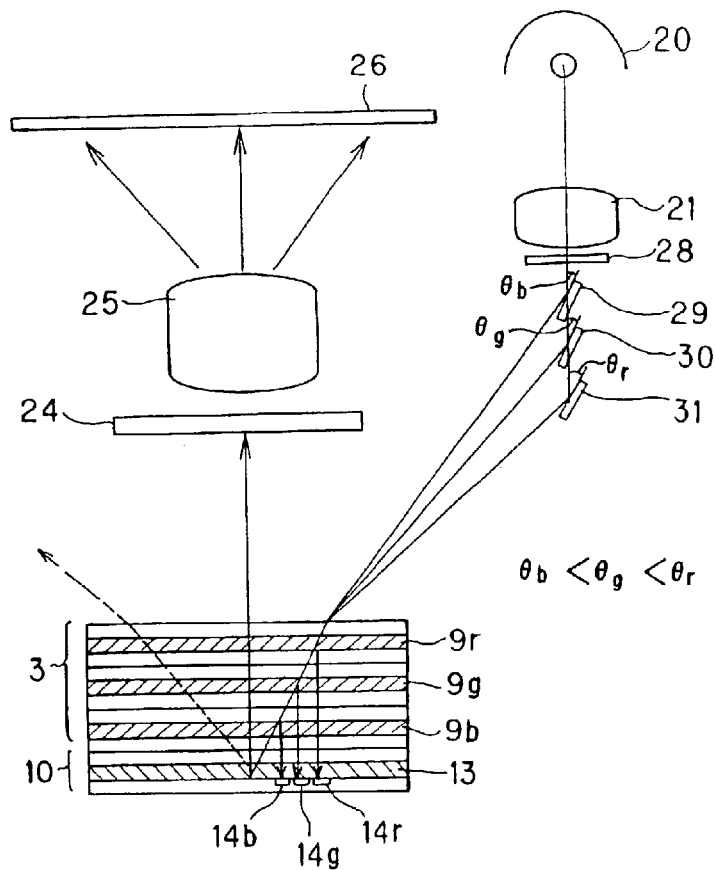
FIG. 28 is a side view showing the structure of a sixth embodiment of an image display apparatus according to the present invention.

As a sixth embodiment of the present invention, a color projection type image display apparatus employing a reflection type TN liquid crystal panel as a reflection type spatial light modulator is explained with reference to FIG. 28.

In the present image display apparatus, the illuminating light, radiated from the illuminating light source 20, falls on the illuminating optical system 21 having the functions of correcting the cross-sectional profile of the light beam, uniforming the intensity and controlling the angle of diffusion. The present illuminating optical system 21 has polarization transforming means, not shown. In the present embodiment, the S-polarized light is transformed into the P-polarized light by rotating the orientation of polarization of the illuminating light by 90°, so that the incident light on the polarization selective holographic optical device 3 will be P-polarized light, for thereby improving the light utilization efficiency.

The illuminating light, which has traversed the illuminating optical system 21, is transmitted through a polarizing plate 28, adapted for selectively transmitting the P-polarized light, to fall on dichroic mirrors for blue, green and red colors 29, 30, 31. These dichroic mirrors 29 to 31 are arranged so that angles θb, θg and θr the reflecting surfaces thereof make with the proceeding direction of the illuminating light will satisfy the relationship: θb<θg <θr. So, these dichroic mirrors 29 to 31 play the same role as that of the polarization selective holographic optical device for correction 23 of the above-described fifth embodiment explained with reference to FIG. 21.

That is, the angle of incidence of red light to the polarization selective holographic optical device 3 is the maximum, with those of the green light and the blue light becoming smaller in this order. The respective light beams incident on the polarization selective holographic optical device 3 are converged by three hologram layers 9r, 9g and 9b, provided for the respective colors, on aluminum pixel electrodes 14r, 14g and 14b of corresponding colors of the reflection type spatial light modulator. The illuminating light, which has traversed the TN liquid crystal layer 13 in forward and return directions, is phase-modulated, with its S-polarized light component proceeding without being diffracted by the polarization selective holographic optical device 3 to fall on the projection optical system 25 through the polarizing plate 24 designed to selectively transmit the S-polarized light component. The image light beam, incident on the projection optical system 25, is projected on the screen 26.

[6] Seventh Embodiment of the Image Display Apparatus

Figure 29:
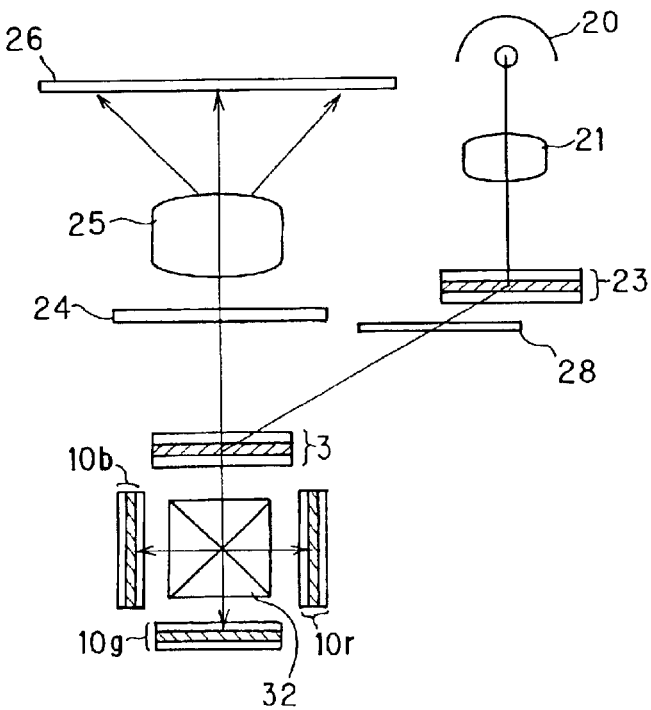
FIG. 29 is a side view showing the structure of a seventh embodiment of an image display apparatus according to the present invention.

As a seventh embodiment of the present invention, a color projection display apparatus, employing three reflection type anti-ferroelectric liquid crystal panels 10r, 10g, 10b as reflection type spatial light modulators, as shown in FIG. 29, is hereinafter explained.

In this image display apparatus, the illuminating light radiated from the illuminating light source 20 falls on the illuminating optical system 21 having such functions as correcting the cross-sectional profile of the light beam, uniforming the intensity and controlling the angle of diffusion. The present illuminating optical system 21 has polarization converting means, not shown. In the present embodiment, the S-polarized light is transformed into the P-polarized light component by rotating the orientation of polarization of the illuminating light by 90°, so that the incident light on the polarization selective holographic optical device 3 will be P-polarized light, for thereby improving the light utilization efficiency.

The illuminating light, which has traversed the illuminating optical system 21, falls on the polarization selective holographic optical device for correction 23 where only the P-polarized light components are diffracted and radiated at an outgoing angle of approximately 60°. The S-polarized light is transmitted linearly through the polarization selective holographic optical device for correction 23 without undergoing the diffraction.

The illuminating light, as the P-polarized light diffracted by the polarization selective holographic optical device for correction 23, is transmitted through the polarizing plate 28, which selectively transmits the P-polarized light component. Thus, the light falls on the polarization selective holographic optical device 3. Since the polarization selective holographic optical device for correction 23 and the polarization selective holographic optical device 3 are of the same structure and are arranged parallel to each other, the angle of incidence of the illuminating light on the polarization selective holographic optical device 3 is equal to the outgoing angle of the illuminating light from the polarization selective holographic optical device for correction 23.

The illuminating light, composed mainly of the P-polarized light component, and which is incident on the polarization selective holographic optical device 3, is diffracted by the polarization selective holographic optical device 3 in a substantially perpendicular direction to fall on the cross-dichroic prism 32 whereby it is separated into a red light beam, a green light beam and a blue light beam.

The respective separated color light beams fall on associated reflection type spatial light modulators 10r, 10g and 10b so as to be thereby reflected with modulation from one color light beam to another and from one pixel to another. The modulated color light beams are again incident on the cross-dichroic prism 32 for re-synthesis and are then re-incident on the polarization selective holographic optical device 3. The S-polarized light component is transmitted through the polarization selective holographic optical device 3, without being subjected to diffraction, and then through the polarizing plate 24, adapted to selectively transmit the S-polarized light component. In this manner, the S-polarized light component falls on the projection optical system 25. By this projection optical system 25, an image of the display image is formed on the screen 26.

[7] Eighth Embodiment of Image Display Apparatus

Figure 30:
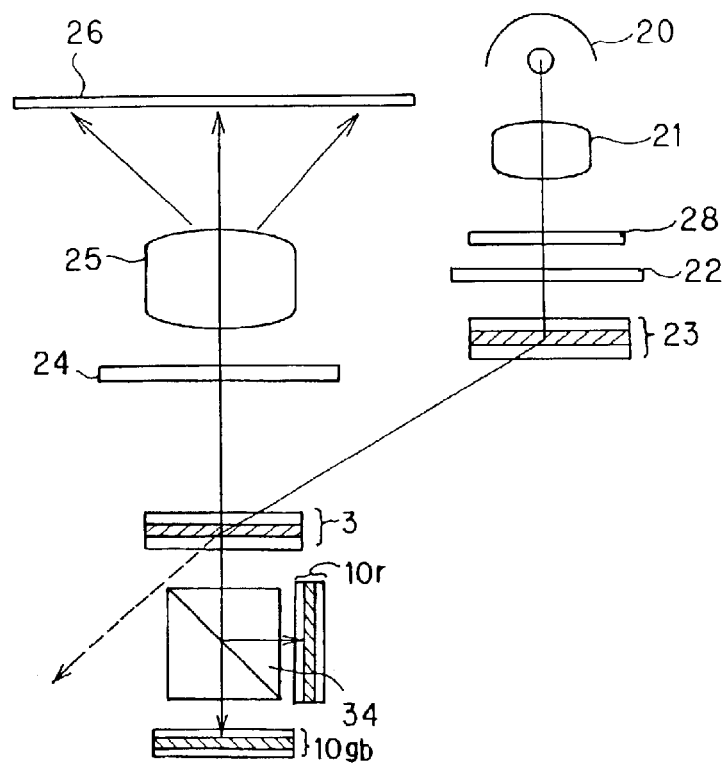
FIG. 30 is a side view showing the structure of an eighth embodiment of an image display apparatus according to the present invention.

As an eighth embodiment of the present invention, a color projection type image display apparatus, employing a reflection type FLC panel, as a reflection type spatial light modulator, is explained with reference to FIG. 30.

In the present image display apparatus, the illuminating light, radiated from the illuminating light source 20, falls on the illuminating optical system 21 having the functions of correcting the cross-sectional profile of the light beam, uniforming the intensity and controlling the angle of diffusion. The present illuminating optical system 21 has polarization converting means, not shown. In the present embodiment, the S-polarized light is transformed into the P-polarized light by rotating the orientation of polarization of the illuminating light by 90°, so that the incident light on the polarization selective holographic optical device 3 will be P-polarized light, for thereby improving the light utilization efficiency.

The illuminating light, transmitted through the illuminating optical system 21, is transmitted through the polarizing plate 28, adapted to selectively transmit the P-polarized light component. The light thus transmitted then falls on a color shutter 22. This color shutter 22 has the function of rotating the orientation of polarization of a specified wavelength range of the white light, radiated from the illuminating light source 20 and formed into linear polarized light, through 90°. Thus, the illuminating light may be time-divisionally separated into partial spectral components by polarization-detecting the illuminating light transmitted through the color shutter 22. By this time division, color display becomes possible by the 'field sequential color technique' with the single-plate reflection type FLC panel 10 (see Gray D. Sharp and Kristina M. Johnson, High Brightness Saturated Color Shutter Technology, SID Symposium, Vol.27, p411, 1996).

In the present embodiment, this color shutter 22 is controlled so that two specrtra, namely red light—blue light (magenta) and red light—green light (yellow), will be transmitted time-divisionally. That is, the present shutter 22 alternately rotates the orientation of polarization of the green light and blue light incident from the illuminating light source 20 through 90°. The illuminating light transmitted through the color shutter 22 falls on the polarization selective holographic optical device for correction 23 where only the P-polarized light component is diffracted and radiated at an outgoing angle of approximately 60°. At this time, the green light or the blue light, formed into the S-polarized light by the color shutter 22, is alternately passed linearly through the polarization selective holographic optical device for correction 23, without undergoing any diffraction.

The illuminating light, mainly composed of the P-polarized light, diffracted by the polarization selective holographic optical device for correction 23, falls on the polarization selective holographic optical device 3. Since the polarization selective holographic optical device for correction 23 and the polarization selective holographic optical device 3 are of the same structure, and are arranged parallel to each other, the angle of incidence of the illuminating light on the polarization selective holographic optical device 3 is equal to the outgoing angle of the illuminating light from the polarization selective holographic optical device for correction 23.

The P-polarized light component of the illuminating light, incident on the polarization selective holographic optical device 3, is diffracted so as to be radiated in substantially a perpendicular direction from the polarization selective holographic optical device 3 to fall on a dichroic prism 34. Of the illuminating light, incident on the dichroic prism 34, only the red light is deflected 90° in its proceeding direction, while the remaining portion of the illuminating light, mainly including the wavelength range of the green light and the blue light, is transmitted through the prism. The two color light beams are incident on associated reflection type spatial light modulators 10r, 10gb, and are thereby reflected with modulation on the color beam basis or on the pixel basis.

It should be noted that the green light and the blue light are displayed time-divisionally by the 'field sequential color technique'. The reason in which the green light component and the blue light component are time-divisionally displayed, while the red light is not so displayed, is that, if a usual lamp light source is used, and white balance is set such as to take account of the human visual sensitivity, the red light is the most deficient in output light volume.

The modulated respective color light components are re-incident on the dichroic prism 34 and re-synthesized so as to be re-incident on the polarization selective holographic optical device 3. The S-polarized light component is transmitted, without being subjected to diffraction, and falls on the projection optical system 25 through the polarizing plate 24 adapted for selectively transmitting the S-polarized light component. By this projection optical system 25, an image of the display image is formed on the screen 26.

Figure 31:
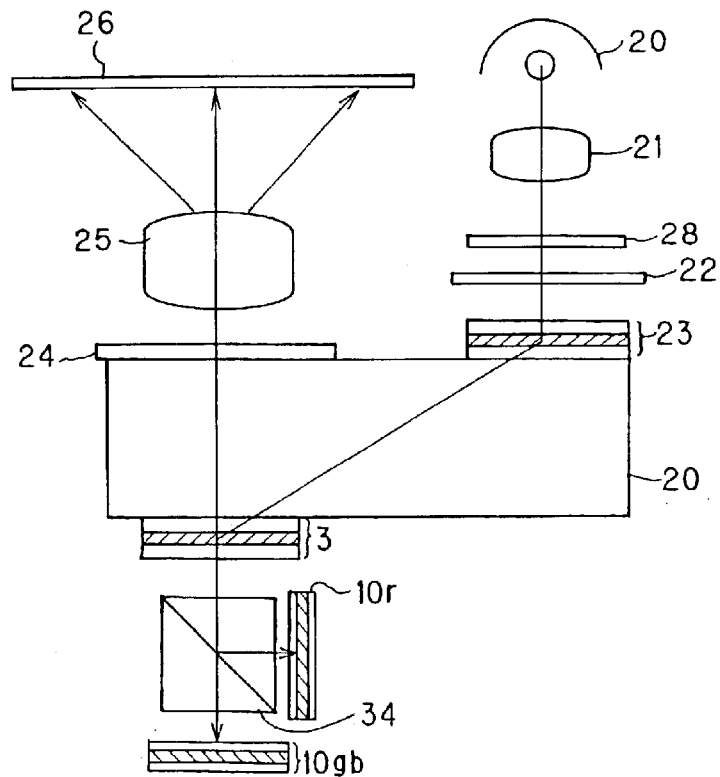
FIG. 31 is a side view showing the structure of the eighth embodiment of an image display apparatus according to the present invention.

Referring to FIG. 31, the diffraction efficiency can be improved by placing a glass plate 20 between the polarization selective holographic optical device for correction 23 and the polarization selective holographic optical device 3, and by enlarging the effective bend angle of the hologram layers of the polarization selective holographic optical device for correction 23 and the polarization selective holographic optical device 3.

However, at this time, the range of the angles of incidence and the wavelength range in which the effect of diffraction is produced in the polarization selective holographic optical device for correction 23 and the polarization selective holographic optical device 3, is reduced. Meanwhile, the polarization selective holographic optical device for correction 23 and the glass plate 20 need to be bonded tightly optically, whilst the polarization selective holographic optical device 3 and the glass plate 20 similarly need to be bonded tightly optically.

[8] Ninth Embodiment of the Image Display Apparatus

Figure 32:
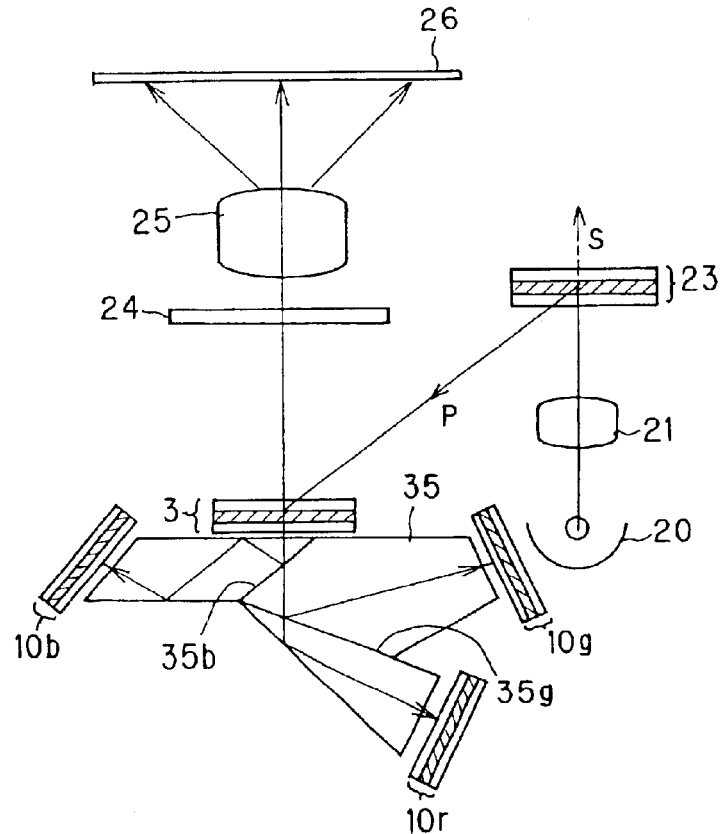
FIG. 32 is a side view showing the structure of a ninth embodiment of an image display apparatus according to the present invention.

As a ninth embodiment of the present invention, a color projection image display apparatus employing three reflection type liquid crystal panels 10r, 10g, 10b as reflection type spatial light modulators, as shown in FIG. 32, is explained.

In this image display apparatus, the illuminating light radiated from the illuminating light source 20 falls on the illuminating optical system 21 having such functions as correction of the cross-sectional profile of the light beam, uniforming of the intensity and control of the angle of diffusion. The present illuminating optical system 21 has polarization transforming means, not shown. In the present embodiment, the S-polarized light is transformed into the P-polarized light by rotating the orientation of polarization of the illuminating light by 90°, so that the incident light on the polarization selective holographic optical device 3 will be P-polarized light, for thereby improving the light utilization efficiency.

The illuminating light, which has traversed the illuminating optical system 21, falls on the polarization selective holographic optical device for correction 23 where only the P-polarized light components are diffracted and reflected to fall on the polarization selective holographic optical device 3. The S-polarized light component of the illuminating light is transmitted linearly through the polarization selective holographic optical device for correction 23 without being subjected to diffraction on the polarization selective holographic optical device for correction 23.

It should be noted that the polarization selective holographic optical device for correction 23 acts as a reflection type polarization selective holographic optical device. In the case of the reflection type, the allowance value for the diffraction wavelength range is smaller than in the transmission type. Thus, it is more effective to use the illuminating light source 20 having a steep peak value in its spectrum as far as possible or to prepare a plural number of holograms from one wavelength to another and to stack these holograms together for use as the polarization selective holographic optical device for correction 23.

The incident illuminating light, mainly composed of the P-polarized light component, is diffracted by the polarization selective holographic optical device 3 so as to be radiated subsequently perpendicularly to fall on a dichroic prism block 35. This dichroic prism block is made up of three dichroic prisms, and includes two boundary surfaces 35b, 35g. The illuminating light incident on the dichroic prism block 35 first falls on the boundary surface 35b which reflects only the blue color light. The light other than the blue light, transmitted through the boundary surface 35b, falls on the other boundary surface 35g, which reflects only the green light, whereby the illuminating light is separated into R (red), G (green) and B (blue) light beams.

The respective color light beams, thus separated, fall on the reflection type spatial light modulators 10r, 10g, 10b, so as to be thereby reflected modulated from one color light beam to another and from one pixel to another. The respective color light beams, thus modulated, are re-incident on the dichroic prism block 35 for re-synthesis. The respective color light beams, thus synthesized, are re-incident on the polarization selective holographic optical device 3. At this time, the S-polarized light component is transmitted without diffraction to fall on the projection optical system 25 through the polarizing plate 24 which selectively transmits the S-polarized light component. By this projection optical system 25, an image of the displayed image is formed on the screen 26.

[9] Tenth Embodiment of the Image Display Apparatus

Figure 33:
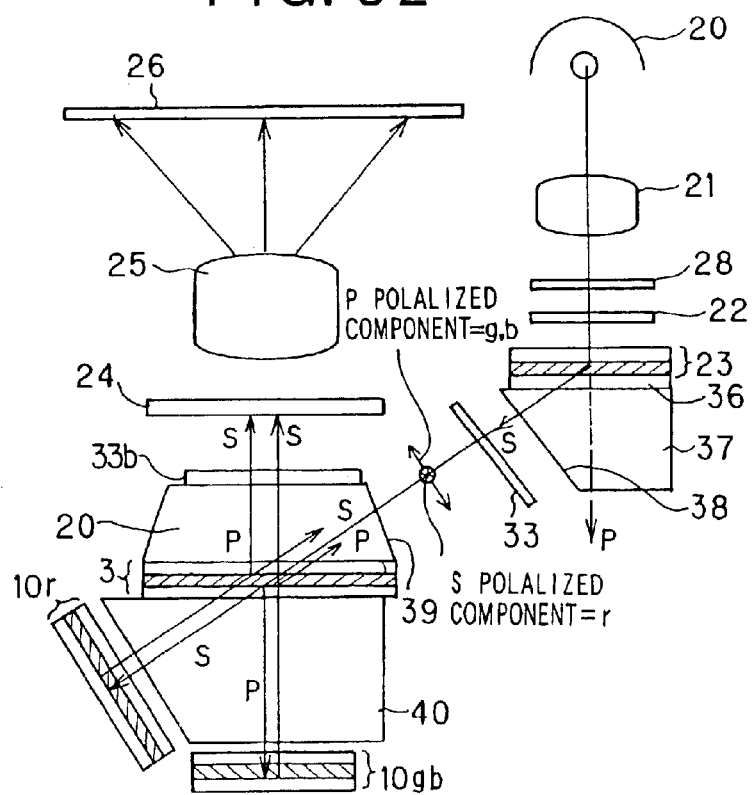
FIG. 33 is a side view showing the structure of a tenth embodiment of an image display apparatus according to the present invention.

As a tenth embodiment of the present invention, a color projection type image display apparatus, employing two reflection type FLC panels, as reflection type image display devices, as shown in FIG. 33, is hereinafter explained.

In this image display apparatus, the illuminating light radiated from the illuminating light source 20 falls on the illuminating optical system 21 having such functions as correction of the cross-sectional profile of the light beam, uniforming of the intensity and control of the angle of diffusion. The present illuminating optical system 21 has polarization transforming means, not shown. In the present embodiment, the P-polarized light is transformed into the S-polarized light by rotating the orientation of polarization of the illuminating light by 90°, so that the incident light on the polarization selective holographic optical device 3 will be P-polarized light, for thereby improving the light utilization efficiency.

The illuminating light, transmitted through the illuminating optical system 21, is transmitted through the polarizing plate 28, adapted for selectively transmitting the S-polarized light component, to fall on the color shutter 22. This color shutter 22 time-divisionally separates the white light radiated from the illuminating light source 20 into partial spectral components. By this time division, color display becomes possible by the 'field sequential color technique' with the single-plate reflection type FLC panel 10 (see Gray D. Sharp and Kristina M. Johnson, High Brightness Saturated Color Shutter Technology, SID Symposium, Vol.27, p411, 1996).

In the present embodiment, this color shutter 22 is controlled so that two wavelength bands, namely red light—blue light (magenta) and red light—green light (yellow), will be transmitted time-divisionally. That is, the present color shutter 22 alternately rotates the orientation of polarization of the incident green and blue light beams by 90°. The illuminating light, radiated from the color shutter 22, falls on the polarization selective holographic optical device for correction 23, where only the S-polarized light is diffracted and radiated at an outgoing angle of approximately 70°. The green and the blue light beam, turned into P-polarized light by the color shutter 22, proceed linearly without being diffracted at the polarization selective holographic optical device for correction 23 so that these light beams are alternately transmitted through the polarization selective holographic optical device for correction 23.

The illuminating light, mainly composed of the S-polarized light component, diffracted by the polarization selective holographic optical device for correction 23, falls on a first coupling prism 37, optically tightly bonded to the polarization selective holographic optical device for correction 23. The illuminating light, radiated from the polarization selective holographic optical device for correction 23, is not refracted on a junction boundary surface between the first coupling prism 37 and the glass substrate 36 of polarization selective holographic optical device for correction 23 because these members are formed of a glass material having the approximately equal refractive index. Thus, the illuminating light falls on the first coupling prism 37 without changing its angle.

The illuminating light incident on the first coupling prism 37 is radiated from an optical surface 38 of the first coupling prism 37 in substantially a perpendicular direction. The radiated light then falls on a color select 33 adapted for rotating the orientation of the incident linear polarized light by 90° depending on its wavelength range (see, for reference, Gray D. Sharp and J. R. Bridge, Retarder Stack Technology for Color Manipulation, SID Symposium, Vol.30, p1072, 1999).

In the present embodiment, the orientation of the incident polarization (S-polarized light) is kept for the red color light ray, whilst the orientation of the blue and green light rays is rotated 90° so that these light beams become P-polarized light. The illuminating light radiated from the color select 33 falls on an optical surface 39 of a second coupling prism 20 optically tightly bonded to the polarization selective holographic optical device 3. This optical surface 39 is substantially parallel to the optical surface 38 of the first coupling prism 37. Thus, the incident illuminating light proceeds linearly without substantially any refraction on the optical surface 39 of the second coupling prism 20 to fall directly on the polarization selective holographic optical device 3.

In this polarization selective holographic optical device 3, the red light, as S-polarized light, is transmitted through a third coupling prism 40, without being subjected to diffraction, to fall on the reflection type spatial light modulator for red light 10r. On the other hand, the blue and green light beams, as P-polarized light beams, are diffracted and deflected approximately 70° in their proceeding direction to fall on the reflection type spatial light modulator for blue and green light 10gb through third coupling prism 40.

Since the blue and green light beams are alternately time-divisionally transmitted by the color shutter 22, the reflection type spatial light modulator for blue light and green light 10gb is controlled in synchronism therewith. The reason in which the green light component and the blue light component are time-divisionally displayed, while the red light is not so displayed, is that, if a usual lamp light source is used, and white balance is set such as to take account of the human visual sensitivity, the red light is most deficient in output light volume.

The illuminating light, modulated by the respective reflection type spatial light modulators 10b and 10gb, are re-incident on the polarization selective holographic optical device 3. Of the reflected light from the reflection type spatial light modulator for blue light and green light 10gb, the S-polarized light component is radiated from the polarization selective holographic optical device 3 in substantially a perpendicular direction, without being subjected to diffraction. Of the reflected light from the reflection type spatial light modulator for red light 10r, the P-polarized light component is also diffracted and radiated from the polarization selective holographic optical device 3 in a perpendicular direction.

These two reflected light beams are transmitted through the second coupling prism 20 to fall on a color select 33b bonded to an optical surface of this second coupling prism 20. By this color select 33b, the polarization of the incident polarization (S-polarized light) of the blue and green light beams is saved, while the red light has its orientation of polarization rotated 90° to become S-polarized light.

These illuminating light beams fall on the projection optical system 25 through the polarizing plate 24, adapted for selectively transmitting the S-polarized light, to form an image of the display image on the screen 26 by the projection optical system 25.

The P-polarized light component, in the reflected light from the reflection type spatial light modulator for blue light and green light 10gb, is diffracted by the polarization selective holographic optical device 3 and transmitted therethrough to trace back the forward route of the illuminating light path in the opposite direction. The S-polarized light in the reflected light from the reflection type spatial light modulator for red light 10r similarly traces back the forward route of the illuminating light path in the reverse direction, without being diffracted by the polarization selective holographic optical device 3.

Figure 34:
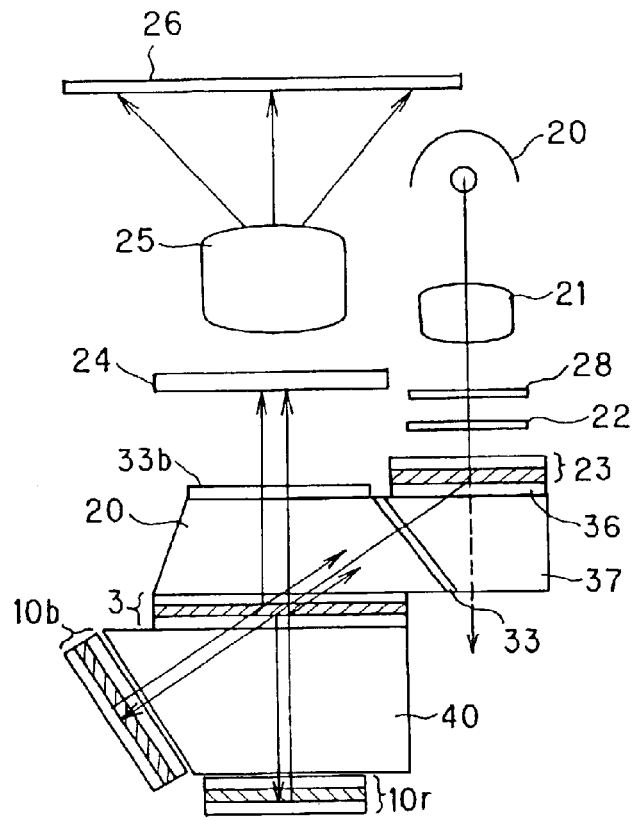
FIG. 34 is a side view showing the structure of the tenth embodiment of an image display apparatus according to the present invention.

The present embodiment may be formed by optically combining the polarization selective holographic optical device for correction 23, first coupling prism 37, color select 33, second coupling prism 20, polarization selective holographic optical device 3, third coupling prism 40 and the color select 33b, as shown in FIG. 34.

[10] Eleventh Embodiment of the Image Display Apparatus

Figure 35:
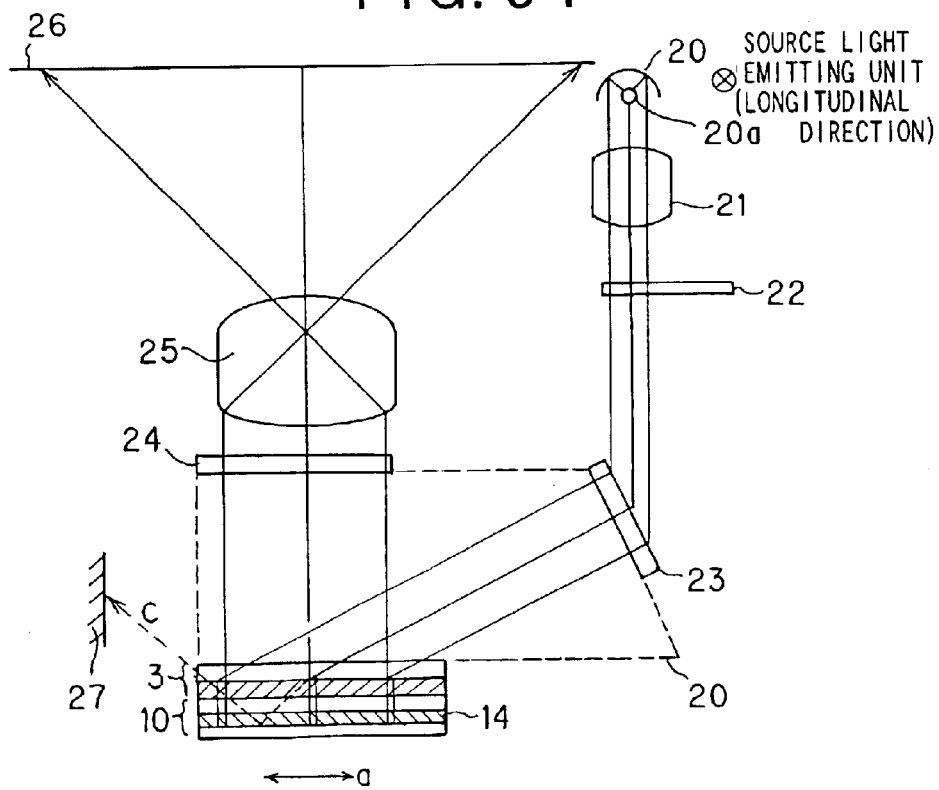
FIG. 35 is a side view showing the structure of an eleventh embodiment of an image display apparatus according to the present invention.

As an eleventh embodiment of the present invention, a color projection type image display apparatus, employing a reflection type FLC panel as the reflection type spatial light modulator, as shown in FIG. 35, is explained.

In the present image display apparatus, the illuminating light, radiated by the illuminating light source 20, falls on the illuminating optical system 21 having such functions as correcting the cross-sectional profile of the light beam, uniforming the intensity and controlling the angle of diffusion. The present illuminating optical system 21 has polarization converting means, not shown. In the present embodiment, the S-polarized light is transformed into the P-polarized light by rotating the orientation of polarization of the illuminating light by 90°, so that the incident light on the polarization selective holographic optical device 3 will be P-polarized light, for thereby improving the light utilization efficiency.

The illuminating light, transmitted through the illuminating optical system 21, is transmitted through a color wheel 22 to fall on the polarization selective holographic optical device for correction 23. This color wheel 22 time-divisionally separates the white light radiated from the illuminating light source 20 into spectral components of red, green and blue components. By this time division, color display becomes possible by the 'field sequential color technique' with the single-plate reflection type FLC panel 10.

Of the illuminating light, incident on the polarization selective holographic optical device for correction 23 at an angle of incidence of 60°, only the P-polarized light component is diffracted and radiated at an outgoing angle of approximately 0°. The S-polarized light proceeds linearly to traverse the polarization selective holographic optical device for correction 23, without being subjected to diffraction on the polarization selective holographic optical device for correction 23.

The diffracted illuminating light from the polarization selective holographic optical device for correction 23, mainly composed of the P-polarized light component, falls on the polarization selective holographic optical device 3. The polarization selective holographic optical device for correction 23 and the polarization selective holographic optical device 3 are of the same construction and are arranged so that the angles of incidence of the illuminating light on the polarization selective holographic optical device for correction 23 and on the polarization selective holographic optical device 3 will be approximately equal to each other, provided that, when seen from the illuminating light side (incident side), the directions of the diffraction (bend angles) of the two are equal to each other. By this arrangement, two merits are derived, that is a merit that fluctuations in the diffraction angle by wavelength can be counterbalanced, and a merit that the difference in the incidence angle dependency of the diffraction efficiency by wavelength can be corrected.

Meanwhile, a coupling prism 20 may be provided in a space between the polarization selective holographic optical device for correction 23 and the polarization selective holographic optical device 3, as shown by a dotted line in FIG. 35. However, since the bend angle differs in this case, the polarization selective holographic optical device for correction 23 and the polarization selective holographic optical device 3 ought not to be one and the same hologram element.

The reason the angle of incidence on the polarization selective holographic optical device for correction 23 is set to approximately 60° as that on the polarization selective holographic optical device 3 is that it is necessary to diminish the incidence angle dependency of the diffraction efficiency of the polarization selective holographic optical device for correction 23.

The P-polarized light, diffracted by the polarization selective holographic optical device 3, is radiated from this polarization selective holographic optical device 3 at an outgoing angle of 0° to fall on the reflection type spatial light modulator 10. This reflection type spatial light modulator 10 is arranged so that its longitudinal direction shown by arrow a in FIG. 35 coincides with the direction of the angle of incidence of the illuminating light. This is because the effective width of the incident illuminating light to the polarization selective holographic optical device for correction 23 in the direction of diffraction needs to be diminished. That is, the amount of decrease in this effective width needs to be reduced to as small a value as possible to raise the light utilization efficiency.

For the same reason, the longitudinal direction of the light emitting portion 20a of the illuminating light source 20 is perpendicular to the drawing sheet in FIG. 35. The reason is that, due to the aforementioned Lagrange-Helmholtz invariant, the angle of diffusion is not liable to be increased on reducing the beam diameter when the light emitting portion is small, that is that, if the illuminating light is incident in an oblique direction with respect to the spatial light modulator, reduction of the length of the light emitting portion along a direction coincident with the light incident direction is more effective in improving the light utilization efficiency.

The S-polarized light reflected following phase modulation by the reflection type spatial light modulator 10 is transmitted through the polarization selective holographic optical device 3, and then transmitted through the polarizing plate 24, which selectively transmits only the S-polarized light. The S-polarized light then falls on the projection optical system 25. By this projection optical system 25, an optical image displayed on the reflection type spatial light modulator 10 is projected enlarged as a display image on the screen 26.

Of the P-polarized light, the remaining illuminating light on the forward optical path, not diffracted by the polarization selective holographic optical device 3, is directly transmitted through the polarization selective holographic optical device 3 and undergoes regular reflection on the aluminum reflecting surface 14 of the reflection type spatial optical modulator 10 to make exit again in the direction indicated by C in FIG. 35. This illuminating light tends to become stray light to deteriorate the contrast of the displayed image. So, the light absorbing means 27 is used to absorb its energy.

[11] Twelfth Embodiment of the Image Display Apparatus

As a twelfth embodiment of the present invention, a color projection type image display apparatus employing a reflection type FLC panel as a reflection type spatial light modulator is explained with reference to FIG. 36.

In this image display apparatus, the illuminating light, radiated from the illuminating light source 20, falls on the illuminating optical system 21 having such functions as correcting the cross-sectional profile of the light beam, uniforming the intensity and controlling the angle of diffusion. The present illuminating optical system 21 has polarization converting means, not shown. In the present embodiment, the S-polarized light is transformed into the P-polarized light by rotating the orientation of polarization of the illuminating light by 90°, so that the incident light on the polarization selective holographic optical device 3 will become P-polarized light, for thereby improving the light utilization efficiency.

The illuminating light, transmitted through the illuminating optical system 21, is transmitted through a color wheel 22 to fall on the polarization selective holographic optical device for correction 23. This color wheel 22 time-divisionally separates the white light radiated from the illuminating light source 20 into spectral components of red, green and blue components. By this time division, color display becomes possible by the 'field sequential color technique' with the single-plate reflection type FLC panel 10.

The illuminating light, incident on the polarization selective holographic optical device for correction 23 at an angle of incidence of $\theta in23$, has only the P-polarized light component diffracted and radiated at an outgoing angle of $\theta out23$. The S-polarized light is transmitted through this polarization selective holographic optical device for correction 23, without diffraction thereby, to proceed on a straight optical path.

The illuminating light, composed mainly of the P-polarized light, diffracted by the polarization selective holographic optical device for correction 23, falls on the polarization selective holographic optical device 3 at an angle of incidence of $\theta in23$. It should be noted that the polarization selective holographic optical device for correction 23 and the polarization selective holographic optical device 3 are of the same structure. Moreover, the angles of incidence $\theta in23$ to the polarization selective holographic optical device for correction 23 is equal to the angle of incidence to the polarization selective holographic optical device 3, while the outgoing angle $\theta out23$ from the polarization selective holographic optical device for correction 23 is equal to the outgoing angle from the polarization selective holographic optical device 3, provided that, looking from the light illuminating side, the directions of diffraction of the two light beams (bend angles) are reversed. This gives the two aforementioned merits, that is that diffraction angle variations due to wavelength can be eked out and that correction may be made of differences in incidence angle dependency of the diffraction efficiency by wavelength.

Figure 36:
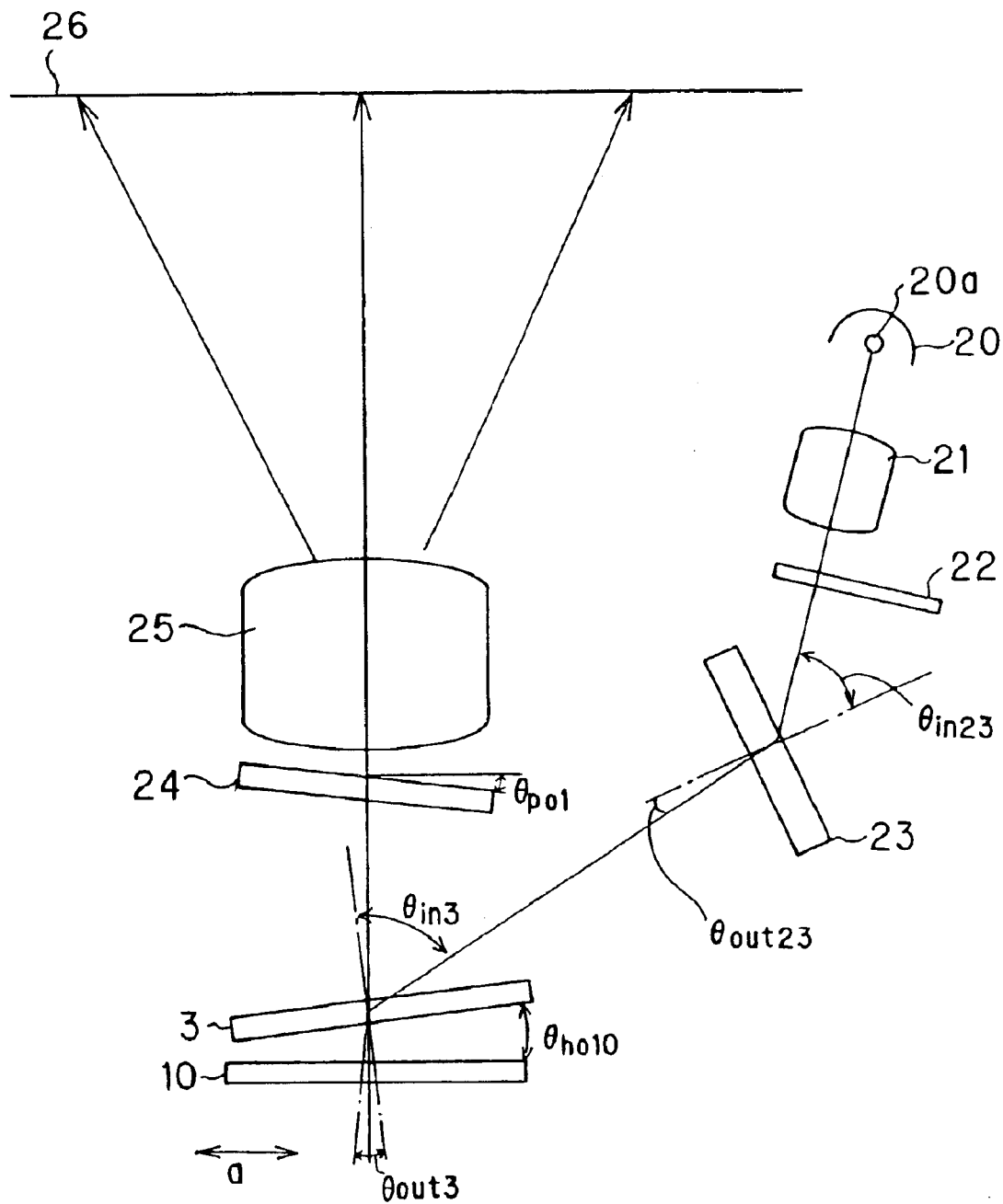
FIG. 36 is a side view showing the structure of a twelfth embodiment of an image display apparatus according to the present invention.

In the present embodiment, the polarization selective holographic optical device 3 and the reflection type spatial light modulator 10 are arranged at an opening angle of $\theta holo$ from each other, as shown in FIG. 36. That is, for diminishing the wavelength and incidence angle dependencies of the diffraction efficiency of the polarization selective holographic optical device 3 and the polarization selective holographic optical device for correction 23, it is effective to diminish the bend angles. To this end, the following two methods, namely (i) the method of reducing the angle of incidence; and
(ii) the method of increasing the outgoing angle in the direction of reducing the bend angle, may be contemplated. The method of (i) of 'reducing the angle of incidence' is not desirable because the variations in the angle of incidence to the hologram layer tend to be increased, as mentioned above. So, the method (ii) of 'increasing the outgoing angle in the direction of reducing the bend angle' is effective.

In the present embodiment, the outgoing angle θout3 from the polarization selective holographic optical device 3 and the outgoing angle θout23 from the p23 are set to, for example, approximately 5° to 20° to diminish the bend angles. If the relationship among the incident illuminating light, polarization selective holographic optical device 3 and the polarization selective holographic optical device for correction 23 is prescribed in this manner, and the diffracted radiated light from the polarization selective holographic optical device 3 is caused to fall at right angles to the reflection type spatial light modulator 10, the polarization selective holographic optical device 3 and the reflection type spatial light modulator 10 need to be arranged at the opening angle θholo (=θout3) relative to each other, as shown in FIG. 36.

Thus, the P-polarized light, diffracted by the polarization selective holographic optical device 3, falls on the reflection type spatial light modulator 10 substantially perpendicularly. The reflection type spatial light modulator 10 is arranged so that its longitudinal direction indicated by arrow a in FIG. 36 coincides with the direction of the angle of incidence of the illuminating light. The purpose of doing this is to reduce the effective width of the incident illuminating light in the direction of diffraction to the polarization selective holographic optical device for correction 23 to as small a value as possible to raise the light utilization efficiency.

For the same reason, the longitudinal direction of the light emitting portion 20a of the illuminating light source 20 is perpendicular to the drawing sheet of FIG. 35. The reason for doing this is that, from the aforementioned Lagrange-Helmholtz invariant, the angle of diffusion is scarcely increased for a smaller size of the light emitting portion when the diameter of the light beam is diminished. That is, if the illuminating light is caused to fall obliquely with respect to the spatial light modulator, it is effective in raising the light utilization efficiency to shorten the length of the light emitting portion along a direction coincident with the light incident direction.

The S-polarized light, reflected with phase modulation by the reflection type spatial light modulator 10, is transmitted through the polarization selective holographic optical device 3, and then transmitted through the polarizing plate 24, which selectively transmits the S-polarized light. The light then is incident on the projection optical system 25. For correcting the astigmatic aberration produced due to transmission through the polarization selective holographic optical device 3, the polarizing plate 24 is arranged at a tilt angle θpol having the same absolute value as but opposite in direction to the tilt angle θholo of the polarization selective holographic optical device 3 with respect to the reflection type spatial light modulator 10. This tilt of the polarizing plate 24 cancels out the astigmatic aberration in the modulated illuminating light. By the illuminating light, incident on the projection optical system 25, an optical image displayed on the reflection type spatial light modulator 10 is projected enlarged as a display image on the screen 26.

[12] Thirteenth Embodiment of Image Display Device

As a thirteenth embodiment of the image display apparatus (projection type) according to the present invention, a color projection type image display apparatus, employing a sole reflection FLC panel as a reflection type spatial light modulator, is now explained with reference to FIG. 37.

The illuminating light, radiated from the illuminating light source 20, falls on the illuminating optical system 21 having such functions as correcting the cross-sectional profile of the light beam, uniforming the intensity and controlling the angle of diffusion. The present illuminating optical system 21 has polarization converting means, not shown. In the present embodiment, the aforementioned holographic PDLC pane, the orientation of liquid crystal molecules of which is parallel to the panel surface, 1 is used as the polarization selective holographic optical device 3. So, a portion if the illuminating light of the P-polarized light component is transformed into the S-polarized light, so that the incident light on the polarization selective holographic optical device 3 will be S-polarized light, by rotating the orientation of polarization by 90°, for thereby improving the light utilization efficiency.

Within the illuminating optical system 21, there is provided the aforementioned color wheel 22. This color wheel 22 time-divisionally separates the white light radiated from the illuminating light source 20 into spectral components of red, green and blue components. By this time division, color display becomes possible by the 'field sequential color technique' with the single-plate reflection type FLC panel 10, operating as the reflection type spatial light modulator.

The illuminating light falls on the polarization selective holographic optical device 3 through a mirror 63. Most of the S-polarized light component of the illuminating light is diffracted and converted in its proceeding direction, whilst the P-polarized light component thereof proceeds linearly so as to be transmitted through the polarization selective holographic optical device 3 without diffraction. The S-polarized light component as the non-diffracted light (order zero light) is totally reflected on a second optical surface 64 of a triangular prism (first prism) 60, having its first optical surface bonded tightly to the polarization selective holographic optical device 3, and is radiated from a third optical surface (light outgoing surface) without falling on the reflection type spatial light modulator 10.

The S-polarized light, as the light diffracted by the polarization selective holographic optical device 3, is radiated from the second optical surface 64 of the triangular prism 60 to fall on the reflection type spatial light modulator 10 through a prism for correction (second prism) 61. The illuminating light, having its direction of polarization modulated depending on the displayed image by the reflection type spatial light modulator 10, is re-incident on the polarization selective holographic optical device 3 through the prism for correction 61 and the triangular prism 60. Most of the S-polarized light is diffracted and returned along the light incident direction of the illuminating light, whilst the P-polarized light is transmitted linearly through the polarization selective holographic optical device 3 without diffraction. Since the light transmitted linearly through the polarization selective holographic optical device 3 contains an S-polarized light component, and hence is detected by polarizing plate 24 adapted for selectively transmitting the S-polarized light component therethrough and for interrupting the P-polarized light component. The light so transmitted forms an enlarged image of the spatial light modulator 10 on the screen 26 by the projection optical system 25.

Figure 37:
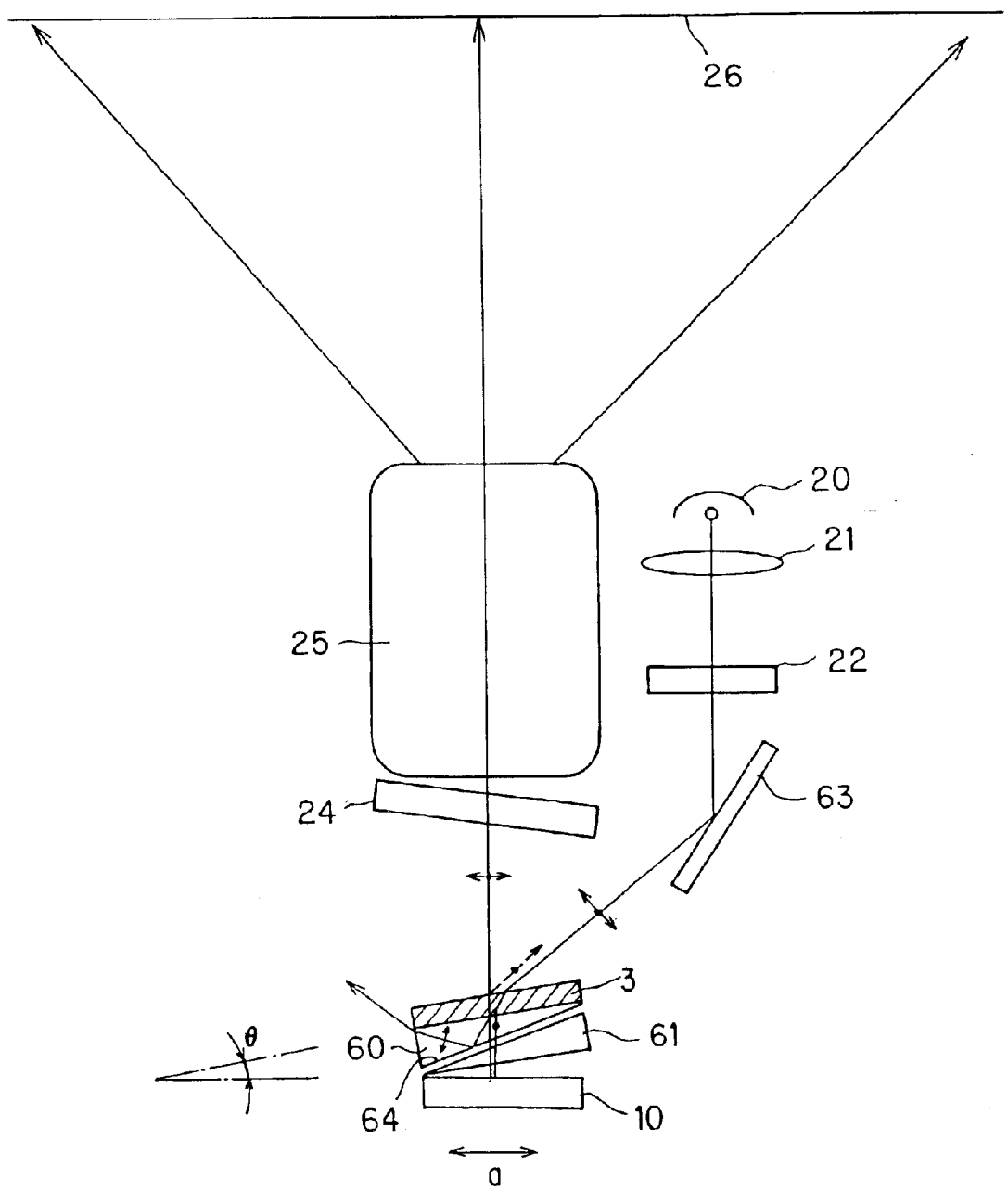
FIG. 37 is a side view showing the structure of a thirteenth embodiment of an image display apparatus according to the present invention.

In the present embodiment, the polarization selective holographic optical device 3 and the reflection type spatial light modulator 10 are arranged at an opening angle of θ, as shown in FIG. 37. The purpose of doing so is now explained.

For reducing the wavelength and incidence angle dependencies of the polarization selective holographic optical device 3, it is effective to reduce the bend angle. To this end, two methods may be contemplated, namely a method of reducing the angle of incidence and a method of selecting the outgoing angle to be of a large value in a direction of decreasing the bend angle. The technique of reducing the angle of incidence is not desirable since this increases fluctuations in the angle of incidence to the hologram layer. So, the technique of selecting the outgoing angle to be of a large value in a direction of decreasing the bend angle is more desirable. In the present embodiment, the value of this angle θ is set to approximately 10°.

On the other hand, the reflection type spatial light modulator 10 has a rectangular screen area (polarization modulation area) and is arranged so that the direction of the incidence angle of the illuminating light will be included in the plane of the longitudinal direction a of the rectangular screen area. The reason of doing this is that the illuminating light on the horizontally arrayed polarization selective holographic optical device 3 is incident obliquely thereon and hence the effective width of the incident illuminating light is decreased, so that it is necessary to reduce the amount of decrease of the effective width to as small a value as possible to increase the light utilization efficiency.

From the same reason, the longitudinal direction of the light emitting portion of the illuminating light source 20 is perpendicular to the drawing sheet of FIG. 37. The reason for doing this is that, from the aforementioned Lagrange-Helmholtz invariant, the angle of diffusion is scarcely increased for a smaller size of the light emitting portion when the diameter of the light beam is diminished. That is, if the illuminating light is caused to fall obliquely with respect to the spatial light modulator, as in the present invention, it is effective in raising the light utilization efficiency to shorten the length of the light emitting portion along a direction coincident with the light incident direction.

Moreover, the polarizing plate 24 is arranged at a tilt angle opposite to those of the polarization selective holographic optical device 3, prism for correction 61 and the triangular prism 60 in order to correct the aberration of the modulated light suffering from astigmatic aberration as a result of transmission of the modulated light through these optical components. This cancels out the astigmatic aberration of the modulated light to realize clear image representation.

[13] Embodiment Pertinent to Virtual Image Display Apparatus (Fourteenth Embodiment)

Figure 38:
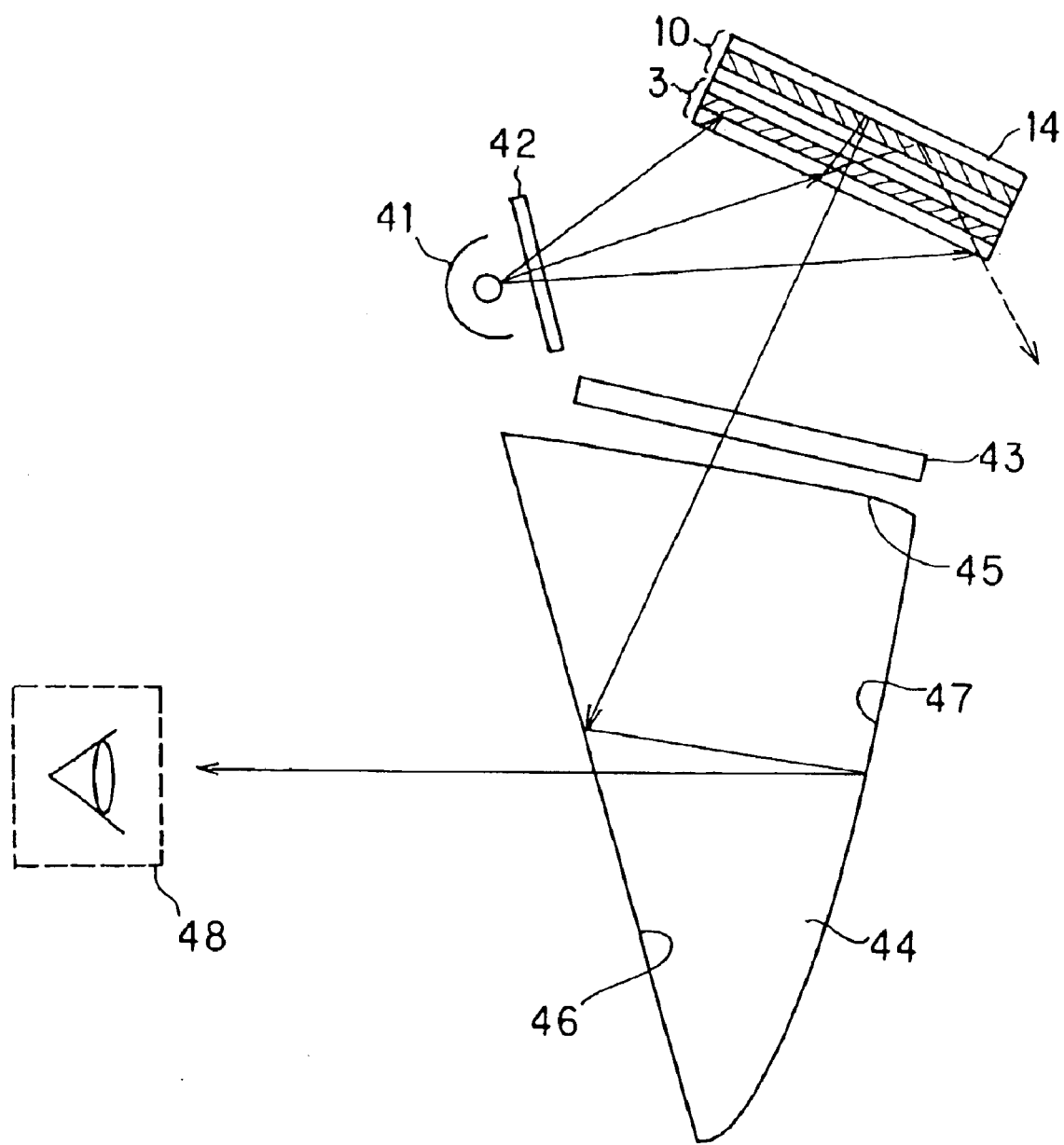
FIG. 38 is a side view showing the structure of a fourteenth embodiment of an image display apparatus according to the present invention.

As a fourteenth embodiment of the present invention, an image display apparatus employing a virtual image forming optical system and a reflection type FLC panel as a reflection type spatial light modulator, as shown in FIG. 38, is now explained.

In this image display apparatus, the illuminating light radiated from a lensed LED light source 41, designed for sequentially independently radiating three color light beams, namely a red light beam, a green light beam and a blue light beam, is transmitted through a polarizing plate 42, designed for selectively transmitting the P-polarized light component, to fall on the polarization selective holographic optical device 3. This incident light is diffracted by the polarization selective holographic optical device 3 to fall on the reflection type FLC panel 10 substantially perpendicularly.

The illuminating light, phase-modulated by the reflection type FLC panel 10, is reflected by the aluminum reflecting surface 14 of the reflection type FLC panel 10, and is re-incident on the polarization selective holographic optical device 3. The P-polarized light component at this time is re-diffracted by the polarization selective holographic optical device 3 to proceed towards the LED light source 41, whilst the S-polarized light component is directly transmitted through the polarization selective holographic optical device 3 and is detected by the polarizing plate 43, which selectively transmits the S-polarized light component therethrough. The S-polarized light component, thus detected, is incident on a free-form surface prism 44, forming a optical system for observing a virtual image, from a free-form surface refractive surface 45.

The light incident on the free-form surface prism 44 is totally reflected by the first optical surface 46 and subsequently reflected by a second free-form reflecting surface 47 so as to be transmitted through the first optical surface 46 to reach the area of observation 48 of the viewer. For enlarging the area of observation 48, a diffusion plate may be arranged between the LED light source 41 and the polarizing plate 42 or interference fringes may be pre-recorded on the polarization selective holographic optical device 3 for inducing the diffusion in the P-polarized light incident on the polarization selective holographic optical device 3 at the time of diffraction.

Figure 39:
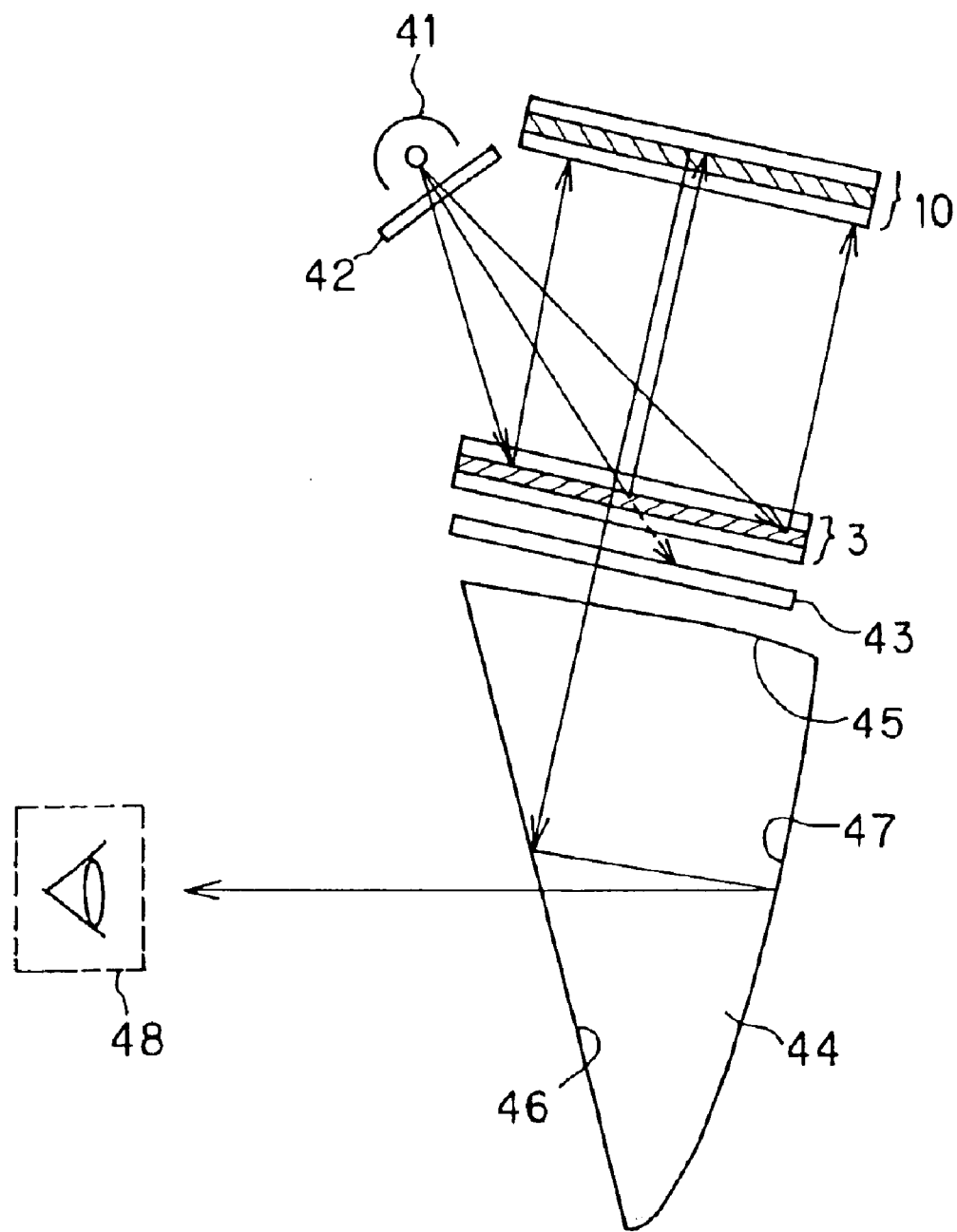
FIG. 39 is a side view showing the structure of a fifteenth embodiment of an image display apparatus according to the present invention.

As a fifteenth embodiment of the present invention, an image display apparatus, employing two reflection type FLC panels as the reflection type spatial light modulator and a virtual image forming optical system, as shown in FIG. 39, is now explained.

In this image display apparatus, the illuminating light, radiated from a lensed LED light source 41, designed for sequentially independently radiating three color light beams, namely a red light beam, a green light beam and a blue light beam, is transmitted through a polarizing plate 42, designed for selectively transmitting the P-polarized light component, to fall on the polarization selective holographic optical device 3. In the present embodiment, the polarization selective holographic optical device 3 is of the reflective type. The illuminating light incident on the polarization selective holographic optical device 3 is diffracted by the polarization selective holographic optical device 3 and reflected to fall on the reflection type FLC panel 10 substantially perpendicularly.

The illuminating light, phase-modulated by the reflection type FLC panel 10, is reflected by the aluminum reflecting surface 14 of the reflection type FLC panel 10, and re-incident on the polarization selective holographic optical device 3. At this time, the P-polarized light component of the illuminating light is re-diffracted and reflected by the polarization selective holographic optical device 3 to proceed towards the LED light source 42. The S-polarized light component is directly transmitted through the polarization selective holographic optical device 3 without being diffracted by the polarization selective holographic optical device 3.

The S-polarized light, thus transmitted through the polarization selective holographic optical device 3, is detected by the polarizing plate 43, adapted for selectively transmitting the S-polarized light, and is subsequently incident on the free-form refractive surface 45 of the free-form prism 44 forming the optical system for observing a virtual image.

The light incident on the free-form prism 44 is totally reflected by the first optical surface 46 and subsequently by a second free-form refractive surface 47 so as to be then transmitted through the first optical surface 46 to get to the area of observation 48 of the viewer. For enlarging the area of observation 48, a diffusion plate may be arranged between the LED light source 41 and the polarizing plate 42 or interference fringes may be formed on the polarization selective holographic optical device 3 for inducing the diffusion in the P-polarized light incident on the polarization selective holographic optical device 3 at the time of diffraction.

INDUSTRIAL APPLICABILITY

In the above-described image display apparatus, employing the image display device, according to the present invention, it is not mandatory to use a polarization beam splitter as means for illuminating the reflection type spatial optical modulator, thus reducing the size, weight and the production cost of the apparatus and improving the contrast of the displayed image.

Moreover, in the image display device, employing a polarization selective holographic optical device, obtained on sequentially layering a plurality of each of two areas having refractive index values exhibiting respectively different incidence polarization orientation dependencies, in distinction from the conventional hologram color filter, it is possible to sufficiently enlarge the difference between the diffraction efficiency of the P-polarized light and that of the S-polarized light, thus improving the light utilization efficiency and the contrast of the displayed image.

Additionally, through use of the polarization selective holographic optical device obtained on sequentially layering a plurality of each of two areas having refractive index values exhibiting respectively different incidence polarization orientation dependencies, in distinction from the conventional hologram color filter, the diffraction efficiency for the P-polarized light can be higher than that for the S-polarized light. Thus, the P-polarized light can be caused to fall on the holographic optical device, so that surface reflection on the glass substrate of the holographic optical device can be counterbalanced to achieve uniform illumination, while it is possible to improve the light utilization efficiency and contrast in the displayed image.

In the present image display apparatus, employing two polarization selective holographic optical devices for illuminating the reflection type spatial optical modulator, the wavelength dependencies of the diffraction angle of the polarization selective holographic optical devices can be counterbalanced to correct the decrease in the diffraction efficiency ascribable to the incidence angle to improve the light utilization efficiency.

The image display apparatus can be adapted to an image display apparatus employing plural reflection type spatial optical modulators provided for the respective color light beams, while it can be constructed as an image display apparatus as a 'field sequential color system'.

In the present image display apparatus, production cost can be lowered because no alignment is required between the reflection type spatial optical modulator and the polarization selective holographic optical device. Also, the displayed image can be improved in contrast, while a high light utilization efficiency is maintained. In addition, the image display apparatus can be reduced in size and thickness and can be constructed using an optical system for observing a virtual image.

That is, the present invention is high in illuminating light utilization efficiency and may be reduced in size and cost, and provides an image display device and an image display apparatus thus achieving high uniformity and high contrast of the displayed image.

What is claimed is:
1. An image display device comprising:
a polarization selective holographic optical device for diffracting illuminating light, said device including a plurality of each of two areas having refractive index values exhibiting respectively different incidence polarization orientation dependencies, said areas being layered sequentially alternately; and
a reflection type spatial optical modulator for modulating the state of polarization of the illuminating light diffracted by said polarization selective holographic optical device;
said polarization selective holographic optical device, one of two areas of which exhibits refractive index anisotropy, with the other exhibiting refractive index isotropy, being irradiated with the illuminating light at an angle of incidence not less than 30° and less than 90° with respect to a normal line to a light receiving surface thereof for said illuminating light, said polarization selective holographic optical device diffracting a P-polarized light component or an S-polarized light component of said illuminating light to radiate the diffracted light towards said reflection type spatial optical modulator; said polarization selective holographic optical device exhibiting the diffraction efficiency of not higher than 10% for the polarized light component of the illuminating light incident a second time thereon after phase modulation by said reflection type spatial optical modulator, which polarized light component has a direction of polarization perpendicular to a direction of polarization of the polarized light component diffracted thereby at the time when the illuminating light is first incident thereon, whereby not less than 70% of the diffracted polarized light component is transmitted through the optical device.

2. The image display device according to claim 1 wherein the diffraction efficiency is not higher than 1%.

3. The image display device according to claim 1 wherein the polarization selective holographic optical device permits the illuminating light as P-polarized light to be incident thereon.

4. The image display device according to claim 1 wherein the polarization selective holographic optical device has a bend angle, as a difference between the angle of incidence of the light to a hologram surface and the outgoing angle of diffraction, equal to 30°.

5. The image display device according to claim 1 wherein the polarization selective holographic optical device radiates the outgoing light, resulting from diffraction, along a direction of enlarging the bend angle with respect to a normal line to the illuminating light receiving surface within a plane of light incidence.

6. The image display device according to claim 1 wherein the polarization selective holographic optical device is formed by a plurality of hologram layers having respective different wavelength dependencies of the diffraction efficiency.

7. The image display device according to claim 1 wherein the polarization selective holographic optical device is formed by a plurality of hologram layers having respective different incidence angle dependencies of the diffraction efficiency.

8. The image display device according to claim 1 wherein the polarization selective holographic optical device comprises a plurality of holograms of respective different wavelength dependencies of the diffraction efficiency, multiplexed in one hologram layer.

9. The image display device according to claim 1 wherein the polarization selective holographic optical device comprises a plurality of holograms of respective different reproducing light incidence angle dependencies of the diffraction efficiency, multiplexed in one hologram layer.

10. The image display device according to claim 1 wherein the polarization selective holographic optical device is formed of a liquid crystal material.

11. The image display device according to claim 1 wherein the polarization selective holographic optical device and the reflection type spatial optical modulator are optically tightly bonded and unified together.

12. The image display device according to claim 1 wherein the reflection type spatial optical modulator includes a plurality of color pixels;

said polarization selective holographic optical device having a lens action of separating the incident illuminating light from one wavelength range to another and of converging the separated light wavelength portions on associated color pixels of the reflection type spatial optical modulator.

13. The image display device according to claim 1 further comprising:

a first prism for being irradiated with the diffracted light and with the non-diffracted light through the polarization selective holographic optical device and for subjecting at least one of the incident diffracted light and the incident non-diffracted light to internal total reflection at least once to cause the light thus totally reflected to be radiated from an outgoing surface; and a second prism;

said reflection type spatial optical modulator being irradiated with the light radiated from said first prism and diffracted by said polarization selective holographic optical device;

said second prism having at least one apex angle approximately equal to one of the apex angles of said first prism; the light incident surface of said first prism of the light diffracted by said polarization selective holographic optical device being approximately parallel to an outgoing surface of said second prism for said diffracted light incident through said first prism on said second prism to exit said second prism.

14. An image display apparatus comprising:

a light source for radiating illuminating light;

a polarization selective holographic optical device for diffracting illuminating light, said device including a plurality of each of two areas having refractive index values exhibiting respectively different incidence polarization orientation dependencies, said areas being layered sequentially alternately;

an illuminating optical system for causing the illuminating light radiated from said light source to be incident on said polarization selective holographic optical device;

a reflection type spatial optical modulator for modulating the polarized state of the illuminating light diffracted by said polarization selective holographic optical device; and a projection optical system for projecting the illuminating light on a screen through said reflection type spatial optical modulator and through said polarization selective holographic optical device;

said polarization selective holographic optical device, one of two areas of which exhibits refractive index anisotropy, with the other exhibiting refractive index isotropy, being irradiated by said illuminating optical system with the illuminating light at an angle of incidence not less than 30° and less than 90° with respect to a normal line to a light receiving surface thereof for said illuminating light, said polarization selective holographic optical device diffracting a P-polarized light component or an S-polarized light component of said illuminating light to radiate the diffracted light towards said reflection type spatial optical modulator; said polarization selective holographic optical device exhibiting the diffraction efficiency of not higher than 10% for the polarized light component of the illuminating light incident a second time thereon after phase modulation by said reflection type spatial optical modulator, which polarized light component has a direction of polarization perpendicular to a direction of polarization of the polarized light component diffracted thereby at the time when the illuminating light is first incident thereon, whereby not less than 70% of the diffracted polarized light component is transmitted through the optical device;

said projection optical system projecting the light transmitted through said polarization selective holographic optical device on a screen.

15. The image display apparatus according to claim 14 wherein the diffraction efficiency is not higher than 1%.

16. The image display apparatus according to claim 14 wherein a light emitting portion of said light source is rectangular in profile, with the direction of a short side coinciding with the direction of incidence of the illuminating light on the polarization selective holographic optical device.

17. The image display apparatus according to claim 14 wherein said illuminating optical system includes polarization transforming means of effecting rotation through 90° of the orientation of polarization of a component of the illuminating light having an orientation of polarization perpendicular to the orientation of polarization for which the diffraction efficiency of the polarization selective holographic optical device is maximum.

18. The image display apparatus according to claim 14 wherein said illuminating optical system includes polarization selection means of selectively transmitting a component having an orientation of polarization for which the diffraction efficiency of the polarization selective holographic optical device is maximum.

19. The image display apparatus according to claim 14 wherein the light source or the illuminating optical system includes time-sequential wavelength range switching means for temporally sequentially transmitting only a plurality of specified wavelength ranges of the total wavelength range of the illuminating light.

20. The image display apparatus according to claim 14 wherein the illuminating optical system has a polarization selective holographic optical device for correction having a bend angle opposite in sign to the bend angle of the polarization selective holographic optical device.

21. The image display apparatus according to claim 20 wherein the polarization selective holographic optical device for correction is the same type device as the polarization selective holographic optical device.

22. The image display apparatus according to claim 14 further comprising:

a coupling prism optically tightly bonded to the polarization selective holographic optical device and having at least a first optical surface irradiated with the illuminating light substantially perpendicularly and a second optical surface from which the light reflected by said reflection type spatial optical modulator is radiated substantially perpendicularly;

said illuminating light being incident on a light receiving surface of said polarization selective holographic optical device at an angle of incidence not less than 60° and less than 90° relative to a line normal to the illuminating light receiving surface.

23. The image display apparatus according to claim 22 wherein the coupling prism has a third optical surface including a light absorbing layer irradiated substantially perpendicularly with the regular reflected light of the illuminating light by said reflection type spatial optical modulator.

24. The image display apparatus according to claim 14 wherein the projection optical system includes polarization selection means for selectively transmitting a component of the orientation of polarization of the modulated light by said reflection type spatial optical modulator which is transmitted through said polarization selective holographic optical device.

25. The image display a apparatus according to claim 14 wherein said polarization selective holographic optical device permits the illuminating light as the P-polarized light to be incident thereon.

26. The image display apparatus according to claim 14 wherein the bend angle of the polarization selective holographic optical device is not less than 30°.

27. The image display apparatus according to claim 14 wherein the hologram surface of the polarization selective holographic optical device and the reflecting surface of the reflection type spatial optical modulator exhibit optically non-parallel position relationships to each other.

28. The image display apparatus according to claim 14 wherein the polarization selective holographic optical device is made up of a plurality of hologram layers having respective different wavelength dependencies of the diffraction efficiency.

29. The image display apparatus according to claim 14 wherein the polarization selective holographic optical device is made up of a plurality of hologram layers having respective different reproducing light incidence angle dependencies of the diffraction efficiency.

30. The image display apparatus according to claim 14 wherein the polarization selective holographic optical device comprises a plurality of holograms exhibiting respective different wavelength dependencies of the diffraction efficiency, said hologram layers being multiplexed in one hologram layer.

31. The image display apparatus according to claim 14 wherein the polarization selective holographic optical device comprises a plurality of holograms of respective different reproducing light incidence angle dependencies of the diffraction efficiency multiplexed in one hologram layer.

32. The image display apparatus according to claim 14 wherein
the polarization selective holographic optical device is formed of a liquid crystal material.

33. The image display apparatus according to claim 14 wherein
the polarization selective holographic optical device and the reflection type spatial optical modulator are optically tightly bonded and unified together.

34. The image display apparatus according to claim 14 wherein
the reflection type spatial optical modulator has a rectangular profile with the long side direction of the rectangle coinciding with the direction of incidence of the illuminating light to the polarization selective holographic optical device.

35. The image display apparatus according to claim 14 wherein the reflection type spatial optical modulator includes a plurality of color pixels;
said polarization selective holographic optical device having a lens action of separating the incident illuminating light from one wavelength range to another and of converging the separated light portions on associated color pixels of the reflection type spatial optical modulator.

36. The image display apparatus according to claim 14 further comprising:
a first prism for being irradiated with the diffracted light and with the non-diffracted light through the polarization selective holographic optical device and for subjecting at least one of the incident diffracted light and the incident non-diffracted light to internal total reflection at least once to cause the light thus totally reflected to be radiated from an outgoing surface; and a second prism;

said reflection type spatial optical modulator being irradiated with the light radiated through said first prism and diffracted by said polarization selective holographic optical device;

said second prism having at least one apex angle approximately equal to one of the apex angles of said first prism; the light incident surface of said first prism for the light diffracted by said polarization selective holographic optical device being approximately parallel to an outgoing surface of said second prism for said diffracted light incident through said first prism on said second prism to exit said second prism.

37. An image display apparatus comprising:
a polarization selective holographic optical device for diffracting the incident light, said device including a plurality of each of two areas having refractive index values exhibiting respectively different incidence polarization orientation dependencies, said areas being layered sequentially alternately;

color separation means for separating said illuminating light in a plurality of representing different wavelength range components;

an illuminating optical system for causing the illuminating light separated into respective different wavelength range components to be incident on said polarization selective holographic optical device;

a plurality of reflection type spatial optical modulators for modulating polarized states of a plurality of representing different wavelength range components of the illuminating light diffracted by said polarization selective holographic optical device;

color synthesis means for synthesizing illuminating light portions of respective different wavelength ranges modulated by said plural reflection type spatial optical modulators; and a projection optical system for projecting the illuminating light through said color synthesis means;

wherein said polarization selective holographic optical device, one of two areas of which exhibits refractive index anisotropy, with the other exhibiting refractive index anisotropy, being irradiated by said illuminating optical system with the illuminating light at an angle of incidence not less than 30° and less than 90° with respect to a normal line to a light receiving surface thereof for said illuminating light, said polarization selective holographic optical device diffracting a P-polarized light component or an S-polarized light component of said illuminating light to radiate the diffracted light towards said reflection type spatial optical modulators; said polarization selective holographic optical device exhibiting the diffraction efficiency of not higher than 10% for the polarized light component of the illuminating light incident a second time thereon after phase modulation by said reflection type spatial optical modulators, which polarized light component has a direction of polarization perpendicular to a direction of polarization of the polarized light component diffracted thereby at the time when the illuminating light is first incident thereon, whereby not less than 70% of the diffracted polarized light component is transmitted through the optical device;

said projection optical system projecting the illuminating light transmitted through said polarization selective holographic optical device and through said color synthesis means on a screen.

38. The image display apparatus according to claim 37 wherein the diffraction efficiency is not higher than 1%.

39. The image display apparatus according to claim 37 wherein
the reflection type spatial optical modulator has a rectangular profile with the long side direction of the rectangle coinciding with the direction of incidence of the illuminating light to the polarization selective holographic optical device.

40. The image display apparatus according to claim 37 wherein
said color separation means and said color synthesis means use a cross-dichroic mirror in common.

41. The image display apparatus according to claim 37 wherein said illuminating optical system includes polarization transforming means of effecting rotation through 90° of the orientation of polarization of a component of the illuminating light having an orientation of polarization perpendicular to the orientation of polarization for which the diffraction efficiency of the polarization selective holographic optical device is maximum.

42. The image display apparatus according to claim 37 wherein said illuminating optical system includes polarization selection means for selectively transmitting a component of the illuminating light having an orientation of polarization for which the diffraction efficiency of the polarization selective holographic optical device is maximum.

43. The image display apparatus according to claim 37 wherein the light source or the illuminating optical system includes time-sequential wavelength range switching means for temporally sequentially transmitting only a plurality of specified wavelength ranges of the total wavelength range of the illuminating light.

44. The image display apparatus according to claim 37 wherein
the illuminating optical system has a polarization selective holographic optical device for correction having a bend angle opposite in sign to the bend angle of the polarization selective holographic optical device.

45. The image display apparatus according to claim 44 wherein
the polarization selective holographic optical device for correction is the same type device as the polarization selective holographic optical device.

46. The image display apparatus according to claim 37 further comprising:
a coupling prism optically tightly bonded to the polarization selective holographic optical device and having at least a first optical surface irradiated with the illuminating light substantially perpendicularly and a second optical surface from which the light reflected by said reflection type spatial optical modulator is radiated substantially perpendicularly;
said illuminating light being incident on a light receiving surface of said polarization selective holographic optical device at an angle of incidence not less than 60° and less than 90°.

47. The image display apparatus according to claim 46 wherein the coupling prism has a third optical surface including a light absorbing layer irradiated substantially perpendicularly with the regular reflected light of the illuminating light by said reflection type spatial optical modulator.

48. The image display apparatus according to claim 37 wherein the projection optical system includes polarization selection means for selectively transmitting a component of the orientation of polarization of the light modulated by said reflection type spatial optical modulator which is transmitted through said polarization selective holographic optical device.

49. The image display apparatus according to claim 37 wherein said polarization selective holographic optical device permits the illuminating light as the P-polarized light to be incident thereon.

50. The image display apparatus according to claim 37 wherein the bend angle of the polarization selective holographic optical device is not less than 30°.

51. The image display apparatus according to claim 37 wherein the hologram surface of the polarization selective holographic optical device and the reflecting surface of the reflection type spatial optical modulator exhibit optically non-parallel position relationships to each other.

52. The image display apparatus according to claim 37 wherein the polarization selective holographic optical device is made up of a plurality of hologram layers having respective different wavelength dependencies of the diffraction efficiency.

53. The image display apparatus according to claim 37 wherein the polarization selective holographic optical device is made up of a plurality of hologram layers having respective different reproducing light incidence angle dependencies of the diffraction efficiency.

54. The image display apparatus according to claim 37 wherein the polarization selective holographic optical device comprises a plurality of holograms of respective different wavelength dependencies of the diffraction efficiency multiplexed in one hologram layer.

55. The image display apparatus according to claim 37 wherein the polarization selective holographic optical device comprises a plurality of holograms of respective different reproducing light incidence angle dependencies of the diffraction efficiency multiplexed in one hologram layer.

56. The image display apparatus according to claim 37 wherein
the polarization selective holographic optical device is formed of a liquid crystal material.

57. The image display apparatus according to claim 37 wherein the reflection type spatial optical modulator has a rectangular profile with the long side direction of the rectangle coinciding with the direction of incidence of the illuminating light to the polarization selective holographic optical device.

58. An image display apparatus comprising:
a light source for radiating illuminating light;
a polarization selective holographic optical device for diffracting illuminating light, said device including a plurality of each of two areas having refractive index values exhibiting respectively different incidence polarization orientation dependencies, said areas being layered sequentially alternately;
wavelength-band-based polarization separating means for separating the states of polarization of respective different first and second wavelength range components of said illuminating light as linear polarized components perpendicular to each other;
an illuminating optical system for causing the illuminating light separated into first and second wavelength range components to be incident on said polarization selective holographic optical device;
a first reflection type spatial optical modulator for modulating the state of polarization of the first wavelength range component of the illuminating light diffracted by the polarization selective holographic optical device;
a second reflection type spatial optical modulator for modulating the state of polarization of the second wavelength range component of the illuminating light transmitted through the polarization selective holographic optical device; and
a projection optical system for projecting the illuminating light through said reflection type spatial optical modulator on a screen;
said polarization selective holographic optical device, one of two areas of which exhibits refractive index anisotropy, with the other exhibiting refractive index isotropy, being irradiated by said illuminating optical system with the illuminating light at an angle of incidence not less than 30° and less than 90° with respect to a normal line to a light receiving surface thereof for said illuminating light, said polarization selective holographic optical device diffracting said first wavelength range component as a P-polarized light component or an S-polarized light component to radiate the diffracted light towards said first reflection type spatial optical modulator; said polarization selective holographic optical device exhibiting the diffraction efficiency of not higher than 10% for the polarized light component of the illuminating light incident a second time thereon after phase modulation by said first reflection type spatial optical modulator, which polarized light component has a direction of polarization perpendicular to a direction of polarization of the polarized light component diffracted thereby at the time when the first wavelength range component of said illuminating light is first incident thereon, whereby not less than 70% of the diffracted polarized light component is transmitted through the optical device; said polarization selective holographic optical device transmitting not less than 70% of the second wavelength range component to radiate the second wavelength range component towards said second reflection type spatial optical modulator; said polarization selective holographic optical device diffracting the polarized light component having the direction of polarization perpendicular to the direction of polarization of the polarized light component of the second wavelength range component of the illuminating light re-incident thereon after phase modulation by said second reflection type spatial optical modulator, transmitted therethrough at the time when the second wavelength range component of said illuminating light is first incident thereon;
said projection optical system projecting the illuminating light of the first wavelength range component through said first reflection type spatial optical modulator and the polarization selective holographic optical device and the illuminating light of the second wavelength range component through said second reflection type spatial optical modulator and the polarization selective holographic optical device on said screen.

59. The image display apparatus according to claim 58 wherein the diffraction efficiency is not higher than 1%.

60. The image display apparatus according to claim 58, wherein
the reflection type spatial optical modulator has a rectangular profile with the long side direction of the rectangle coinciding with the direction of incidence of the illuminating light to the polarization selective holographic optical device.

61. The image display apparatus according to claim 58 wherein
said illuminating optical system includes polarization transforming means for rotating the orientation of polarization through 90° for one of two relatively perpendicular polarized light components of said illuminating light.

62. The image display apparatus according to claim 58 wherein
the light source or the illuminating optical system includes time-sequential wavelength range switching means for temporally sequentially transmitting only a plurality of specified wavelength ranges of the total wavelength range of the illuminating light.

63. The image display apparatus according to claim 58 wherein
the illuminating optical system has a polarization selective holographic optical device for correction having a bend angle opposite in sign to the bend angle of the polarization selective holographic optical device.

64. The image display apparatus according to claim 58 wherein
the polarization selective holographic optical device for correction is the same type device as the polarization selective holographic optical device.

65. The image display apparatus according to claim 58 further comprising:
a coupling prism optically tightly bonded to the polarization selective holographic optical device and having at least a first optical surface irradiated with the illuminating light substantially perpendicularly and a second optical surface from which the light reflected by said reflection type spatial optical modulator is radiated substantially perpendicularly;
said illuminating light being incident on a light receiving surface of said polarization selective holographic optical device at an angle of incidence not less than 60° and less than 90°.

66. The image display apparatus according to claim 65 wherein the coupling prism has a third optical surface including a light absorbing layer irradiated substantially perpendicularly with the regular reflected light of the illuminating light by said reflection type spatial optical modulator.

67. The image display apparatus according to claim 58 wherein the projection optical system includes polarization selection means for selectively transmitting a component of the orientation of polarization of the light which is modulated by said reflection type spatial optical modulator and which is transmitted through said polarization selective holographic optical device.

68. The image display apparatus according to claim 58 wherein the bend angle, as a difference between the angle of incidence of light on a hologram surface and the outgoing angle of diffraction of the polarization selective holographic optical device is not less than 30°.

69. The image display apparatus according to claim 58 wherein the hologram surface of the polarization selective holographic optical device and the reflecting surface of the reflection type spatial optical modulator exhibit optically non-parallel position relationships to each other.

70. The image display apparatus according to claim 58 wherein the polarization selective holographic optical device is made up of a plurality of hologram layers having respective different wavelength dependencies of the diffraction efficiency.

71. The image display apparatus according to claim 58 wherein the polarization selective holographic optical device is made up of a plurality of hologram layers having respective different reproducing light incidence angle dependencies of the diffraction efficiency.

72. The image display apparatus according to claim 58 wherein the polarization selective holographic optical device comprises a plurality of holograms of respective different wavelength dependencies of the diffraction efficiency multiplexed in one hologram layer.

73. The image display apparatus according to claim 58 wherein the polarization selective holographic optical device comprises a plurality of holograms of respective different reproducing light incidence angle dependencies of the diffraction efficiency multiplexed in one hologram layer.

74. The image display apparatus according to claim 58 wherein
the polarization selective holographic optical device is formed of a liquid crystal material.

75. The image display apparatus according to claim 58 wherein
the reflection type spatial optical modulator has a rectangular profile with the long side direction of the rectangle coinciding with the direction of incidence of the illuminating light to the polarization selective holographic optical device.

76. An image display apparatus comprising:
a light source for radiating illuminating light;
a polarization selective holographic optical device for diffracting the incident light, said device including a plurality of each of two areas having refractive index values exhibiting respectively different incidence polarization orientation dependencies, said areas being layered sequentially alternately;
an illuminating optical system for causing said illuminating light to be incident on said polarization selective holographic optical device;
a reflection type spatial optical modulator for modulating the state of polarization of the illuminating light diffracted by said polarization selective holographic optical device; and
a optical system for observing a virtual image, for guiding the illuminating light through said reflection type spatial optical modulator to the eye of a viewer;

said polarization selective holographic optical device, one of two areas of which exhibits refractive index anisotropy, with the other exhibiting refractive index isotropy, being irradiated by said illuminating optical system with the illuminating light at an angle of incidence not less than 30° and less than 90° with respect to a normal line to a light receiving surface thereof for said illuminating light, said polarization selective holographic optical device diffracting a P-polarized light component or an S-polarized light component of said illuminating light to radiate the diffracted light towards said reflection type spatial optical modulator; said polarization selective holographic optical device exhibiting the diffraction efficiency of not higher than 10% for the polarized light component of the illuminating light incident a second time thereon after phase modulation by said reflection type spatial optical modulator, which polarized light component has a direction of polarization perpendicular to a direction of polarization of the polarized light component diffracted thereby at the time when the illuminating light is first incident thereon, whereby not less than 70% of the diffracted polarized light component is transmitted through the optical device;

said optical system for observing a virtual image guiding the light transmitted through said polarization selective holographic optical device towards the eye of a viewer.

77. The image display apparatus according to claim 76 wherein the diffraction efficiency is not higher than 1%.

78. The image display apparatus according to claim 76 wherein
the reflection type spatial optical modulator has a rectangular profile with the long side direction of the rectangle coinciding with the direction of incidence of the illuminating light to the polarization selective holographic optical device.

79. The image display apparatus according to claim 76 wherein
said illuminating optical system includes polarization transforming means for rotating the orientation of polarization through 90° for one of two relatively perpendicular polarized light components of said illuminating light.

80. The image display apparatus according to claim 76 wherein
the light source or the illuminating optical system includes time-sequential wavelength range switching means for temporally sequentially transmitting only a plurality of specified wavelength ranges of the total wavelength range of the illuminating light.

81. The image display apparatus according to claim 76 wherein
the illuminating optical system has a polarization selective holographic optical device for correction having a bend angle opposite in sign to the bend angle of the polarization selective holographic optical device.

82. The image display apparatus according to claim 81 wherein
the polarization selective holographic optical device for correction is the same type device as the polarization selective holographic optical device.

83. The image display apparatus according to claim 76 further comprising:
a coupling prism optically tightly bonded to the polarization selective holographic optical device and having at least a first optical surface irradiated with the illuminating light substantially perpendicularly and a second optical surface from which the light reflected by said reflection type spatial optical modulator is radiated substantially perpendicularly;

said illuminating light being incident on a light receiving surface of said polarization selective holographic optical device at an angle of incidence not less than 60° and less than 90°.

84. The image display apparatus according to claim 83 wherein the coupling prism has a third optical surface including a light absorbing layer irradiated substantially perpendicularly with the regular reflected light of the illuminating light by said reflection type spatial optical modulator.

85. The image display apparatus according to claim 76 wherein the optical system for observing a virtual image includes polarization selection means for selectively transmitting a component of the orientation of polarization of the light which is modulated by said reflection type spatial optical modulator and which is transmitted through said polarization selective holographic optical device.

86. The image display apparatus according to claim 76 wherein said polarization selective holographic optical device permits the illuminating light as the P-polarized light to be incident thereon.

87. The image display apparatus according to claim 76 wherein the bend angle as a difference between the angle of incidence of light on the hologram surface and the outgoing angle of diffraction is not less than 30°.

88. The image display apparatus according to claim 76 wherein the hologram surface of the polarization selective holographic optical device and the reflecting surface of the reflection type spatial optical modulator exhibit optically non-parallel position relationships to each other.

89. The image display apparatus according to claim 76 wherein the polarization selective holographic optical device is made up of a plurality of hologram layers having respective different wavelength dependencies of the diffraction efficiency.

90. The image display apparatus according to claim 76 wherein the polarization selective holographic optical device is made up of a plurality of hologram layers having respective different reproducing light incidence angle dependencies of the diffraction efficiency.

91. The image display apparatus according to claim 76 wherein the polarization selective holographic optical device comprises a plurality of holograms of respective different wavelength dependencies of the diffraction efficiency multiplexed in one hologram layer.

92. The image display apparatus according to claim 76 wherein the polarization selective holographic optical device comprises a plurality of holograms of respective different reproducing light incidence angle dependencies of the diffraction efficiency multiplexed in one hologram layer.

93. The image display apparatus according to claim 76 wherein the polarization selective holographic optical device is formed of a liquid crystal material.

94. The image display apparatus according to claim 76 wherein the reflection type spatial optical modulator has a rectangular profile with the long side direction of the rectangle coinciding with the direction of incidence of the illuminating light to the polarization selective holographic optical device.

* * * * *